US007716330B2

(12) United States Patent
Kulig et al.

(10) Patent No.: US 7,716,330 B2
(45) Date of Patent: May 11, 2010

(54) SYSTEM AND METHOD FOR CONTROLLING TRANSMISSION OF DATA PACKETS OVER AN INFORMATION NETWORK

(75) Inventors: Matthew P. Kulig, Millstadt, IL (US); Timmy L. Brooks, Florissant, MO (US); John W. Lockwood, St. Louis, MO (US); David Kyle Reddick, Kirkwood, MO (US)

(73) Assignee: Global Velocity, Inc., St. Louis, MO (US)

( * ) Notice: Subject to any disclaimer, the term of this patent is extended or adjusted under 35 U.S.C. 154(b) by 1184 days.

(21) Appl. No.: 10/037,593

(22) Filed: Oct. 19, 2001

(65) Prior Publication Data

US 2003/0110229 A1    Jun. 12, 2003

(51) Int. Cl.
*G06F 15/173* (2006.01)
(52) U.S. Cl. ..................... 709/225; 709/224; 709/229; 709/232
(58) Field of Classification Search ................. 709/224, 709/225, 229, 232
See application file for complete search history.

(56) References Cited

U.S. PATENT DOCUMENTS

| 3,601,808 A | 8/1971 | Vlack |
| 3,611,314 A | 10/1971 | Pritchard, Jr. et al. |
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,081,607 A | 3/1978 | Vitols |
| 4,298,898 A | 11/1981 | Cardot |
| 4,314,356 A | 2/1982 | Scarbrough |

(Continued)

FOREIGN PATENT DOCUMENTS

EP      0880088       11/1998

(Continued)

OTHER PUBLICATIONS

Agere Systems, "Lucent Delivers 'Payload Plus' Network Processors for Programmable, Multiprotocol, OC-48c Processing", Agere Systems Press Release, Oct. 30, 2000, Allentown, PA.

(Continued)

*Primary Examiner*—Ario Etienne
*Assistant Examiner*—Barbara N Burgess
(74) *Attorney, Agent, or Firm*—Edward J. Radlo; Radlo & Su LLP

(57) ABSTRACT

An apparatus for controlling transmission of data packets in an information network comprises a Regional Transaction Processor (RTP) operable to communicate with a Data Enabling Device (DED) and at least one workstation. The DED searches data packets for content match information. The RTP includes instructions to generate information to include in a prompt to be presented at the workstation when the content match information is detected in at least one of the data packets. The prompt is based on information in the data packet. Transmission of the data packets through the information network is suspended by the DED until a response to the prompt is received that authorizes downloading the data packets to the workstation. If transmission of the data packets to the workstation is not authorized, the data packets are discarded by the DED.

25 Claims, 33 Drawing Sheets

U.S. PATENT DOCUMENTS

| | | | |
|---|---|---|---|
| 4,385,393 A | 5/1983 | Chaure et al. | |
| 4,464,718 A | 8/1984 | Dixon et al. | |
| 4,550,436 A | 10/1985 | Freeman et al. | |
| 4,823,306 A | 4/1989 | Barbic et al. | |
| 4,941,178 A | 7/1990 | Chuang | |
| 5,023,910 A | 6/1991 | Thomson | |
| 5,050,075 A | 9/1991 | Herman et al. | |
| 5,077,665 A | 12/1991 | Silverman et al. | |
| 5,101,424 A | 3/1992 | Clayton et al. | |
| 5,126,936 A | 6/1992 | Champion et al. | |
| 5,140,692 A | 8/1992 | Morita | |
| 5,163,131 A | 11/1992 | Row et al. | |
| 5,179,626 A | 1/1993 | Thomson | |
| 5,226,165 A | 7/1993 | Martin | |
| 5,243,655 A | 9/1993 | Wang | |
| 5,249,292 A | 9/1993 | Chiappa | |
| 5,255,136 A | 10/1993 | Machado et al. | |
| 5,265,065 A | 11/1993 | Turtle | |
| 5,270,922 A | 12/1993 | Higgins | |
| 5,274,679 A * | 12/1993 | Abe et al. | 375/370 |
| 5,319,776 A | 6/1994 | Hile et al. | |
| 5,327,521 A | 7/1994 | Savic et al. | |
| 5,339,411 A | 8/1994 | Heaton, Jr. et al. | |
| 5,347,634 A | 9/1994 | Herrell et al. | |
| 5,371,794 A | 12/1994 | Diffie et al. | |
| 5,388,259 A | 2/1995 | Fleischman et al. | |
| 5,396,253 A | 3/1995 | Chia | |
| 5,404,411 A | 4/1995 | Banton et al. | |
| 5,418,951 A | 5/1995 | Damashek | |
| 5,421,028 A | 5/1995 | Swanson | |
| 5,432,822 A | 7/1995 | Kaewell, Jr. | |
| 5,440,723 A | 8/1995 | Arnold et al. | |
| 5,461,712 A | 10/1995 | Chelstowski et al. | |
| 5,463,701 A | 10/1995 | Kantner et al. | |
| 5,465,353 A | 11/1995 | Hull et al. | |
| 5,481,735 A | 1/1996 | Mortensen et al. | |
| 5,487,151 A * | 1/1996 | Kikuchi et al. | 714/49 |
| 5,488,725 A | 1/1996 | Turtle et al. | |
| 5,497,488 A | 3/1996 | Akizawa et al. | |
| 5,544,352 A | 8/1996 | Egger | |
| 5,546,578 A | 8/1996 | Takada | |
| 5,629,980 A | 5/1997 | Stefik et al. | |
| 5,651,125 A | 7/1997 | Witt et al. | |
| 5,687,297 A | 11/1997 | Coonan et al. | |
| 5,701,464 A | 12/1997 | Aucsmith | |
| 5,710,757 A * | 1/1998 | May | 370/232 |
| 5,721,898 A | 2/1998 | Beardsley et al. | |
| 5,740,244 A | 4/1998 | Indeck et al. | |
| 5,740,466 A | 4/1998 | Geldman et al. | |
| 5,761,431 A * | 6/1998 | Gross et al. | 709/225 |
| 5,774,835 A | 6/1998 | Ozawa | |
| 5,774,839 A | 6/1998 | Shlomot | |
| 5,781,772 A | 7/1998 | Wilkinson, III | |
| 5,781,921 A | 7/1998 | Nichols | |
| 5,805,832 A | 9/1998 | Brown et al. | |
| 5,813,000 A | 9/1998 | Furlani | |
| 5,818,273 A | 10/1998 | Vora et al. | |
| 5,819,290 A | 10/1998 | Fujita | |
| 5,826,075 A | 10/1998 | Bealkowski et al. | |
| 5,864,738 A | 1/1999 | Kessler et al. | |
| 5,870,730 A | 2/1999 | Furuya et al. | |
| 5,884,286 A | 3/1999 | Daughtery, III | |
| 5,886,701 A | 3/1999 | Chauvin et al. | |
| 5,913,211 A | 6/1999 | Nitta | |
| 5,930,753 A | 7/1999 | Potamianos et al. | |
| 5,943,429 A | 8/1999 | Handal | |
| 5,974,414 A | 10/1999 | Stanczak et al. | |
| 5,978,801 A | 11/1999 | Yuasa | |
| 5,987,432 A | 11/1999 | Zusman et al. | |
| 5,991,881 A | 11/1999 | Conklin et al. | |
| 5,995,963 A | 11/1999 | Nanba et al. | |
| 6,023,760 A | 2/2000 | Karttunen | |
| 6,028,939 A | 2/2000 | Yin | |
| 6,044,407 A | 3/2000 | Jones et al. | |
| 6,058,391 A | 5/2000 | Gardner | |
| 6,061,662 A | 5/2000 | Makivic | |
| 6,067,569 A | 5/2000 | Khaki et al. | |
| 6,070,172 A | 5/2000 | Lowe | |
| 6,073,160 A | 6/2000 | Grantham et al. | |
| 6,105,067 A | 8/2000 | Batra | |
| 6,108,782 A | 8/2000 | Fletcher et al. | |
| 6,112,181 A | 8/2000 | Shear et al. | |
| 6,115,751 A | 9/2000 | Tam et al. | |
| 6,124,844 A | 9/2000 | Ilbery | |
| 6,134,551 A | 10/2000 | Aucsmith | |
| 6,138,176 A | 10/2000 | McDonald et al. | |
| RE36,946 E | 11/2000 | Diffie et al. | |
| 6,147,976 A | 11/2000 | Shand et al. | |
| 6,169,969 B1 | 1/2001 | Cohen | |
| 6,173,276 B1 | 1/2001 | Kant et al. | |
| 6,175,874 B1 | 1/2001 | Imai et al. | |
| 6,205,148 B1 | 3/2001 | Takahashi et al. | |
| 6,216,173 B1 | 4/2001 | Jones et al. | |
| 6,219,786 B1 | 4/2001 | Cunningham et al. | |
| 6,226,676 B1 | 5/2001 | Crump et al. | |
| 6,233,618 B1 | 5/2001 | Shannon | |
| 6,233,684 B1 | 5/2001 | Stefik et al. | |
| 6,237,028 B1 | 5/2001 | Jackson | |
| 6,259,909 B1 * | 7/2001 | Ratayczak et al. | 455/411 |
| 6,263,321 B1 | 7/2001 | Daughtery | |
| 6,279,113 B1 | 8/2001 | Vaidya | |
| 6,317,795 B1 | 11/2001 | Malkin et al. | |
| 6,336,150 B1 | 1/2002 | Ellis et al. | |
| 6,343,324 B1 | 1/2002 | Hubis et al. | |
| 6,363,384 B1 | 3/2002 | Cookmeyer, II et al. | |
| 6,381,242 B1 | 4/2002 | Maher, III et al. | |
| 6,389,532 B1 | 5/2002 | Gupta et al. | |
| 6,397,259 B1 | 5/2002 | Lincke et al. | |
| 6,397,335 B1 | 5/2002 | Franczek et al. | |
| 6,412,000 B1 | 6/2002 | Riddle et al. | |
| 6,430,272 B1 | 8/2002 | Maruyama et al. | |
| 6,456,632 B1 | 9/2002 | Baum et al. | |
| 6,463,474 B1 | 10/2002 | Fuh et al. | |
| 6,535,868 B1 | 3/2003 | Galeazzi et al. | |
| 6,564,263 B1 | 5/2003 | Bergman et al. | |
| 6,578,147 B1 | 6/2003 | Shanklin et al. | |
| 6,628,652 B1 | 9/2003 | Chrin et al. | |
| 6,643,717 B1 * | 11/2003 | Rustad et al. | 710/32 |
| 6,704,816 B1 | 3/2004 | Burke | |
| 6,711,558 B1 | 3/2004 | Indeck et al. | |
| 6,728,929 B1 | 4/2004 | Luong | |
| 6,765,918 B1 | 7/2004 | Dixon et al. | |
| 6,772,345 B1 | 8/2004 | Shetty | |
| 6,775,290 B1 * | 8/2004 | Merchant et al. | 370/395.53 |
| 6,785,677 B1 | 8/2004 | Fritchman | |
| 6,804,667 B1 | 10/2004 | Martin | |
| 6,807,156 B1 | 10/2004 | Veres et al. | |
| 6,850,906 B1 | 2/2005 | Chadha et al. | |
| 6,856,981 B2 | 2/2005 | Wyschogrod et al. | |
| 6,870,837 B2 | 3/2005 | Ho et al. | |
| 6,886,103 B1 | 4/2005 | Brustoloni et al. | |
| 6,931,408 B2 | 8/2005 | Adams et al. | |
| 6,944,168 B2 | 9/2005 | Paatela et al. | |
| 6,981,054 B1 | 12/2005 | Krishna | |
| 7,019,674 B2 | 3/2006 | Cadambi et al. | |
| 7,046,848 B2 | 5/2006 | Olcott | |
| 7,065,475 B1 | 6/2006 | Brundobler | |
| 7,065,482 B2 | 6/2006 | Shorey et al. | |
| 7,093,023 B2 | 8/2006 | Lockwood et al. | |
| 7,103,799 B2 | 9/2006 | Dixon | |
| 7,117,370 B2 | 10/2006 | Khan et al. | |
| 7,127,510 B2 | 10/2006 | Yoda et al. | |
| 7,149,715 B2 | 12/2006 | Browne et al. | |
| 7,181,608 B2 | 2/2007 | Fallon et al. | |

| | | | | | | |
|---|---|---|---|---|---|---|
| 7,191,233 B2 * | 3/2007 | Miller ........................ 709/227 | | 2006/0059064 A1 | 3/2006 | Glinberg et al. |
| 7,251,629 B1 | 7/2007 | Marynowski et al. | | 2006/0059065 A1 | 3/2006 | Glinberg et al. |
| 7,286,564 B2 | 10/2007 | Roberts | | 2006/0059066 A1 | 3/2006 | Glinberg et al. |
| 7,305,383 B1 | 12/2007 | Kubesh et al. | | 2006/0059067 A1 | 3/2006 | Glinberg et al. |
| 7,305,391 B2 | 12/2007 | Wyschogrod et al. | | 2006/0059068 A1 | 3/2006 | Glinberg et al. |
| 7,353,267 B1 * | 4/2008 | Cunningham et al. ....... 709/224 | | 2006/0059069 A1 | 3/2006 | Glinberg et al. |
| 7,363,277 B1 | 4/2008 | Dutta et al. | | 2006/0059083 A1 | 3/2006 | Friesen et al. |
| 7,565,525 B2 | 7/2009 | Vorbach et al. | | 2006/0059099 A1 | 3/2006 | Ronning et al. |
| 2001/0014093 A1 | 8/2001 | Yoda et al. | | 2006/0259417 A1 | 11/2006 | Marynowski et al. |
| 2001/0052038 A1 | 12/2001 | Fallon et al. | | 2006/0294059 A1 | 12/2006 | Chamberlain et al. |
| 2001/0056547 A1 | 12/2001 | Dixon | | 2007/0067108 A1 | 3/2007 | Buhler et al. |
| 2002/0031125 A1 | 3/2002 | Sato | | 2007/0078837 A1 | 4/2007 | Indeck et al. |
| 2002/0069370 A1 | 6/2002 | Mack | | 2007/0118500 A1 | 5/2007 | Indeck et al. |
| 2002/0082967 A1 | 6/2002 | Kaminsky et al. | | 2007/0130140 A1 | 6/2007 | Cytron et al. |
| 2002/0095512 A1 | 7/2002 | Rana et al. | | 2007/0174841 A1 | 7/2007 | Chamberlain et al. |
| 2002/0105911 A1 | 8/2002 | Pruthi et al. | | 2007/0277036 A1 | 11/2007 | Chamberlain et al. |
| 2002/0116508 A1 * | 8/2002 | Khan et al. ................. 709/229 | | 2008/0109413 A1 | 5/2008 | Indeck et al. |
| 2002/0129140 A1 | 9/2002 | Peled et al. | | 2008/0114760 A1 | 5/2008 | Indeck et al. |
| 2002/0138376 A1 | 9/2002 | Hinkle | | 2008/0126320 A1 | 5/2008 | Indeck et al. |
| 2002/0162025 A1 | 10/2002 | Sutton et al. | | 2008/0133453 A1 | 6/2008 | Indeck et al. |
| 2002/0166063 A1 * | 11/2002 | Lachman et al. ............ 713/200 | | 2008/0133519 A1 | 6/2008 | Indeck et al. |
| 2003/0002502 A1 | 1/2003 | Gibson et al. | | | | |
| 2003/0009693 A1 | 1/2003 | Brock et al. | | FOREIGN PATENT DOCUMENTS | | |
| 2003/0014662 A1 | 1/2003 | Gupta et al. | | | | |
| 2003/0018630 A1 | 1/2003 | Indeck et al. | | EP | 0887723 | 12/1998 |
| 2003/0023876 A1 | 1/2003 | Bardsley et al. | | EP | 0911738 A2 | 4/1999 |
| 2003/0033240 A1 | 2/2003 | Balson et al. | | EP | 0 573 991 B1 | 1/2002 |
| 2003/0037037 A1 | 2/2003 | Adams et al. | | EP | 0851358 | 3/2003 |
| 2003/0043805 A1 | 3/2003 | Graham et al. | | JP | 9-269930 | 10/1997 |
| 2003/0051026 A1 | 3/2003 | Wyschogrod et al. | | JP | 10-313341 | 11/1998 |
| 2003/0055658 A1 | 3/2003 | RuDusky | | JP | 2000-357176 | 12/2000 |
| 2003/0055770 A1 | 3/2003 | RuDusky | | JP | 2001-014239 | 1/2001 |
| 2003/0055771 A1 | 3/2003 | RuDusky | | JP | 2001-217834 | 10/2001 |
| 2003/0055777 A1 | 3/2003 | Ginsberg | | JP | 2001-518724 | 10/2001 |
| 2003/0065607 A1 | 4/2003 | Satchwell | | WO | WO 90/10910 A1 | 9/1990 |
| 2003/0065943 A1 | 4/2003 | Geis et al. | | WO | WO 97/37735 | 10/1997 |
| 2003/0074582 A1 | 4/2003 | Patel et al. | | WO | WO 99/05814 A2 | 2/1999 |
| 2003/0093347 A1 | 5/2003 | Gray | | WO | WO 99/55052 A1 | 10/1999 |
| 2003/0110229 A1 | 6/2003 | Kulig et al. | | WO | WO 01/22425 A1 | 3/2001 |
| 2003/0126065 A1 | 7/2003 | Eng et al. | | WO | WO 01/39577 A1 | 6/2001 |
| 2003/0177253 A1 | 9/2003 | Schuehler et al. | | WO | WO 01/61913 A2 | 8/2001 |
| 2003/0208430 A1 | 11/2003 | Gershon | | WO | WO 01/80082 A2 | 10/2001 |
| 2004/0028047 A1 | 2/2004 | Hou et al. | | WO | WO 01/80558 A2 | 10/2001 |
| 2004/0034587 A1 | 2/2004 | Amberson et al. | | WO | WO 02/061525 A3 | 8/2002 |
| 2004/0049596 A1 | 3/2004 | Schuehler et al. | | WO | WO 02/082271 A1 | 10/2002 |
| 2004/0133634 A1 | 7/2004 | Luke et al. | | WO | WO 03/036845 A2 | 5/2003 |
| 2004/0177340 A1 | 9/2004 | Hsu et al. | | WO | WO 03/100662 A2 | 12/2003 |
| 2004/0186804 A1 | 9/2004 | Chakraborty et al. | | WO | WO 2004/017604 A2 | 2/2004 |
| 2004/0186814 A1 | 9/2004 | Chalermkraivuth et al. | | WO | WO 2005/017708 A2 | 2/2005 |
| 2004/0199448 A1 | 10/2004 | Chalermkraivuth et al. | | WO | WO 2005/048134 A2 | 5/2005 |
| 2004/0205149 A1 | 10/2004 | Dillon et al. | | WO | WO 2006/096324 A2 | 9/2006 |
| 2005/0033672 A1 | 2/2005 | Lasry et al. | | WO | WO 2008/022036 A2 | 2/2008 |
| 2005/0086520 A1 | 4/2005 | Dharmapurikar et al. | | | | |
| 2005/0091142 A1 | 4/2005 | Renton et al. | | | | |
| 2005/0097027 A1 | 5/2005 | Kavanaugh | | OTHER PUBLICATIONS | | |
| 2005/0131790 A1 | 6/2005 | Benzschawel et al. | | | | |
| 2005/0187844 A1 | 8/2005 | Chalermkraivuth et al. | | | | |
| 2005/0187845 A1 | 8/2005 | Eklund et al. | | | | |
| 2005/0187846 A1 | 8/2005 | Subbu et al. | | | | |
| 2005/0187847 A1 | 8/2005 | Bonissone et al. | | | | |
| 2005/0187848 A1 | 8/2005 | Bonissone et al. | | | | |
| 2005/0187849 A1 | 8/2005 | Bollapragada et al. | | | | |
| 2005/0195832 A1 | 9/2005 | Dharmapurikar et al. | | | | |
| 2005/0197938 A1 | 9/2005 | Davie et al. | | | | |
| 2005/0197939 A1 | 9/2005 | Davie et al. | | | | |
| 2005/0197948 A1 | 9/2005 | Davie et al. | | | | |
| 2005/0216384 A1 | 9/2005 | Partlow et al. | | | | |
| 2005/0232180 A1 | 10/2005 | Toporek et al. | | | | |
| 2005/0267836 A1 | 12/2005 | Crosthwaite et al. | | | | |
| 2005/0283423 A1 | 12/2005 | Moser et al. | | | | |
| 2006/0020536 A1 | 1/2006 | Renton et al. | | | | |
| 2006/0031154 A1 | 2/2006 | Noviello et al. | | | | |
| 2006/0031156 A1 | 2/2006 | Noviello et al. | | | | |

Agere Systems, "Payload Plus™ Agere System Interface", Agere Systems Product Brief, Jun. 2001, downloaded from Internet, Jan. 2002, Allentown, PA.

Anerousis, Nikos et al., "Using the AT&T Labs Packetscope for Internet Measurement, Design, and Performance Analysis", AT&T Services and Infrastructure Performance Symposium, AT&T Labs-Research, Florham, Park, NJ, Oct. 1997, http://www.net.t-labs.tu-berlin.de/papers/ACDFGKMRR-UPSIMDPA-97.pdf.

Artan, N. Sertec et al., "Multi-packet Signature Detection using Prefix Bloom Filters", IEEE Globecom 2005, pp. 1811-1816.

Baboescu, Florin et al., "Scalable Packet Classification", SIGCOMM'01, pp. 199-210, San Diego, CA, Aug. 21-27, 2001; http://www.ecse.rpi.edu/homepages/shivkuma/teaching/sp2001/readings/baboescu-pkt-classification.pdf.

Baeza-Yates and Navarro, "New and Faster Filters for Multiple Approximate String Matching", Random Structures and Algorithms (RSA), vol. 20, No. 1, Jan. 2002, pp. 23-49.

Berk, Elliot, "JLex: A lexical analyzer generator for Java™", Sep. 6, 2000, downloaded from http://www.cs.princeton.edu/~appel/modem/java/Jlex/ in Jan. 2002.

Bloom, Burton H., "Space/Time Trade-offs in Hash Coding With Allowable Errors", Communications of the ACM, 13(7): 422-426, Computer Usage Company, Newton Upper Falls, Massachusetts, USA, Jul. 1970.

Braun, Florian et al., "Layered Protocol Wrappers for Internet Packet Processing in Reconfigurable Hardware", Proceedings of Hot Interconnects 9 (HotI-9) Stanford, CA, Aug. 22-24, 2001, pp. 93-98.

Choi, Sumi et al., "Design of a Flexible Open Platform for High Performance Active Networks", Allerton Conference, Champaign, IL, 1999.

Cloutier, Jocelyn et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.

Compton, Katherine et al., "Reconfigurable Computing: A Survey of Systems and Software", Technical Report, Northwestern University, IL, 16, Dept. of ECE, 1999.

Cuppu, Vinodh and Jacob, Bruce, "Organizational Design Trade-offs at the DRAM, Memory Bus, and Memory Controller Level: Initial Results," Technical Report UMB-SCA-TR-1999-2, Univ. of Maryland Systems & Computer Architecture Group, pp. 1-10, Nov. 1999, College Park, MD.

Dharmapurikar, Sarang et al., "Longest Prefix Matching Using Bloom Filters," SIGCOMM 2003, pp. 201-212, Karlsruhe, Germany, Aug. 25-29, 2003.

Dharmapurikar, Sarang et al., "Robust TCP Stream Reassembly In the Presence of Adversaries", Proceedings of the 14th Conference on USENIX Security Symposium—vol. 14, 16 pages, Baltimore, MD, 2005. http://www.icir.org/vern/papers/TcpReassembly/TcpReassembly.pdf.

Franklin, R. et al., "Assisting Network Intrusion Detection with Reconfigurable Hardware", Symposium on Field-Programmable Custom Computing Machines (FCCM 2002), Apr. 2002, Napa, California.

Fu, Henry et al., "The FPX KCPSM Module: An Embedded, Reconfigurable Active Processing Module for the Field Programmable Port Extender (FPX)", Washington University, Department of Computer Science, Technical Report WUCS-01-74, Jul. 26, 2001, St. Louis, MO.

Gupta, Pankaj and McKeown, Nick, "Packet Classification on Multiple Fields", Computer Systems Laboratory, Stanford University, Stanford, CA, http://yuba.stanford.edu/~pankaj/paps/sig99.pdf, and Computer Communication Review, a publication of ACM SIGCOMM, vol. 29, No. 4, Oct. 1999.

Gurtov, Andrei, "Effect of Delays on TCP Performance", Cellular Systems Development, Sonera Corporation, online at http://www.cs.helsinki.fi/u/gurtov/papers/pwc01.pdf.

Hauck, Scott and Agarwal, Anant, "Software Technologies for Reconfigurable Systems", Northwestern University, IL, Dept. of ECE, Technical Report, pp. 1-40, 1996.

Hollaar, Lee A., "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.

Jacobson, V. et al., "RFC 1072: TCP Extensions for Long-Delay Paths", Network Working Group, Oct. 1988, online at http://www.faqs.org/ftp/rfc/pdf/rfc1072.txt.pdf.

Jacobson, Van et al., "tcpdump—dump traffic on a network" Jun. 30, 1997, online at www.cse.cuhk.edu.hk/~cslui/CEG4430/tcpdump.ps.gz.

Keutzer, Kurt & Shah, Niraj, "A Survey of Programmable Platforms—Network Proc", University of California-Berkeley, CA, Sep. 2001, Berkeley, CA.

Lockwood, John & Lim, David, "Hello, World: A Simple Application for the Field-programmable Port Extender (FPX)", Washington University, Department of Computer Science, Technical Report WUCS-TM-00-12, Jul. 11, 2000, St. Louis, MO.

Lockwood, John W., "Simulation of the Hello World Application for the Field-programmable Port Extender (FPX)", Washington University, Applied Research Lab, Spring 2001 Gigabits Kits Workshop, St. Louis, MO.

Lockwood, John, "Field-programmable Port Extender (FPX)", Jan. 2002 Workshop, Washington University, St. Louis, MO, Jan. 3-4, 2002. (slides and handouts from workshop).

Lockwood, John W. et al., "Field Programmable Port Extender (FPX) for Distributed Routing and Queuing", ACM International Symposium on Field Programmable Gate Arrays (FPGA '2000), Monterey, CA, Feb. 2000, pp. 137-144.

Lockwood, John et al., "Parallel FPGA Programming over Backplane Chassis", Washington University, Department of Computer Science, Technical Report WUCS-OO-I I, Jun. 12, 2000, St. Louis, MO.

Lockwood, John W. et al., "Reprogrammable Network Packet Processing on the Field Programmable Port Extender (FPX)", ACM International Symposium on Field Programmable Gate Arrays (FPGA 2001), Monterey, CA, Feb. 11-13, 2001, pp. 87-93.

Lockwood, John W., "An Open Platform for Development of Network Processing Modules in Reprogrammable Hardware", IEC Designcon 2001, Santa Clara, CA, Jan. 2001, Paper WB-19.

Lockwood, John W., "Evolvable Internet Hardware Platforms", NASA DoD Workshop on Evolvable Hardware (EHWOI), Long Beach, CA, Jul. 12-14, 2001, pp. 271-279.

Lockwood, John W., "Platform and Methodology for Teaching Design of Hardware Modules in Internet Routers and Firewalls", IEEE Computer Society International Conference on Microelectronic Systems Education (MSE 2OOI), Las Vegas, NV, Jun. 17-18, 2001, pp. 56-57.

Lucent, "Lucent Technologies delivers PayloadPlus network processors for programmable, multi-protocol, OC-48c processing", Lucent Technologies Press Release, downloaded from http:/lwww.lucent.com/press/1000/0010320.meb.html on Mar. 21, 2002.

Moscola, James M. et al., "FPGrep and FPSed: Regular Expression Search and Substitution for Packet Streaming in Field Programmable Hardware", Dept. of Computer Science, Applied Research Lab, Washington University, St. Louis, MO, Jan. 8, 2002.

Moscola, James, "FPgrep and FPsed: Packet Payload Processors for Managing the Flow of Digital Content on Local Area Networks and the Internet", Masters Thesis, Sever Institute of Technology, Washington University, St. Louis, Missouri, Aug. 2003.

Moscola, James et al. "FPsed: A Streaming Content Search-and-Replace Module for an Internet Firewall", Proceedings of Hot Interconnects, 11th Symposium on High Performance Interconnects, pp. 122-129, Aug. 20, 2003.

Navarro, Gonzalo, "A Guided Tour to Approximate String Matching", ACM Computing Surveys, vol. 33, No. 1, Mar. 2001, pp. 31-88, and online at http://security.riit.tsinghua.edu.cn/seminar/2006_3_9/2001-A_Guided_Tour_to_Approximate_String_Matching.pdf.

Necker, Marc et al., "TCP-Stream Reassembly and State Tracking in Hardware" School of Electrical and Computer Engineering, Georgia Institute of Technology, Atlanta, GA, Proceedings of the 10th Annual IEEE Symposium on Field-Programmable Custom Computing Machines 2002, and online at: http://csdl2.computer.org/comp/proceedings/fccm/2002/1801/00/18010286.pdf.

Prakash, Amit et al., "OC-3072 Packet Classification Using BDDs and Pipelined SRAMs", Department of Electrical and Computer Engineering, The University of Texas at Austin, and online at http://users.ece.utexas.edu/~adnan/publications/prakash-hoti-01.pdf.

Pramanik, Sakti et al., "A Hardware Pattern Matching Algorithm on a Dataflow", The Computer Journal, Jul. 1, 1985, pp. 264-269, vol. 28, No. 3, Oxford University Press, London, Great Britain.

RFC793: Transmission Control Protocol, DARPA Internet Program, Protocol Specification, Sep. 1981, online at http://www.faqs.org/ftp/rfc/pdf/rfc793.txt.pdf.

Schuehler, David V. et al., "Architecture for a Hardware Based, TCP/IP Content Scanning System", IEEE Micro, 24(1):62-69, Jan.-Feb. 2004, U.S.A.

Schuehler, David V. et al., "TCP-Splitter: A TCP/IP Flow Monitor in Reconfigurable Hardware", Hot Interconnects 10 (HotI-10), Stanford, CA, Aug. 21-23, 2002, pp. 127-131.

Shah, Niraj, "Understanding Network Processors", Version 1.0, University of California-Berkeley, Sep. 4, 2001, Berkeley, CA.

Sidhu, Reetinder et al., "Fast Regular Expression Matching using FPGAs", IEEE Symposium on Field Programmable Custom Computing Machines (FCCM 2001), Apr. 2001.

Sidhu, Reetinder et al., "String Matching on Multicontext FPGAs using Self-Reconfiguration", FPGA '99: Proceedings of the 1999 ACMISIGDA 7th International Symposium on Field Programmable Gate Arrays, Feb. 1999, pp. 217-226, Monterey, CA.

Taylor, David E. et al., "Dynamic Hardware Plugins (DHP): Exploiting Reconfiguarable Hardware for High-Performance Programmable Routers", Computer Networks, 38(3): 295-310(16), Feb. 21, 2002, and online at http://www.cc.gatech.edu/classes/AY2007/cs8803hpc_fall/papers/dhplugins.pdf.

Taylor, David E. et al., "Generalized RAD Module Interface Specification of the Field Programmable Port Extender (FPX) Version 2.0", Washington University, Department of Computer Science, Technical Report, WUCS-TM-01-15, Jul. 5, 2001, St. Louis, MO.

Yamaguchi et al., High Speed Homology Search with FPGAs, Proceedings of the Pacific Symposium on Biocomputing, Lihue, Hawaii, 7:271-282, Jan. 3, 2002, and online at: http://psb.stanford.edu/psb-online/proceedings/psb02/yamaguchi.pdf.

Yan, Jeff et al., "Enhancing Collaborative Spam Detection with Bloom Filters", Proceedings of the 22nd Annual Computer Security Applications Conference (ACSAC '06), IEEE, pp. 414-425, 2006.

European Patent Office, Supplementary European Search Report completed on Dec. 15, 2008 in EP 02782178.4, Rijswijk, Netherlands, mailed Dec. 22, 2008.

Altschul, Stephen F., "Basic Local Alignment Search Tool", *Journal of Molecular Biology*, 215(3):403-410, Oct. 5, 1990.

Cavnar, William B. et al., "N-Gram-Based Text Categorization", *Proceedings of SDAIR-94, 3rd Annual Symposium on Document Analysis and Information Retrieval*, Las Vegas, pp. 161-175, 1994.

Forgy, Charles L., "Rete: A Fast Algorithm for the Many Pattern/Many Object Pattern Match Problem", *Artificial Intelligence*, 19:17-37, 1982, Noth Holland.

Hoinville, Jay R. et al., "Spatial Noise Phenomena of Longitudinal Magnetic Recording Media", *IEEE Transactions on Magnetics*, vol. 28, No. 6, Nov. 1992, New York, NY.

Jeanmougin, François et al., "Multiple sequence alignment with Clustal X", *Trends in Biochemical Sciences*, 23(10): 403-405, Oct. 1, 1998, Elsevier Science Ltd.

Jones, K. Sparck et al., "A probabilistic model of information retrieval: development and status", *Information Processing and Management*, 36(6):779-840, Cambridge, UK, Aug. 1998.

Jung, Bongjin et al., "Efficient VLSI for Lempel-Ziv Compression in Wireless Data Communication Networks", *IEEE Transactions on VLSI Systems*, 6(3):475-483, Sep. 1998, Institute of Electrical and Electronics Engineers, Washington, DC.

Pirsch, Peter, et al., "VLSI Architectures for Video Compression-A Survey", *Proceedings of the IEEE*, 83(2):220-246, Feb. 1995, Institute of Electrical and Electronics Engineers, Washington, DC.

Ranganathan, N. et al., "High-speed VLSI Designs for Lempe-Ziv-Based Data Compression", *IEEE Transactions on Circuits and Systems II: Analog and Digital Signal Processing*, 40(2):96-106, Feb. 1993, Institute of Electrical and Electronics Engineers, Washington, DC.

Ratha, Nalini K. et al., "FPGA-based coprocessor for text string extraction", *Proceedings, Fifth IEEE International Workshop on Computer Architectures for Machine Perception*, Padova, Italy, Sep. 11-13, 2000, pp. 217-221.

Roesch, Martin, "Snort—Lightweight Intrusion Detection for Networks", *Proceedings of LISA '99*: 13th Systems Administration Conference, pp. 229-238, Seattle, WA, Nov. 7-12, 1999.

Roy, Kaushik, "A Bounded Search Algorithm for Segmented Channel Routing for FPGA'S and Associated Channel Architecture Issues", *IEEE Transactions on Computer-Aided Design of Integrated Circuits and Systems*, 12(11):1695-1705, Nov. 1993.

Thompson, Julie D. et al., "The CLUSTAL_X windows interface: flexible strategies for multiple sequence alignment aided by quality analysis tools", *Nucleic Acids Research*, 25(24):4876-4882, Dec. 15, 1997; revised and accepted Oct. 28, 1997.

"Data Encryption Standard (DES)"; Reaffirmed Oct. 25, 1999; U.S. Dept of Commerce/Nat'l Institute of Standards and Technology, Federal Information Processing Standards Publication FIPS Pub 46-3; retrieved from website: http://csrc.nist.gov/publications/fips/fips46-3/fips46-3.pdf.

Chodowiec, Pawel et al.; "Fast implementations of secret-key block ciphers using mixed inner and outer-round pipelining"; Feb. 11-13, 2001; ACM SIGDA International Symposium on Field Programmable Gate Arrays, FPGA '01, Monterey, CA.

Compton, Katherine et al.; "Configurable Computing: A Survey of Systems and Software"; 1999; Northwestern University, Dept. of ECE, Technical Report, XP002315148, Evanston, Illinois.

Denoyer, Ludovic et al.; "HMM-based Passage Models for Document Classification and Ranking"; Mar. 16, 2001; 23rd BCS European Annual Colloquium on Information Retrieval, Darmstadt, Germany.

Guerdoux-Jamet et al.; "Systolic Filter for Fast DNA Similarity Search"; Jul. 1995; IEEE International Conference on Application-Specific Array Processors, pp. 145-156, Strasbourg, France.

Steinbach, Michael et al.; "A Comparison of Document Clustering Techniques"; Aug. 2000; ACM SIGKDD International Conference on Discovery and Data Mining; Boston, MA, USA, pp. 1-20.

Ziv, Jacob et al.; "A Universal Algorithm for Sequential Data Compression"; May 1977; IEEE Transactions on Information Theory, vol. IT-23, No. 3, pp. 337-343.

Ziv, Jacob et al.; "Compression of Individual Sequences via Variable-Rate Coding"; Sep. 1978; IEEE Transactions on Information Theory, vol. IT-24, No. 5, pp. 530-536.

Patent Cooperation Treaty, International Search Report for PCT/US2008/065955, Mailed Aug. 22, 2008.

Patent Cooperation Treaty, International Search Report for PCT/US2008/066929, Mailed Aug. 29, 2008.

Patent Cooperation Treaty, International Search Report for PCT/US2007/075723, Mailed Jul. 25, 2008.

Patent Cooperation Treaty, International Search Report for PCT/US2007/067319, Mailed Jan. 11, 2008.

Patent Cooperation Treaty, International Preliminary Report on Patentability, for PCT/US03/25123, Mailed May 5, 2009.

Cong, et al.; "An Optimal Technology Mapping Algorithm for Delay Optimization in Lookup-Table Based FPGA Designs"; 1992; IEEE, pp. 48-53.

Anonymous, "Method for Allocating Computer Disk Space to a File of Known Size", *IBM Technical Disclosure Bulletin*, vol. 27, No. 10B, New York, NY, Mar. 1, 1985.

Arnold, Jeffrey et al., "The Splash 2 Processor and Applications", *Proceedings 1993 IEEE International Conference on Computer Design: VLSI in Computers and Processors*, Oct. 3, 1993, pp. 482-485, Cambridge, Massachusetts.

Baer, Jean-Loup, *Computer Systems Architecture*, pp. 262-265, Computer Science Press, Rockville, MD, 1980.

Barone-Asesi, G. & Whaley, R., "Efficient Analytic Approximation of American Option Values", *Journal of Finance*, 42(2): 301-320, Jun. 1987.

Bossardt, Matthias et al., "ABR Architecture and Simulation for an Input-Buffered and Per-VC Queued ATM Switch", *IEEE Global Telecommunications Conference (Globecom'98)*, pp. 1817-1822, Sydney, Australia, Nov. 1998.

Braun, Florian et al., "Layered Protocol Wrappers for Internet Packet Processing in Reconfigurable Hardware", Washington University, Department of Computer Science, Technical Report WUCS-01-10, Jul. 2001, *Proceedings of Hot Interconnects 9 (HotI-9)*, Stanford, CA, Aug. 22-24, 2001, pp. 93-98.

Chaney, Tom et al., "Design of a Gigabit ATM Switch", *Proceedings IEEE*, 1:2-11, *Infocom '97, Sixteenth Annual Joint Conference of the IEEE Computer and Communications Societies*, Apr. 7-11, 1997, Kobe, Japan.

Choi, Sumi et al., "Design of a Flexible Open Platform for High Performance Active Networks", (Presentation Slides) Allerton Conference, Champaign, IL, 1999.

Cong, Jason & Ding, Yuzheng, "An Optimal Technology Mapping Algorithm for Delay Optimization in Lookup-Table Based FPGA Designs", *IEEE/ACM International Conference on Computer-Aided Design*, Santa Clara, CA, Digest of Technical Papers., pp. 48-53, Nov. 8, 1992.

Dharmapurikar, Sarang et al., "Synthesizable Design of a Multi-Module Memory Controller", Washington University, Dept. of Computer Science, *Technical Report WUCS-01-26*, Oct. 12, 2001.

Duan, Haoran et al., "A High-performance OC-12/OC-48 Queue Design Prototype for Input-buffered ATM Switches", *IEEE Infocom '97*, pp. 20-28, Kobe, Japan, Apr. 7-11, 1997.

Ebeling, Carl et al., "RaPiD—Reconfigurable Pipelined Datapath", *FPL '96: The 6th International Workshop on Field Programmable Logic and Applications*, Springer-Verlag, University of Washington, Dept. of Computer Science and Engineering, Sep. 23, 1996, Seattle, WA.

Feldmann, Anja, "BLT: Bi-Layer Tracing of HTTP and TCP/IP", *Computer Networks* 33(1):321-335, Jun. 2000.

Gavrila, D.M., "Multi-feature Hierarchical Template Matching Using Distance Transforms", *Proceedings of the 14th International Conference on Pattern Recognition*, 1:439-444, Brisbane, Qld., AU, Aug. 16-20, 1998.

Gunther, Bernhard et al., "Assessing Document Relevance with Run-Time Reconfigurable Machines", *IEEE*, pp. 10-17, *Proceedings, IEEE Symposium on FPGAs for Custom Computing Machines*, Napa Valley, CA, Apr. 17, 1996.

Hayes, John P., *Computer Architecture and Organization*, Second Edition, 1988, pp. 448-459, McGraw-Hill, Inc., New York, NY, 1988.

Horta, Edson L. et al., "PARBIT: A Tool to Transform Bitfiles to Implement Partial Reconfiguration of Field Programmable Gate Arrays (FPGAs)", Washington University, Department of Computer Science, Technical Report WUCS-01-13, Jul. 6, 2001.

Kuhns, Fred et al., "Implementation of an Open Multi-Service Router", Washington University, Department of Computer Science, Technical Report WUCS-01-20, Aug. 15, 2001.

Lin, Ting-Pang et al., "Real-Time Image Template Matching Based on Systolic Amy Processor", *International Journal of Electronics*, Dec. 1, 1992, pp. 11651 176, vol. 73, No. 6, London, Great Britain.

Lockwood, John W., Project History and Previous Research on the Illinois Input Queue and WUGS/iiQueue Integration, Aug. 1998.

Lockwood, John W., Quality of Service Enhancement of Washington University Gigabit Switch Using the Illinois Input Queue, Dec. 1996, Urbana and Champaign, IL.

Lockwood, John William, "Design and Implementation of a Multicast, Input-Buffered ATM Switch for the iPOINT Testbed", PhD Dissertation, Department of Electrical and Computer Engineering, University of Illinois at Urbana-Champaign, UMI No. 9625160, 1995.

Mosanya, Emeka et at., "A FPGA-Based Hardware Implementation of Generalized Profile Search Using Online Arithmetic", ACMISIGDA *International Symposium on Field Programmable Gate Arrays*, Feb. 21, 1999, pp. 101-111, Monterey, California.

Nunez, Jose Louis et al., "The X-MatchLITE FPGA-Based Data Compressor", *Euromicro Conference 1999, Proceedings*, Italy, Sep. 8-10, 1999, Los Alamitos. CA.

Ramakrishna, M.V. et al., "A Performance Study of Hashing Functions for Hardware Applications", *Journal of Computing and Information*, vol. 1, No. 1, May 1994, pp. 1621-1636.

Ramakrishna, M.V. et al., "Efficient Hardware Hashing Functions for High Performance Computers", IEEE Transactions on Computers 46(12):1378-1381, Dec. 1997.

Ratha, Nalini K., et al., "Convolution on Splash 2", *Proceedings of IEEE Symposium on FPGAs for Custom Computing Machines*, pp. 204-213, Los Alamitos, California, Apr. 19, 1995.

Rehman, Rafeeq Ur, HP-Certified HP-UX System Administration, Prentice Hall PTR, Indianapolis, IN, May 31, 2000, from: http://proquest.safaribooksonline.com/0130183741.

Roberts, Lawrence, "Internet Still Growing Dramatically Says Internet Founder", *Press Release, Caspian Networks, Inc.*—Virtual Pressroom, PR Newswire, New York, NY, Aug. 15, 2001.

Schmit, Herman, "Incremental Reconfiguration for Pipelined Applications", IEEE, 47-55, Proceedings of the 5th Annual IEEE Symposium on FPGAs for Custom Computing Machines, Apr. 1997, Dept. of ECE. Carnegie Mellon University, Pittsburgh, PA.

Shirazi, N. et al., "Quantitative Analysis of FPGA-Based Database Searching", *Journal of VLSI Signal Processing Systems for Signal, Image, and Video Technology*, May 2001, pp. 8596, vol. 28, No. 112, Dordrecht, Netherlands.

Taylor, David et al., "Scalable IP Lookup for Programmable Routers", Washington University, Department of Computer Science, *Technical Report WUCS-01-33*, Oct. 1, 2001.

Villasenor, John et al., "Configurable Computing Solutions for Automatic Target Recognition", Proceedings of IEEE Symposium on FPGAs for Custom Computing Machines, Apr. 17, 1996, pp. 70-79, Los Alamitos, California.

Wooster, et al., "HTTPDUMP Network HTTP Packet Snooper", Apr. 25, 1996, available at http://ei.cs.vt.edu/~succeed/96httpdump/html/paper.html.

ANSI X9.52-1998; "Triple Data Encryption Algorithm Modes of Operation"; approved: Jul. 29, 1998; American National Standards Institute.

Ramesh, et al.; "Automatic Selection of Tuning Parameters for Feature Extraction Sequences"; Jun. 21-23, 1994; IEEE; pp. 672-677; USA.

Niewczas, et al.; "A Pattern Matching Algorithm for Verification and Analysis of Very Large IC Layouts"; Apr. 6-8, 1998; ACM; pp. 129-143; Monterey, California.

Federal Information Processing Standard 46-2, "Data Encryption Standard", Dec. 30, 1993, National Bureau of Standards, pp. 1-15, U.S.A.

Mitzenmacher, Michael; "Compressed Bloom Filters"; published Oct. 2002 (manuscript received Aug. 1, 2001 and revised Dec. 5, 2001); IEEE/ACM Transactions on Networking, vol. 10, No. 5, pp. 604-612, U.S.A.

Fernandez, X.; "Template Matching of Binary Targets in Grey-Scale Images: A Nonparametric Approach"; Pattern Recognition, vol. 30, No. 7, pp. 1175-1182, 1997, Great Britain.

* cited by examiner

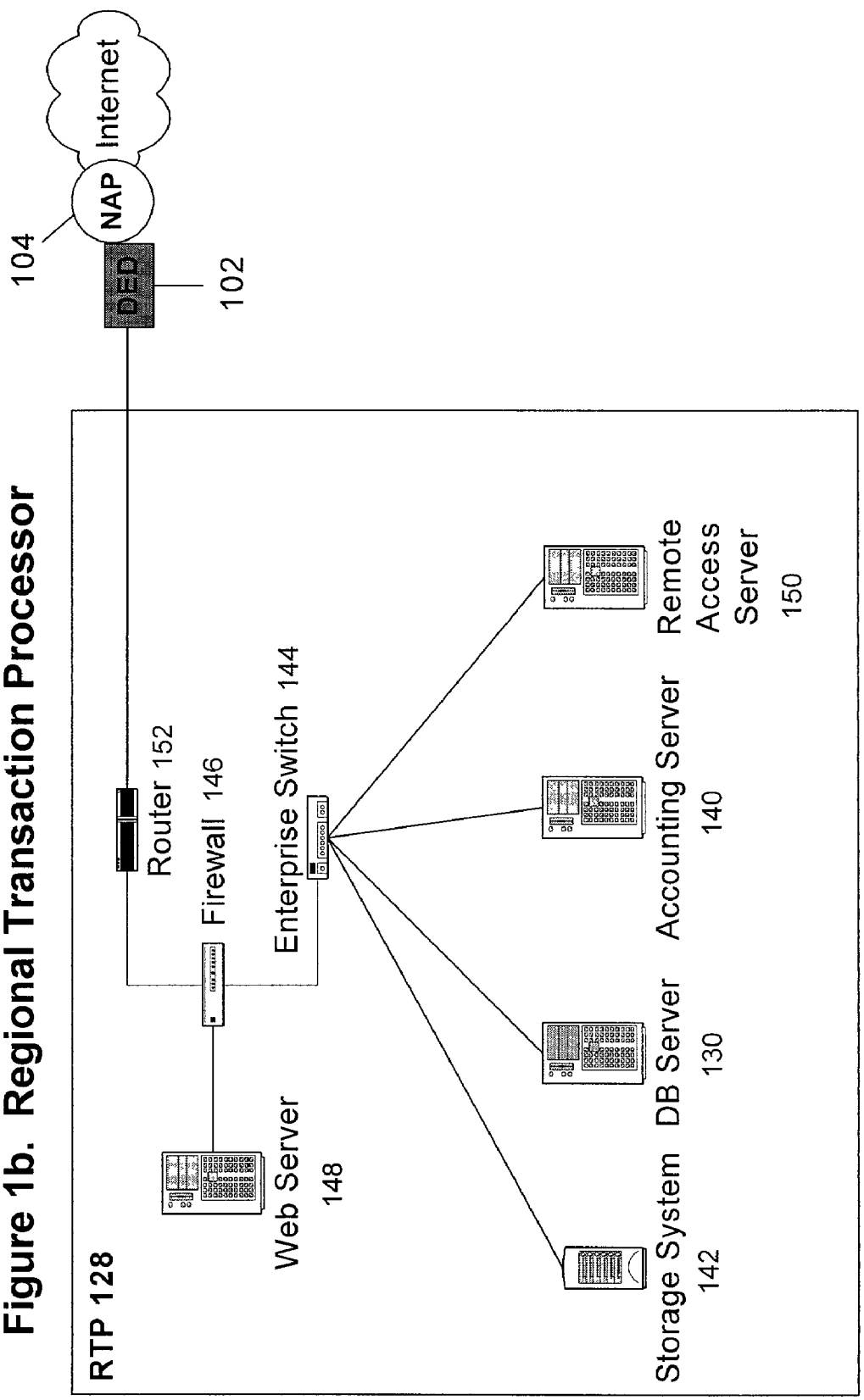

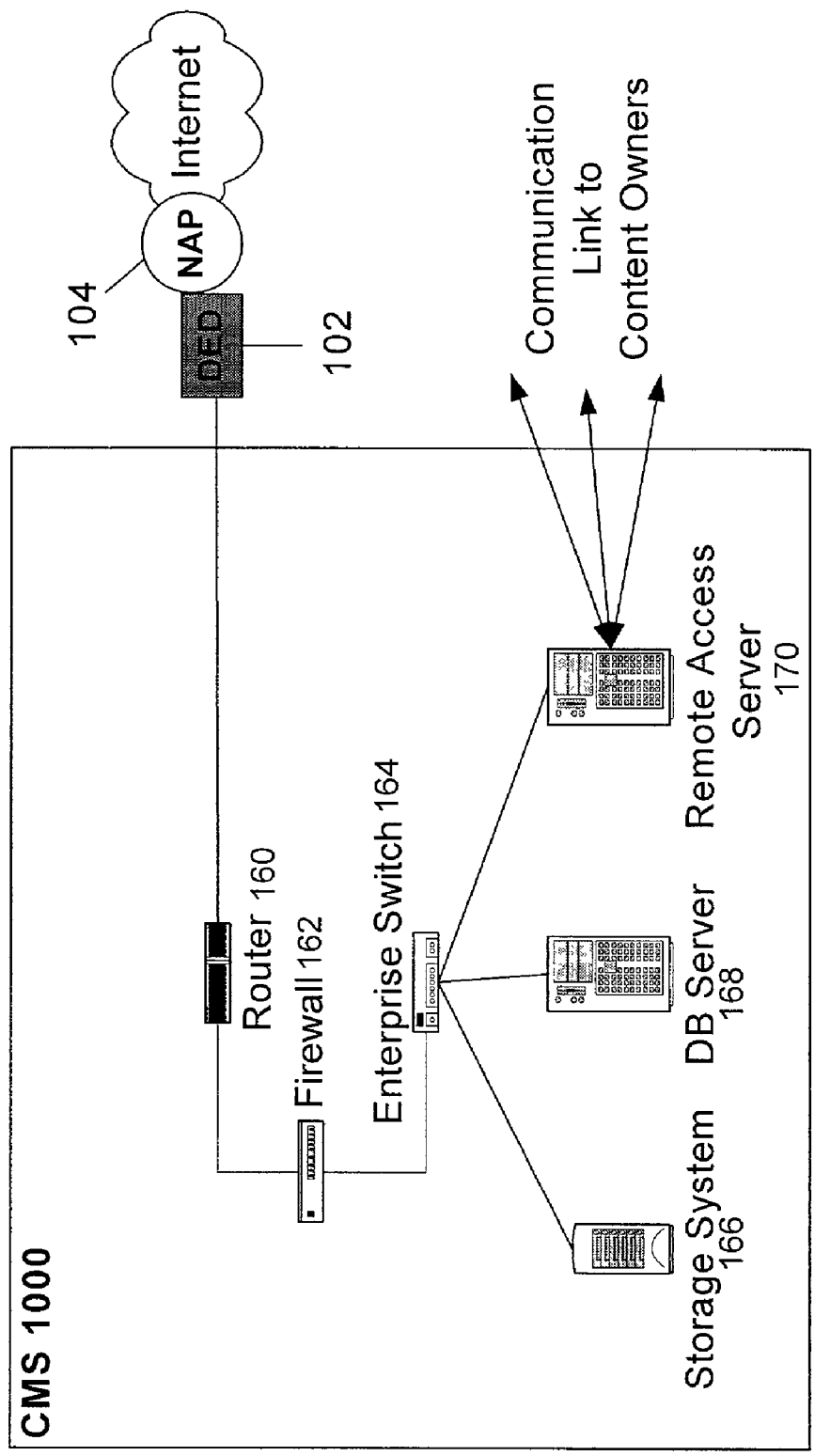
Figure 1c. Content Matching Server

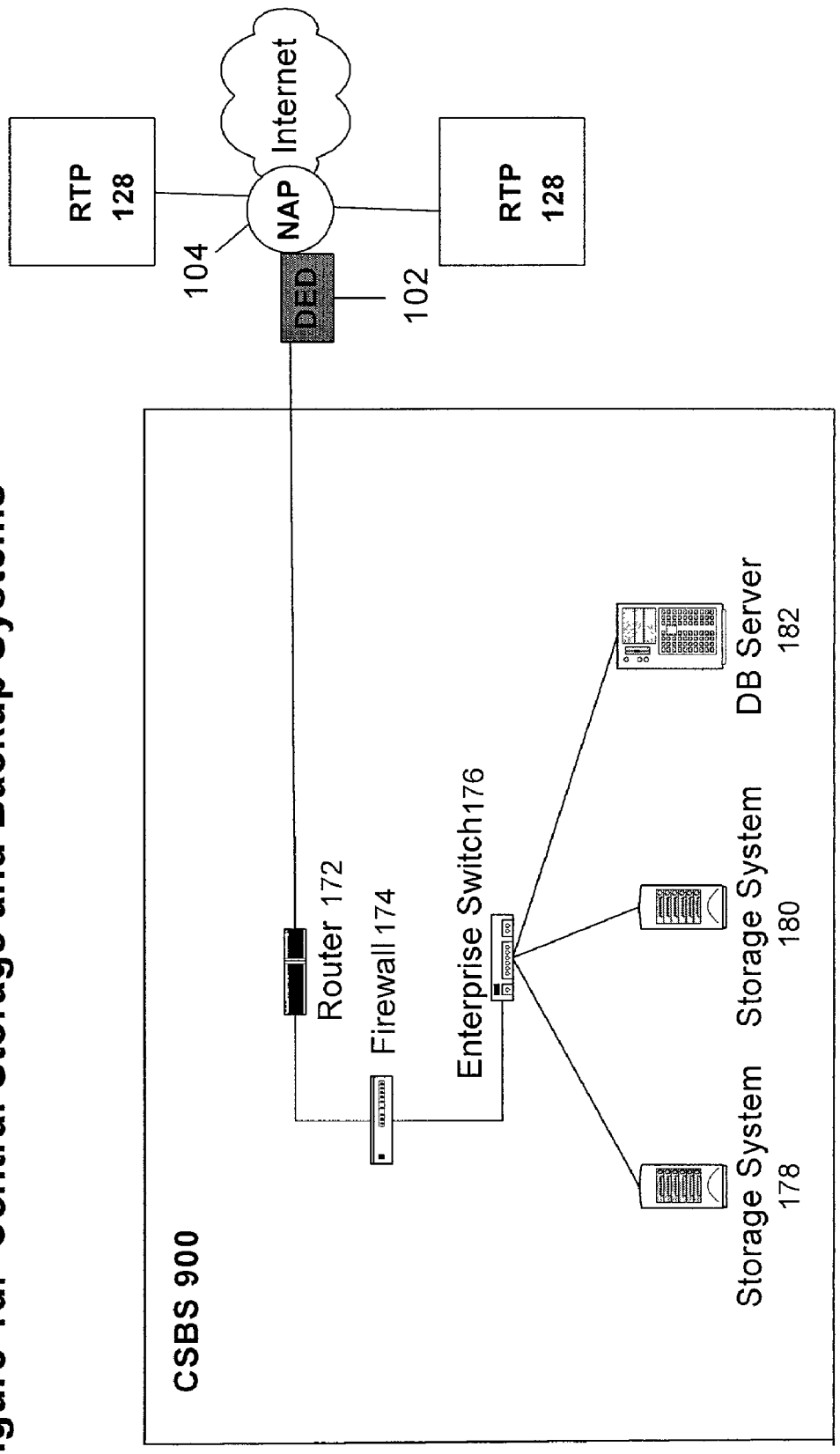
Figure 1d. Central Storage and Backup Systems

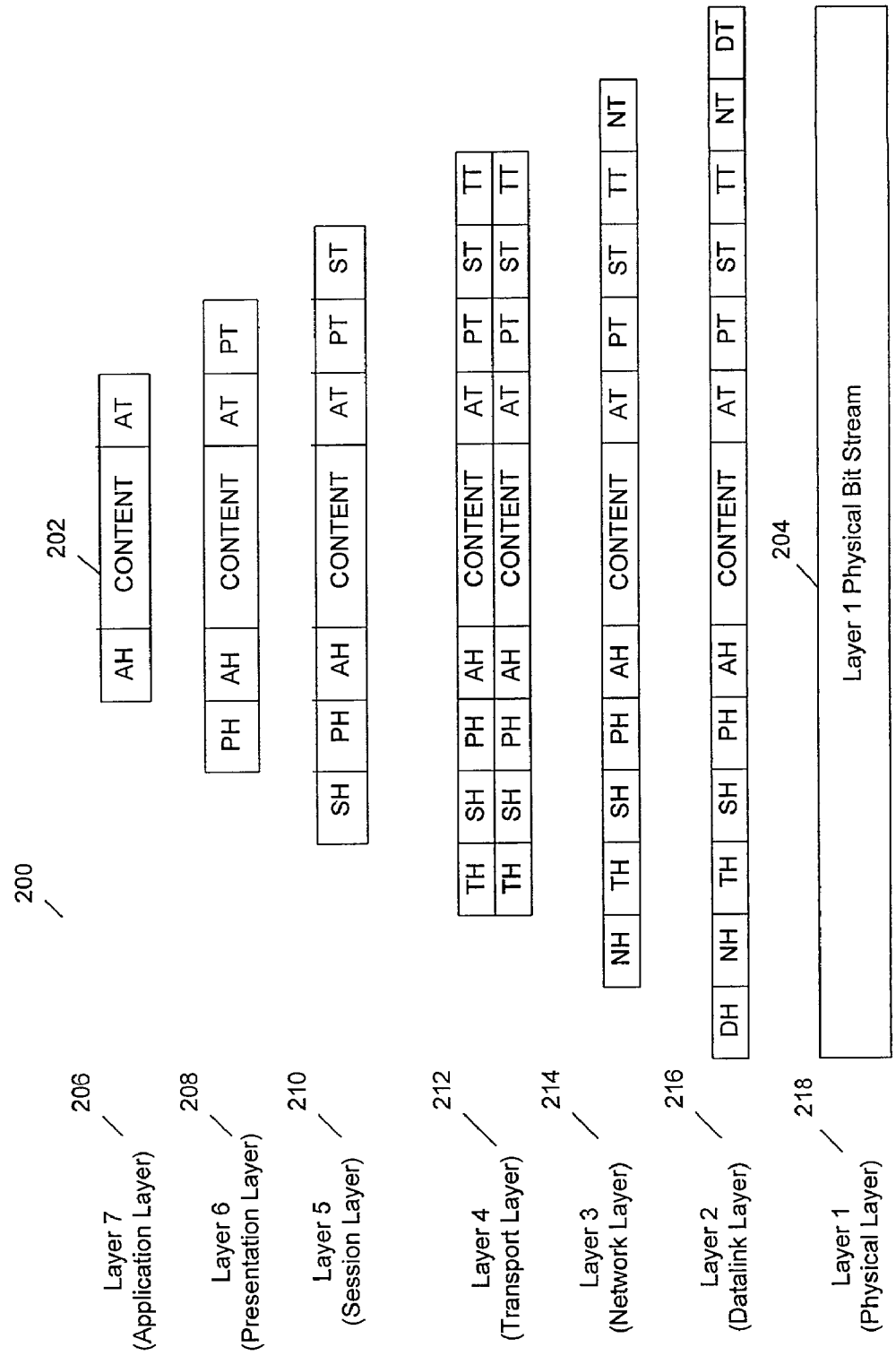

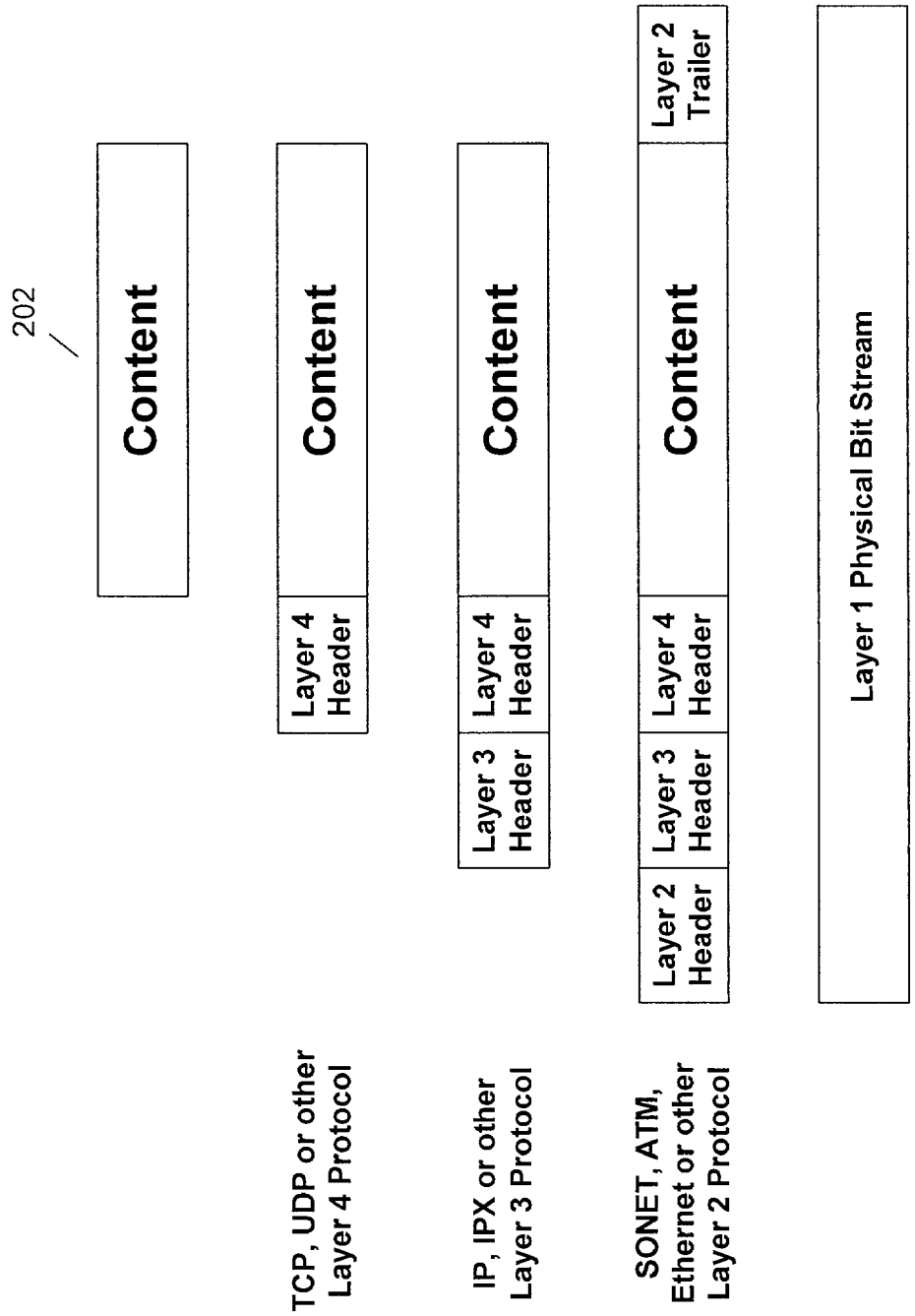
Figure 2b. Layered Data Encapsulation Process

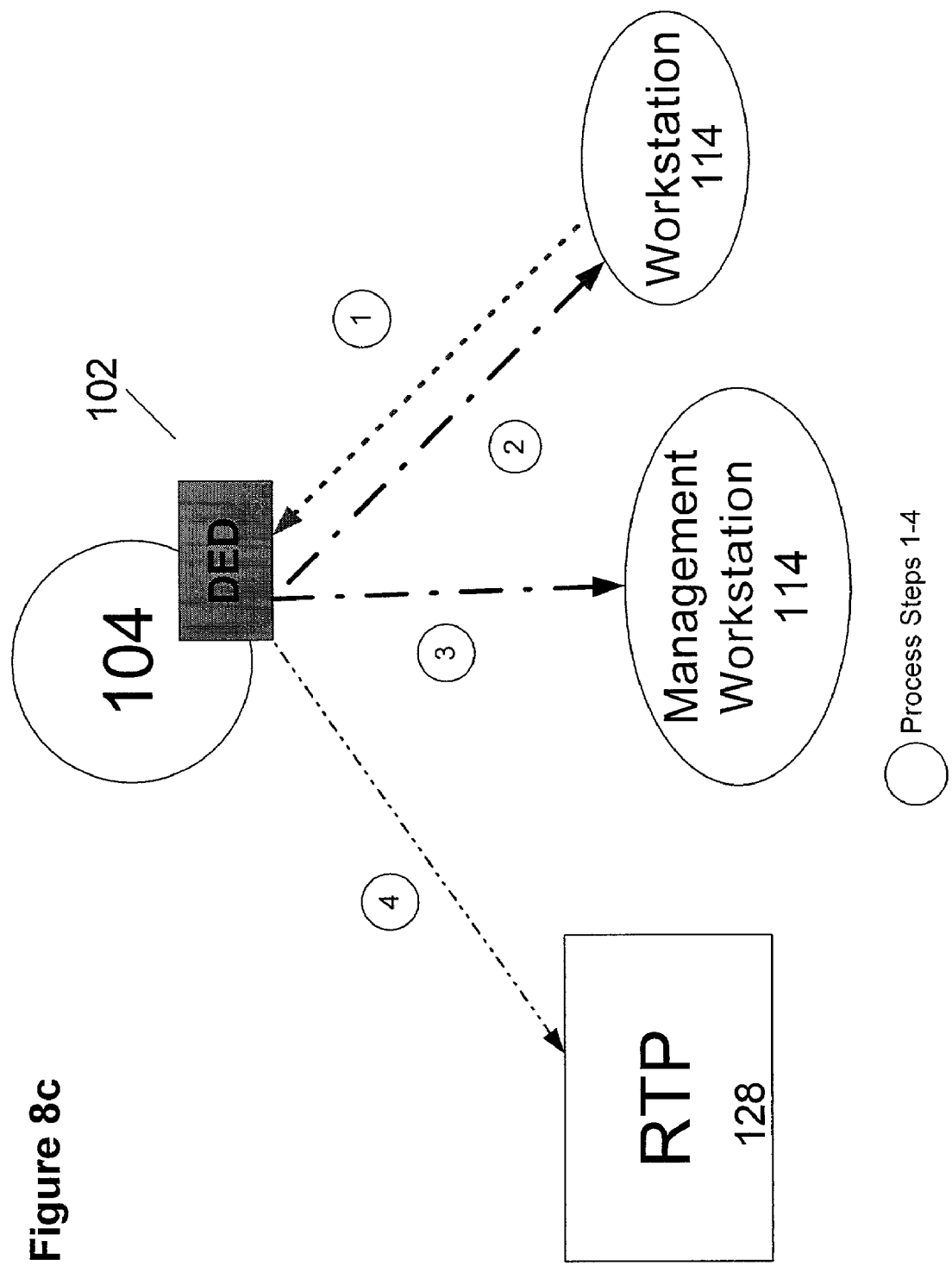

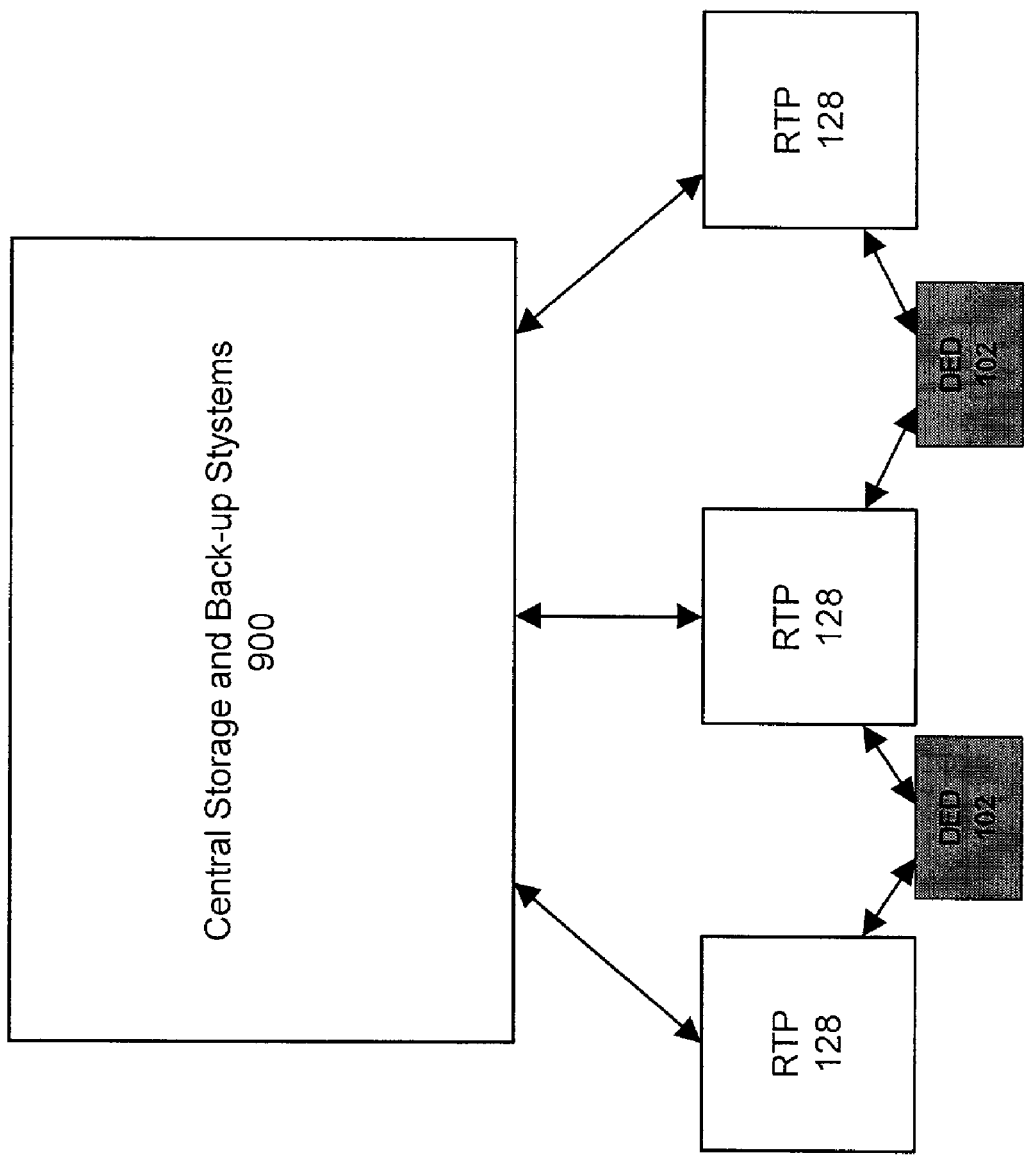

SYSTEM AND METHOD FOR CONTROLLING TRANSMISSION OF DATA PACKETS OVER AN INFORMATION NETWORK

BACKGROUND OF THE INVENTION

Description of the Related Art

Information can be transmitted faster and more easily than ever since the advent of the computerized information networks, such as the Internet. Facsimile machines, computers, and electronic appliances such as personal digital assistants (PDAs) and wireless telephones with Internet access enable the quick transfer of information to remote locations around the world.

The capability to quickly and easily transfer information does, however, have certain drawbacks. Information in digital form, while readily transferable, may also be accessed by more entities than ever before, including those who are not intended to be recipients. Copyrighted digital content can often be illegally sent from point A to point B without being detected, files can be corrupted or infected with viruses that can shut down recipients' computers, and confidential information can be transmitted or posted on publicly accessible network sites. For these reasons, electronic content providers, businesses, and individual users are increasingly concerned with copyright protection, virus protection, and security issues.

Commercial content providers are concerned with the prevalent copying without compensation of digital content, such as compact disks (CDs), electronic books, digital movies, and digital video disks (DVDs). Individual content users often are at cross purposes with content providers, desiring unauthorized copying of content, including digital music, software programs, movies, digital books, images and the like. Content creators, who desire as wide an audience as possible, often are torn between dissemination goals and compensation goals.

The Internet Backbone provides the major interconnections between disparate networks and includes the following components:

Network service providers (NSP) which operate the networks that route packets of data from point to point. A NSP offers National/International interconnecting Internet services to internet service providers (ISPs) through network access points (NAPs).

Long Distance Carriers (telephone) provide a national network of communication channels for the Internet as well as other long distance voice and data communication needs. In general, the NAP contracts with a Long Distance Carrier for the channels needed for their backbone.

Network Access Points (NAPs) provide for the exchange of packets between networks operated by the Network Service Providers.

Primary National Service Providers collectively operate what is often referred to as the Public Internet Backbone. Each Primary National Service Provider operates one or more Wide Area Networks, typically using either Frame Relay and/or asynchronous transfer mode (ATM) architectures on a national basis. Local ISPs typically use these Primary National Service Providers as their interface point to the Internet Backbone.

Primary National Service Providers and National Internet Service Providers exchange packets at Network Access Points. The routers used by a backbone provider use Border Gateway Protocol (BGP) to dynamically learn routes. When the owner of an IP address changes ISP providers, it announces its new provider to the rest of the world using BGP, which causes the world's routers to adjust their routing tables to account for the change.

Point of Purchase (POP) locations of digital content currently reside within the workstation networks of digital content suppliers and Internet retailers. Network Access Points (NAPs), such as network service providers, currently do not have the ability to control or charge for the re-transmittal of digital content.

Outside of digital content workstations or supplier systems, Federal, State and local governments currently do not have the ability to identify potentially taxable transactions, such as the transmission of digital content for sale between a content provider and a user, or retail purchases. Similarly, there currently are no systems to impose, track, and protect taxation of identified digital content on a state, or local level for point-to-point transfers between non-authorized suppliers of digital content.

There currently are numerous methods used to identify and protect digital content between suppliers and users, but each method has limitations.

One method of protecting information uses watermark technology, which marks rendered works, including text, digital pictures, and digital audio with information that identifies the work or the publisher. The human eye can read some types of watermarks, while other types can be read only electronically.

Another known security technique uses fingerprint technology. The term fingerprint is sometimes used in contrast with watermarks to form a message digest of the document. Fingerprinting is typically accomplished using one of a number of types of hash functions. A common hash function is the one-way hash function that provides a fixed-length hash value, h, after operating on an arbitrary-length pre-image message. The h is unique to the message associated with it. However, the security of the h depends on the number of bits of the hash. A practical size is 128. There are a number of different types of hashing algorithms, including the Message Digest (MD) 4 algorithm, and the MD5 algorithm, which is more complex than the MD4 algorithm. Another type of hash function is the n-hash algorithm, which implements a random function hashing and logical exclusive OR functions.

Another aspect of the security of electronic content pertains to Digital Rights Management (DRM). DRM entails establishing and managing rights and permissions for digital content and supports distribution of digital content. DRM can be used for digital distribution of educational, professional and trade content as well as entertainment content. However, DRM imposes new hardware and software requirements on users to facilitate its implementation, and does not easily integrate with existing systems in the marketplace.

Another method of protecting information involves the use of cryptographic key solutions. One type of cryptographic key solution uses symmetric keys in which an encryption key can be calculated from the decryption key and vice versa. A more secure key solution uses asymmetric keys in which the key used for encryption is different from the key used for decryption. A user desiring to communicate with another retrieves the destination certificate from a database and verifies authenticity. Verifying authenticity often involves several Certification Authorities (CAs) if there is a hierarchy of CAs between the user's CA and the destination CA. After verification, communication may take place by using the keys to "unlock" encrypted containers containing the protected messages. Typically, timestamps are used to confirm that messages are current. Alternatively, a three-way protocol involves the user checking a random number that was originally generated by the user, sent to the destination, and received back from the destination. Likewise, the destination checks a random number received from the user that was originally generated at the destination. This type of security is not conducive to mass distribution of digital content.

Another alternative for limiting unauthorized access involves monitoring network traffic at the internal network level through firewalls, proxy servers, or access lists. These systems are designed to prevent users from accessing pre-designated sites or pre-designated file types over the Internet. This approach applies access rules to prevent files having designated attributes, such as particular suffix, from being transferred into and/or out of the organization. The access rules can be cumbersome and costly to establish and maintain for both small and large organizations.

Another form of security relates to virus protection. Virus protection is a global issue with the advent of the Internet and impacts large and small organizations and individual users. Virus scanning is currently performed at end local nodes and workstations. Thus, viruses can be stopped only once they have spread and been identified within these systems. This approach cannot prevent viruses from spreading prior to being distributed to the local nodes or workstations.

U.S. Pat. No. 5,629,980 describes a system which provides for the secure and accounted-for distribution of digitally encoded works. The owner of a digital work attaches rights to the work that define how that work may be used and further distributed. It is assumed that digital works reside on a secure depository, and depart only when the requestor meets certain rights. Once a digital work leaves the digital domain, e.g. it is printed out, played or otherwise rendered, it is no longer secure and can be copied by unauthorized users.

U.S. Pat. No. 6,233,684 describes a system for controlling the distribution and use of rendered digital works though watermarking. It is assumed that there are trusted entities on the Internet that enforce certain rules for watermarks and fingerprints whenever content is duplicated. First, a social reminder appears on the material to indicate whether duplication is acceptable. Second, auditing features record when copies are made. Third, copy detection is enforced so that duplicates can be differentiated from originals.

U.S. Pat. No. 6,112,181 describes systems and methods for matching, selecting, narrowcasting, and/or classifying content based on rights management and/or other information. A matching and classification system is used to filter masses of data for the benefit of the user. The system proposes a "matchmaker" to locate content, which would have value to the user, but ignores content that would be irrelevant. Thus, this tool focuses on helping a user identify content he or she may want to purchase. It does not assist the provider with a means to bill the user.

U.S. Pat. No. 6,233,618 describes a technique to limit access to information content available on the Internet. The technique includes filtering data and is implemented within a network device such as a proxy server, router, switch, firewall, bridge or other network gateway. Information about the site to which the request for data was made is used to help determine whether or not the material should be filtered. The access control process analyzes data in each request from the clients and determines if the request should be forwarded for processing by a server to which it is destined.

U.S. Pat. No. 6,216,173 discloses a system in which the content of a packet determines its routing through a network. The path a packet follows through the network is determined, at least partially, by the type of data carried within the packet itself. For example, a web request could be fulfilled by routing a packet to a nearby router. Some requests can be processed by software on the local workstation.

U.S. Pat. No. 6,205,148 describes selecting a higher-level protocol for packets in a router. Usually, routers enumerate each of the possible protocols for packets, then send that number as a field in the packet. This is done, for example, with IP packets. Each IP packet determines if the embedded packet uses, for example, the TCP or UDP protocols. The disclosure deals primarily with asynchronous transfer mode (ATM), and means to identify packets that could be transmitted over ATM.

The currently known methods, such as the methods described in the preceding paragraphs, are designed for denying access to designated data or sites, rather than allowing free flow of digital content over the Internet. Currently known methods do not provide capability for conducting transactions on designated digital content at a price established by authorized selling agents and content owners, or a standard tool for blocking designated digital content from unauthorized users. A transaction gateway point is needed that provides better data management both going to and coming from the Internet backbone than what is provided by currently known systems. Once this gateway point is established, applications can be installed that solve many data management issues.

SUMMARY

A system and method in accordance with the present invention provides a transaction gateway point with a data enabling point at the NAPs to non-intrusively manage data packets transmitted on the Internet backbone is provided.

In one embodiment, a system for controlling transmission of data packets in an information network in accordance with the present invention comprises a Regional Transaction Processor (RTP) operable to communicate with a Data Enabling Device (DED) and at least one workstation. The DED searches data packets for content match information. The RTP includes instructions to generate information to include in a prompt to be presented at the workstation when the content match information is detected in at least one of the data packets. The prompt is based on information in the at least one data packet. Transmission of the data packets through the information network is suspended by the DED until a response to the prompt is received that authorizes downloading the data packets to the workstation. If transmission of the data packets to the workstation is not authorized, the data packets are discarded by the DED.

In one aspect of this embodiment, the prompt is based on the content match information.

In another aspect of this embodiment, the DED is operable to detect when the one or more data packets include content match information at a rate proportional to the rate at which the data packets are received.

In another aspect of this embodiment, the DED prevents further transmission of the one or more data packets based on the content match information.

In another aspect of this embodiment, the RTP comprises a network server and a database, and is operable to process transactions for requests for content.

In another aspect of this embodiment, the DED is located at a Network Access Point (NAP).

In another aspect of this embodiment, the system includes a plurality of DEDs along a network route. Each DED is operable to communicate with at least one of the other DEDs. The plurality of DEDs include a first DED that generates the prompt and one or more intermediate DEDs operable to forward the prompt to the DED closest to the workstation along the network route. The plurality of DEDs are operable to communicate with each other to prevent transmitting more than one prompt for the same data packet through the network route.

In another aspect of this embodiment, the RTP transmits a Release_Content or Cease_Content message to the DED, based on whether the at least one data packet was authorized to be downloaded to the workstation.

In another aspect of this embodiment, the DED includes field programmable gate arrays (FPGAs). The FPGAs can be reprogrammed over the network to perform a content matching function in accordance with the present invention.

In another aspect of this embodiment, a portion of the DED can be dynamically reprogrammed and the DED is operable to continue processing the data packets during the partial reprogramming.

In another aspect of this embodiment, the DED includes a hardware-based data packet processor and a software-based data packet processor.

In another aspect of this embodiment, a CSBS communicates with the RTP to monitor operation of the RTP, and to store transaction information. The CSBS is operable to transmit information to reprogram the DED to communicate with another RTP.

In another aspect of this embodiment, a content matching server (CMS) is operable to store content match information, to communicate with the DED, and to transmit the content match information to the DED.

In another aspect of this embodiment, the DED is operable to suspend transmission of the data packets through the information network until a response to the prompt is received.

In another embodiment, a method for controlling transmission of identifiable content over an information network in accordance with the present invention includes:

providing content match information for the content to a DED. The DED is located in the information network along a transmission path of a plurality of data packets. At least one data packet includes the content match information;

receiving the at least one data packet in the DED;

detecting the content match information in the at least one data packet in the DED, and issuing a prompt to a workstation based on the content match information when the content match information is detected in the at least one data packet.

In one aspect of this embodiment, the method includes processing a transaction based on a user's response to the prompt.

In another aspect of this embodiment, the method includes transmitting a message among a plurality of DEDs along the transmission path to prevent transmitting more than one prompt for the same data packet.

In another aspect of this embodiment, the method includes processing a transaction based on the content match information, and transmitting a Release_Content or Cease_Content message to the DED based on whether content was authorized to be downloaded to the workstation during the transaction.

In another aspect of this embodiment, the method includes reprogramming a portion of the DED to detect different content match information.

In another aspect of this embodiment, the method includes suspending transmission of the at least one data packet through the information network until a response to the prompt is received.

In another embodiment, an apparatus for controlling transmission of data packets in an information network includes a Regional Transaction Processor (RTP) operable to communicate with a DED and at least one workstation. The DED detects content match information in at least one of the data packets. The RTP includes instructions to generate information to include in a prompt to be presented at the workstation. The prompt is based on information in the at least one data packet.

In one aspect of this embodiment, the DED detects the content match information at a rate proportional to the rate at which the data packets are received.

In another aspect of this embodiment, the DED prevents further transmission of one or more of the data packets based on the information in the at least one data packet.

In another aspect of this embodiment, the RTP further comprises instructions to process a transaction based on the information in the at least one data packet.

In another aspect of this embodiment, a plurality of DEDs are positioned along a network route, and each DED communicates with at least one of the other DEDs. The plurality of DEDs include a first DED that generates a message and one or more intermediate DEDs operable to forward the message to the DED closest to the workstation along the network route. The plurality of DEDs to communicate with each other to prevent transmitting more than one message for the same data packet through the network route.

In another aspect of this embodiment, the RTP transmits a Release_Content or Cease_Content message to the DED, based on whether the at least one data packet was authorized to be downloaded to the workstation during the transaction.

In another aspect of this embodiment, a portion of the DED can be dynamically reprogrammed and the DED can continue performing content matching functions during the partial reprogramming.

In another aspect of this embodiment, the RTP communicates with a Central Storage And Backup System (CSBS). The CSBS monitors operation of the RTP, and stores transaction information.

In another aspect of this embodiment, the CSBS transmits information to reprogram the DED to communicate with another RTP.

In another aspect of this embodiment, the RTP communicates with a content matching server. The content matching server stores content match information, communicates with the DED, and transmits the content match information to the DED.

In another aspect of this embodiment, the DED suspends transmission of the at least one data packet through the information network until a response to the prompt is received.

In another embodiment, an apparatus in accordance with the present invention includes a Central Storage and Backup System (CSBS) that communicates with a plurality of Regional Transaction Processors (RTPs) and provide backup storage for the RTPs. The RTPs communicate with a Data Enabling Device (DED) and at least one workstation. The DED detects content match information in at least one data packet. The RTP comprises instructions to generate information to include in a prompt to be presented at the workstation. The prompt is based on information in the data packet.

In one aspect of this embodiment, the CSBS monitors the operation of the RTPs.

In another aspect of this embodiment, the CSBS stores transaction information for the RTPs.

In another aspect of this embodiment, the CSBS maintains the content match information.

In another embodiment, a computer program product in accordance with the present invention includes instructions to enable communication between a workstation, a Data Enabling Device (DED), and a Regional Transaction Processor (RTP). The DED detects content match information in at least one data packet and prevents further transmission of one or more data packets based on the information in the at least one data packet. The RTP generates information to include in a prompt to be presented at the workstation. The prompt is based on information in the at least one data packet.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 1b shows an embodiment of a Regional Transaction Processor (RTP) of FIG. 1a which interacts with the DED.

FIG. 1c shows an embodiment of a Content Matching Server (CMS) of FIG. 1a which can reprogram the DED as required.

FIG. 1d shows an embodiment of a Central Storage and Backup Systems (CSBS) for storing back-up information for the RTP's shown in FIG. 1a.

FIG. 1e shows an embodiment of a process for handling purchasing transactions using the network in FIG. 1a.

FIG. 1f shows an embodiment of a process using the network in FIG. 1a to calculate sales tax on a transaction conducted over the network in FIG. 1a.

FIG. 1g is a block diagram of an example of a workstation that is suitable for use in the network of FIG. 1a.

FIG. 2a is a diagram of the International Standards Organization (ISO) Open Systems Interconnect (OSI) model showing layered data encapsulation.

FIG. 2b is a diagram of the layered data encapsulation known in the prior art.

FIG. 4a is a flow diagram of one embodiment of a data enabling procedure that can be utilized in the network shown in FIG. 1a.

FIG. 4b is a sample screen prompt presented to a private workstation when attempting to download copyright protected files with a transaction option in accordance with the process in FIG. 4a.

FIG. 4c is a sample screen prompt presented to a public workstation when attempting to download copyright protected files with a transaction option in accordance with the process in FIG. 4a.

FIG. 4d is a sample screen prompt presented to a workstation when attempting to download copyright protected files with no transaction option in accordance with the process in FIG. 4a.

FIG. 4e is a sample screen prompt presented to a workstation when a virus is detected at the NAP and prevented from being downloaded to the workstation in accordance with the process in FIG. 4a.

FIG. 4f is a sample screen prompt presented to a workstation when a virus is detected in data sent from the user at the NAP in accordance with the process in FIG. 4a.

FIG. 4g is a sample screen prompt presented to a workstation when confidential data is detected at the NAP in accordance with the process in FIG. 4a.

FIG. 4h is a sample screen prompt presented to a System Administrators workstation when one of the workstations on the network is attempting to transmit confidential data over the network in accordance with the process in FIG. 4a.

FIG. 4i is a sample screen prompt presented to a workstation when a purchase is made over the network in accordance with the process in FIG. 4a.

FIG. 5b is a block diagram showing lines of communication between a series of DEDs along a path for transmitting data packets over the network shown in FIG. 1a.

FIG. 5c is a block diagram of a series of DEDs along a path for transmitting two or more data packets associated with the same content over the network shown in FIG. 1a.

FIG. 5d is a block diagram of multiplexed data packets transmitted along two unique paths in the network shown in FIG. 1a.

FIG. 6a is a diagram of one type of device that can be utilized as a DED that can be utilized in the network of FIG. 1a.

FIG. 6b is a diagram showing a switching circuit that can forward traffic to the DED shown in FIG. 6a.

FIG. 8a is a flow chart of one embodiment of a communication process between the DED, the RTP, and the workstation that can be utilized in the network shown in FIG. 1a.

FIG. 8b is a flow chart of one embodiment of an initialization process to establish communication between the DED, the RTP, and the workstation that can be utilized in the network shown in FIG. 1a.

FIG. 8c is a flow chart of one embodiment of a process for preventing confidential content from being transmitted onto a network from a workstation that can be utilized in the network shown in FIG. 1a.

FIG. 8d is a flow chart of one embodiment of a process for preventing content infected with a virus from being transmitted over a network to a workstation that can be utilized in the network shown in FIG. 1a.

FIG. 8e is a flow chart of one embodiment of a process for preventing content infected with a virus from being transmitted onto a network from a workstation that can be utilized in the network shown in FIG. 1a.

FIG. 9 is a block diagram of an embodiment of a centralized data storage facility for the RTPs that can also reallocate the DEDs to a different RTPs in the network shown in FIG. 1a.

FIG. 11 is a block diagram of one embodiment of a point of purchase system within the NAP shown in the network of FIG. 1a.

DETAILED DESCRIPTION

Figure 1A:
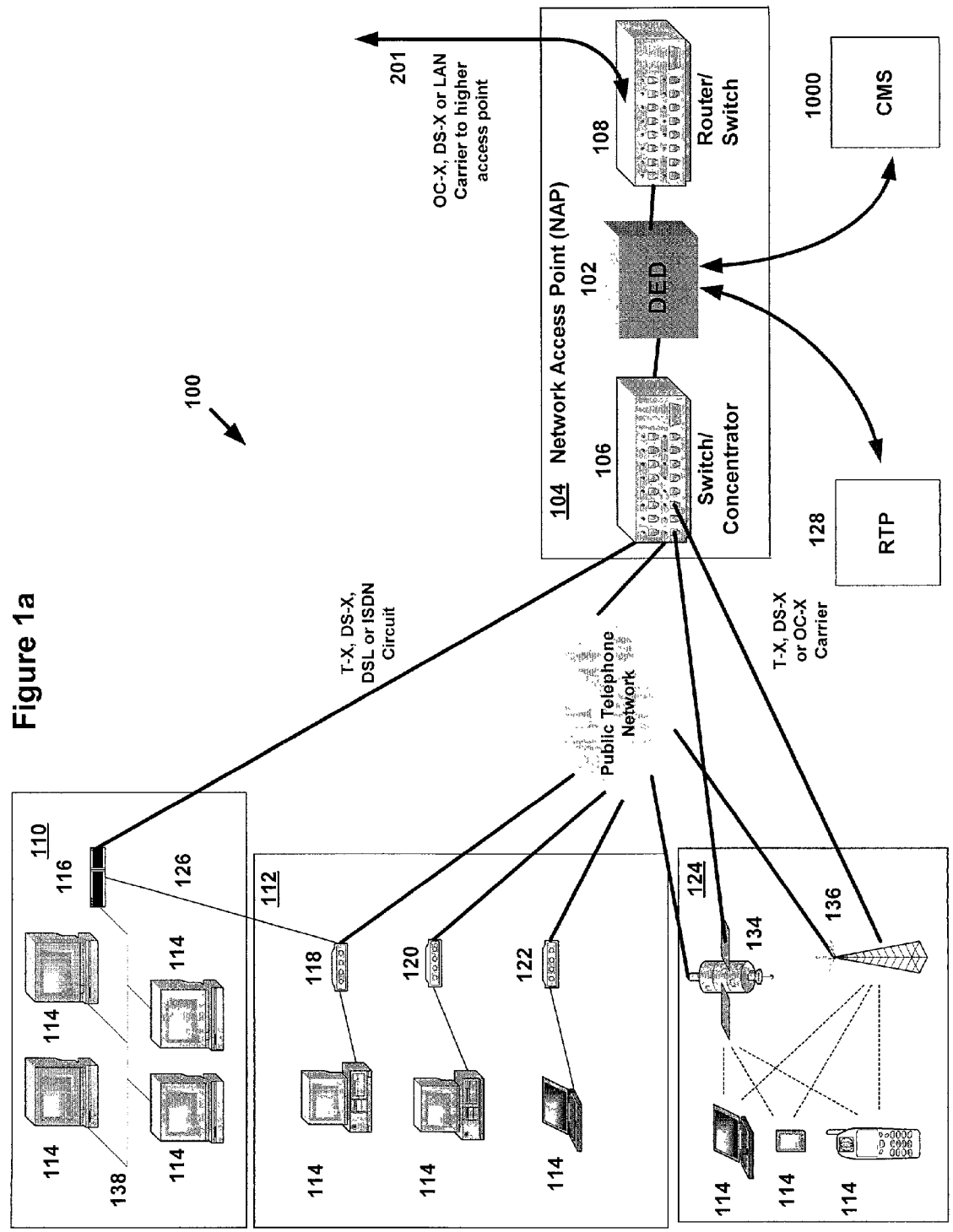
FIG. 1a shows an embodiment of a network that includes a DED at a Network Access Point (NAP) and a Regional Transaction Processor (RTP) in accordance with the present invention.

FIG. 1a shows an embodiment of a network 100 that includes a Data Enabling Device (DED) 102 at a Network Access Point (NAP) 104. The DED 102 can be positioned between a switch 106 and routers/switches 108. Switch 106 allows workstations 114 connected to networks 110, 112, 124 to communicate with NAP 104, and routers/switches 108 allow NAP 104 to communicate with other NAPs (not shown).

Content match information is used to identify content in a data packet and is stored in a Content Matching Server (CMS) 1000. The CMS 1000 provides copies of the content matching information to DEDs 102 to perform content matches on data packets that are transmitted to the DEDs 102. The content match information can comprise any data string that uniquely identifies the content. For example, the content match information can be a string of digital data from the digital recording of a song.

The term "content match" as used herein refers to the process of comparing the content match information in the DED 102 to content match information in a data packet. For example, the DED 102 detects a content match when a string of digital data in a packet matches an identical string of data that was provided as content match information in the DED 102.

Control information is used to determine whether a data packet in which content match information was found can be transmitted to the workstation 114. The control information can include information such as an identifier for a virus, whether the content is subject to copyright protection or security (confidentiality) controls, purchase price, and/or the number of copies a user can make of the content. The control information is typically provided by the entity that wants to monitor and/or control dissemination of content, such a music recordings or books, over the network 100.

The content match information can be updated as required in the CMS 1000, which in turn updates the DED 102 with the new content match information. DED 102 non-intrusively searches data packets for the content match information. The term "non-intrusive" denotes searching the data packets for the content match information without delaying delivery of the packets. When the DED 102 detects the content match information in a packet, the DED 102 invokes a Regional Transactional Processor (RTP) 128 to perform one or more transactions based on the control information.

Users access the information network 100 through a NAP, such as NAP 104. DED 102 can monitor all digital content transmitted between users connected to NAP 104 and other NAPs (not shown). Communication protocols are used to transport information from NAP to another. The protocols form a stack of layers, each layer communicating with the one above it or below it by passing information in a suitable form to the next layer.

FIG. 1b shows an embodiment of the Regional Transaction Processor (RTP) 128 that includes various hardware and software components that allow it to communicate with the DED 102, facilitate and process transactions, and store the related information securely over the Internet. The router 152 routes data between web server 148 and DED 102 via firewall 146. enterprise switch 144 then routes data to storage system 142, database (DB) server 130, accounting server 140, or remote access server 150, depending on the instructions received in the data.

FIG. 1c shows an embodiment of the CMS 1000 of FIG. 1a that can update the DEDs 102 as required with content match information. The remote access server 170 can receive content match information directly from content owners via communication lines connected to the content owners' servers. The DB server 168 and storage system 166 store the content match information. Enterprise switch 164 transmits the content match information to the DED 102 through firewall 162 and router 160.

FIG. 1d shows an embodiment of the Central Storage and Backup System (CSBS) 900 of FIG. 1a that backs up and stores data from the RTPs 128. CSBS 900 receives data from the RTPs 128 through router 172, firewall 174, and enterprise switch 176 to back-up onto storage systems 178 and 180. DB server 182 date stamps and logs all information received.

Figure 1E:
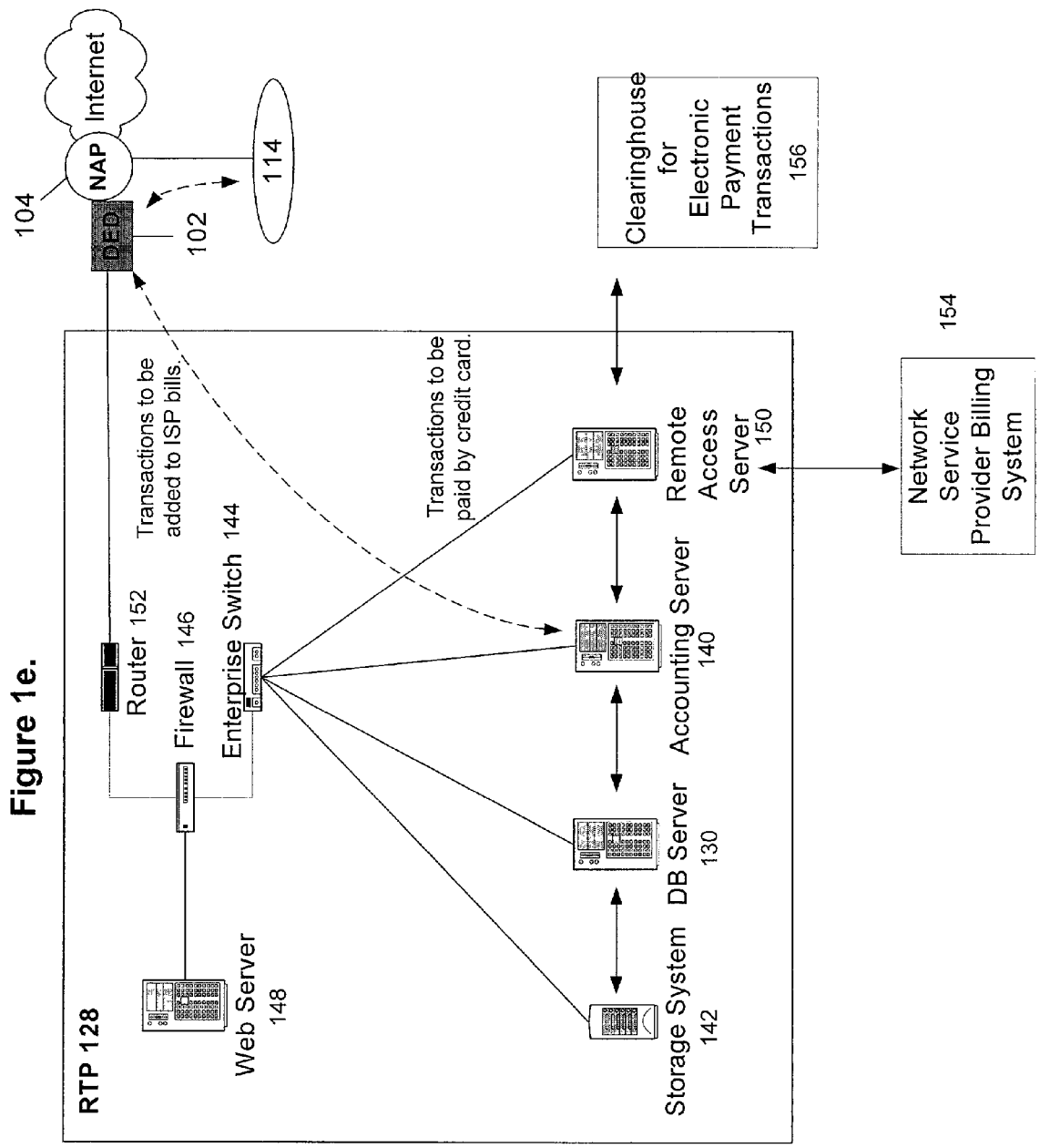

FIG. 1e shows an embodiment of the RTP 128 of FIG. 1a that processes transactions based on messages from the workstation 114 and the DED 102. The accounting server 140 receives and processes transactions using data in the DB server 130, the remote access server 150, and external billing systems 156 to facilitate transactions at the workstation 114.

Figure 1F:
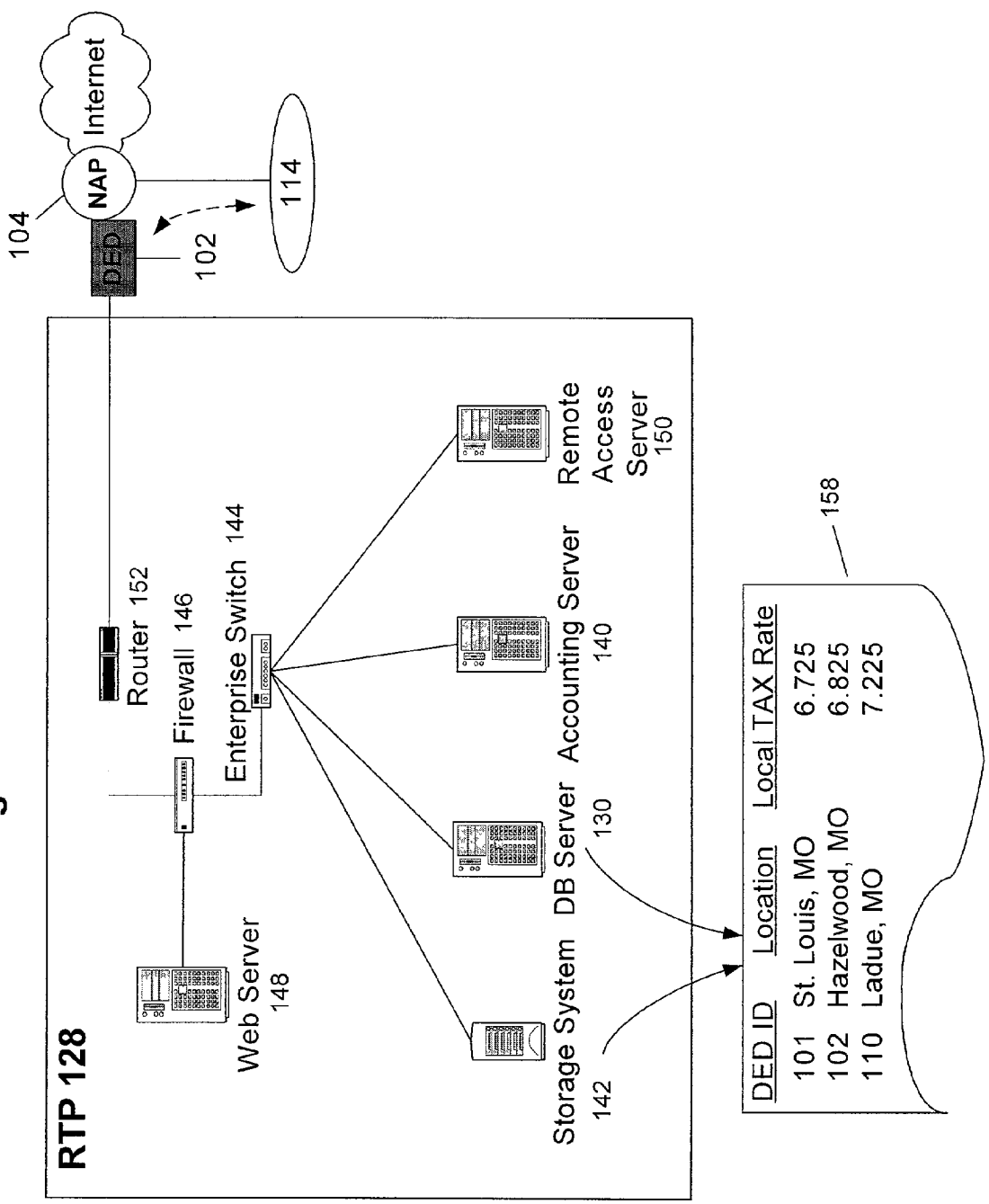

FIG. 1f shows an embodiment of the RTP 128 of FIG. 1a having access to a tax lookup table 158 stored on the DB server 130 or the storage system 142. The tax table 158 can be used to determine the amount of sales tax rates to add to the price of delivering content through the DED 102 or other retail transactions made by a user at the workstation 114. An identifier for the workstation 114 and an identifier for the corresponding DED 102 can be used to determine which tax tables or tax rate formula to use to determine the amount of state and/or local sales tax to charge for a transaction.

The various embodiments of components shown in FIGS. 1b-1f can be configured in many different ways to support transactions at workstation 114.

The DED 102 and the RTP 128 also can use public/private key encryption/decryption technology to decrypt encrypted data packets for content matching, and then re-encrypt the data packet and forward it to the workstation 114. Alternatively, content match information can be provided to identify the content of a data packet in encrypted format, thereby eliminating the need to decrypt the data packet.

Figure 1G:
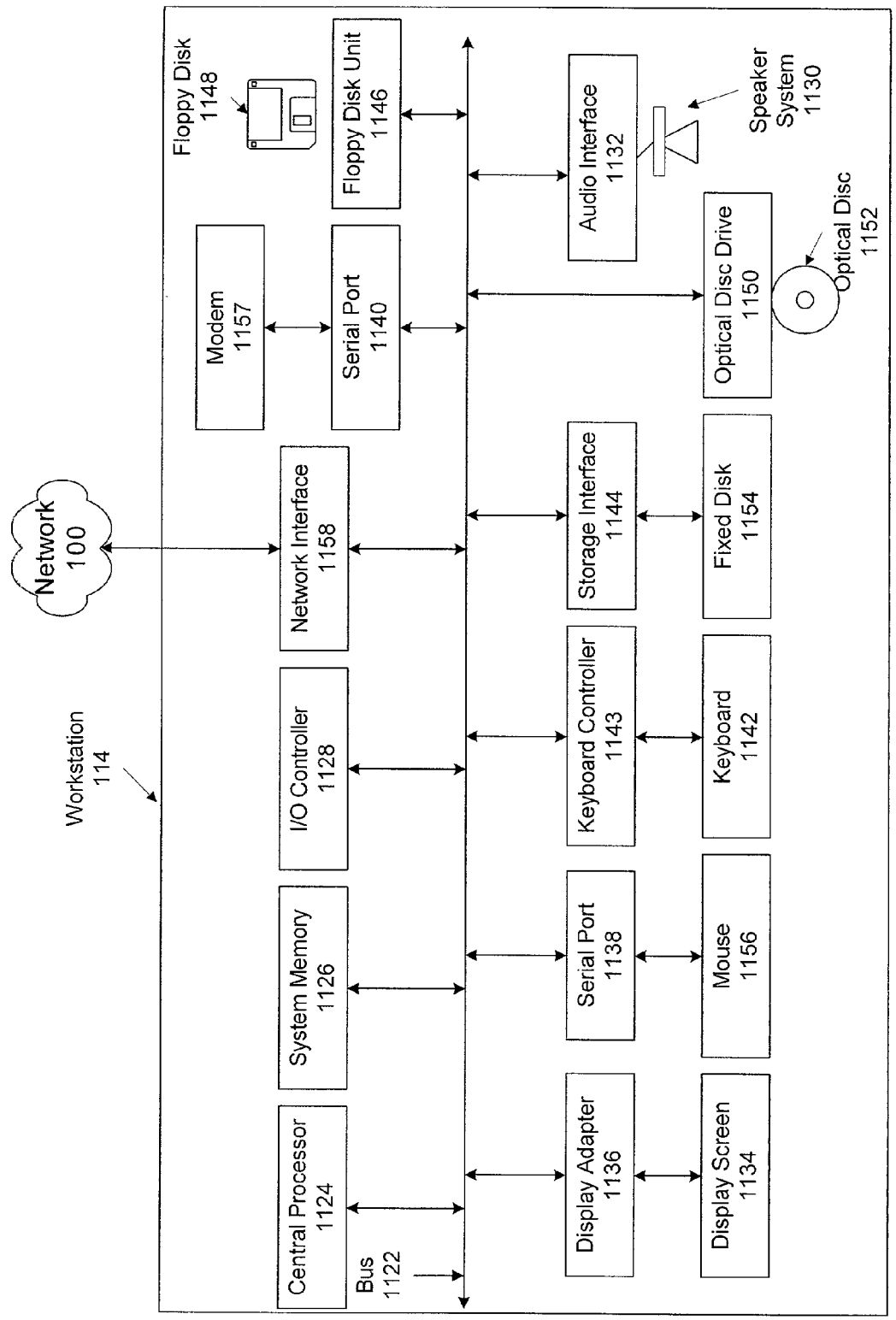

FIG. 1g is a block diagram of an example of a computer system suitable for implementing the workstation 114, which includes a bus 1122 to interconnect subsystems of workstation 114 such as a central processor 1124, a system memory 1126 (typically RAM, but which may also include ROM, flash RAM, or the like), an input/output controller 1128, an external audio device such as a speaker system 1130 via an audio output interface 1132, an external device such as a display screen 1134 via display adapter 1136, serial ports 1138 and 1140, a keyboard 1142 (interfaced with a keyboard controller 1143), a storage interface 1144, a floppy disk drive 1146 operative to receive a floppy disk 1148, and an optical disc drive 1150 operative to receive an optical disc 1152. Also included are a mouse 1156 (or other point-and-click device, coupled to bus 1122 via serial port 1138), a modem 1157 (coupled to bus 1122 via serial port 1138) and a network interface 1158 (coupled directly to bus 1122).

Bus 1122 allows data communication between central processor 1124 and system memory 1126, which may include both Read Only Memory (ROM) or flash memory (neither shown), and Random Access Memory (RAM) (not shown), as previously noted. The RAM is generally the main memory into which the operating system and application programs are loaded and typically affords at least 16 megabytes of memory space. The ROM or flash memory may contain, among other code, the Basic Input-Output System (BIOS) which controls basic hardware operation such as the interaction with peripheral components. Applications resident with workstation 114 are generally stored on and accessed via a computer readable medium, such as a hard disk drive (e.g., fixed disk 1154), an optical drive (e.g., CD-ROM drive 1150), floppy disk unit 1146 or other storage medium. Additionally, applications may be in the form of electronic signals modulated in accordance with the application and data communication technology when accessed via network modem 1157 or network interface 1158.

Storage interface 1144, as with the other storage interfaces of workstation 114, may connect to a standard computer readable medium for storage and/or retrieval of information, such as a fixed disk drive 1154. Fixed disk drive 1154 may be a part of workstation 114 or may be separate and accessed through other interface systems. Many other devices can be connected such as the mouse 1156 connected to bus 1122 via serial port 1138, a modem 1157 connected to bus 1122 via serial port 1140 and the network interface 1158 connected directly to bus 1122. Modem 1157 may provide a direct connection to a remote server via a telephone link or to the Internet via an Internet Service Provider (ISP). Network interface 1158 may provide a direct connection to a remote server via a direct network link to the Internet via a POP (point of presence). Network interface 1158 may provide such connection using various communication links, such as a dial-up wired connection with a modem, a direct link such as a T1, ISDN, or cable line, a wireless connection through a cellular or satellite network, or a local data transport system such as Ethernet or token ring over a local area network.

Many other devices or subsystems (not shown) may be connected in a similar manner (e.g., bar code readers, document scanners, digital cameras and so on). Conversely, it is not necessary for all of the devices shown in FIG. 1g to be present to practice the present invention. The devices and subsystems may be interconnected in different ways from that shown in FIG. 1g. The operation of a computer system such as that shown in FIG. 1g is readily known in the art and is not discussed in detail in this application. Code to implement the present invention may be stored in computer-readable storage media such as one or more of system memory 1126, fixed disk 1154, CD-ROM 1152, or floppy disk 1148. Additionally, workstation 114 may be any kind of computing device, and so includes personal data assistants (PDAs), network appliance, desktop, laptop, X-window terminal or other such computing device's. The operating system provided on workstation 114 may be MS-DOS®, MS-WINDOWS®, OS/2®, UNIX®, Linux® or other known operating system. Workstation 114 also supports a number of Internet access tools, including, for example, an HTTP-compliant web browser having a JavaScript interpreter, such as Netscape Navigator®, Microsoft Explorer® and the like.

The International Standardization Organization (ISO) has created a protocol layer model that distinguishes the typical tasks needed in communication. This model is called the Open Systems Interconnection (OSI) reference model 200 and is shown in FIG. 2a. This OSI protocol is used as an example protocol and is a representation of the various protocols currently in use. FIG. 2b is a subset of the OSI protocol in FIG. 2a known as the Internet Protocol (IP). Each protocol layer has a standard defined input and output, and provides clearly defined functions that can improve connectivity between equipment provided by different manufacturing companies.

Referring to FIG. 2a, a user's content 202 is transformed through the layers into a bit stream 204 as it is transmitted through the network 100 (FIG. 1a). Each layer provides services to the layer above it, while shielding the upper level from what happens below. Each layer can add a header and a trailer to the packet as the packet moves through the layers. The headers contain information that specifically addresses layer-to-layer communication. For example, the transport header (TH) includes information that only the transport layer uses. All other layers below the transport layer pass the transport header as part of the packet.

The application layer 206 (also referred to as layer 7) deals with printing, file transfer, remote terminal services, and directory browsing. Some user applications exist directly at the application layer 206, such as the known Telnet and FTP for file transfer protocol. Other user applications have application layer functions built into them. For example, a word processing program that can print to a network printer has application layer functions built into it.

The primary job of the presentation layer 208 (also referred to as layer 6) is that of translator. It takes care of translating ACSII into EBCIDIC, and vice versa, compression, decompression, encryption, and decryption. Essentially, the presentation layer 208 transforms data into the form that the application layer 206 can accept.

Session layer 210 regulates the flow of information between applications. It synchronizes communication, and takes care of security and handling errors outside the scope of network communications, such as a server with a full disk drive, or a disk that needs to be inserted.

The objective of transport layer 212 (also referred to as layer 4) is to provide reliable data transmission for the layers above it. The transport layer 212 uses sequence numbers and flow control to keep information moving at the controlled rate, and to assure that the recipient knows how to reassemble an incoming stream of data blocks in the correct order. The transport layer 212 also performs multiplexing; combining data to conserve bandwidth, or splitting a file into smaller data packets that can travel over several network pathways. The transport layer 212 can send a signal back to the upper layers when a transmission cannot get through.

Network layer 214 (also referred to as layer 3) deals with moving packets of information across a network. Large networks are made up of smaller sub-networks called segments. Within a segment two systems can communicate with each other just by referencing their layer two hardware addresses. To cross from one segment to another, systems need to know the network layer address of the destination system. Devices that operate on layer three of the network forward packets from one segment to the next based on the destination network address of the packet. They choose how to forward the packet by either dynamically determining the best route, or by looking up a route from a static table. Through this method a packet is routed one node at a time from its source, across the network, to its destination.

Data link layer 216 (also referred to as layer two) performs several tasks. It compiles the stream of ones and zeros coming from the physical layer 218 into bytes, and then into frames. The data link layer 216 can add its own header to the information it passes down to the physical layer 218. Information in the header usually includes the destination and source addresses of the frame. The data link layer 216 also detects and rejects corrupted frames and performs flow control.

Physical layer 218 (also referred to as layer one) transforms data to and from a signal on the network media and defines functionality of the network hardware including connector types, on/off signal voltages and durations to define a 1 or a 0, and whether the media is copper wire, optical fibers, or open air.

Content 202 can be in one of a variety of formats, such as documents created with a word processing program, image data, audio data, or a combination of audio and video data, to name a few. File formats can include their own control information regarding the data in the file.

As an example of a file format, Motion Picture Experts Group (MPEG-2) files can contain MPEG-2 compressed video, compressed audio, control data, and/or user data. The most basic file component is known as an Elementary Stream (ES) 302, 304, 306, 308. A program, such as a television program or a Digital Versatile Disk (DVD) track, contains a combination of elementary streams (typically one for video, one or more for audio, control data, subtitles, etc). Each ES 302, 304, 306, 308 output by an MPEG audio, video, and some data encoders contain a single type of signal that is usually compressed. There are various forms of ES 302, 304, 306, 308, including:

Digital Control Data,
Digital Audio (sampled and compressed),
Digital Video (sampled and compressed), and
Digital Data (synchronous, or asynchronous).

For video and audio, the data is organized into access units, each representing a fundamental unit of encoding. For example, in video, an access unit will usually be a complete encoded video frame.

Figure 3A:
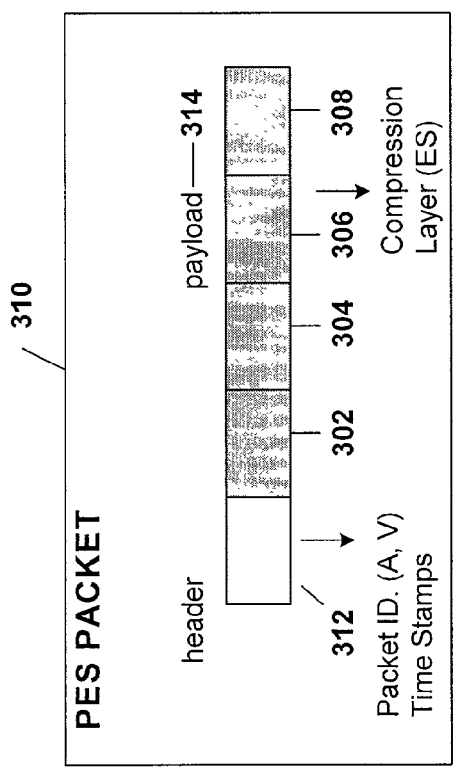
FIG. 3a is a diagram of a packetized elementary stream packet for an MPEG file.

Each ES 302, 304, 306, 308 is input to an MPEG-2 processor (e.g. a video compressor or data formatter) which accumulates the data into a Packetized Elementary Stream (PES) packet 310, an example of which is shown in FIG. 3a. The PES packet 310 may be a fixed or variable sized block, with up to 65536 bytes per block and includes a 6 byte protocol header 312. The information in the PES header 312 is, in general, independent of the transmission method used. A PES packet 310 usually is organized to contain an integral number of ES 302, 304, 306, 308, collectively referred to as a payload 314.

The PES header 312 includes a start code, a stream identifier (i.e., audio, video, of command/control identifier), and PES Indicators. The PES Indicators provide additional information about the stream to assist processing of the PES packet 310 including whether scrambling is used, the chosen scrambling method, priority of the current PES packet 310, whether the payload 314 starts with a video or audio start code, whether the payload 314 is copyright protected, whether the ES 302, 304, 306, 308 is original, and a set of optional fields, which if present, are inserted before the start of the PES payload 314. The optional fields include presentation and decode time stamps, an Elementary Stream Clock Reference (ESCR), the rate at which the ES 302, 304, 306, 308 was encoded, trick mode, copyright information, Cyclic Redundancy Check (CRC), and PES extension information, which may be used to support MPEG-1 streams.

Figure 3B:
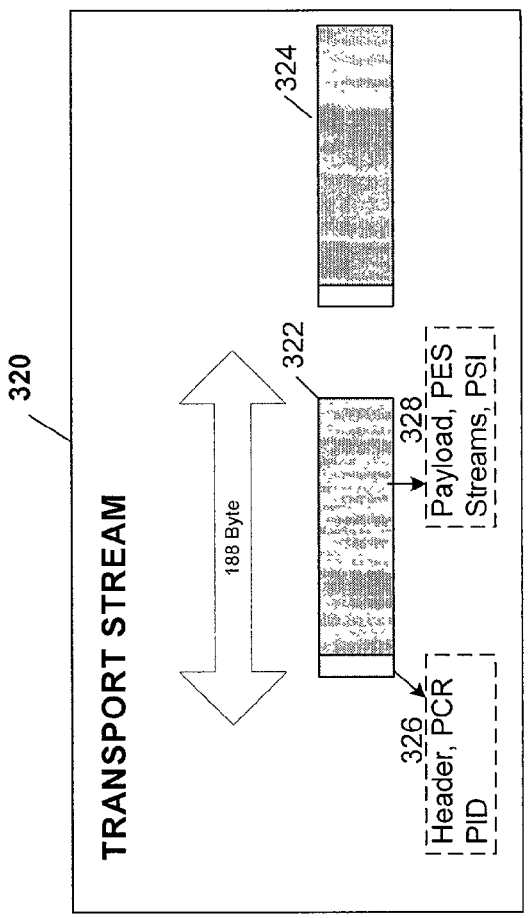
FIG. 3b is a diagram of a transport stream for an MPEG file.

Referring to FIG. 3b, a transport stream 320 consists of one or more programs. Each program is defined as a collection or a multiplex of individual program elements that share the same time base. The transport bit stream comprises transport packets 322, 324 having 188 bytes each. The transport header 326 contains a Program ID (PID) to identify the contents of the packet, along with time stamps. The transport payload 328 encapsulates PES packet(s) 310 as well as dedicated transport packets, known as the Program Specific Information (PSI), which are set aside to identify the structure of the stream.

While FIGS. 3a and 3b show the format for MPEG-2 files, files in one of many different known formats, and subsets of known formats, can be transported through network 100 (FIG. 1a) using the OSI reference model 200 (FIG. 2a). For example, MPEG Layer III (also referred to MP3), is a file format for the audio portion of MPEG files.

The communication protocol header and/or trailer for each layer, as well as the content 202 (FIG. 2a), can include content match information and control information. The DEDs 102 (FIG. 1a) search data packets for the content match information to determine whether transmission of data packets associated with a particular piece of content should be restricted. If transmission of associated data packets is restricted, then the control information is used by the RTPs 128 (FIG. 1a) to determine which transaction(s) to process to control transmission of the data packets. While some of the header and trailer fields are designated for specific parameters, other fields can be allocated to allow the creator of the content 202 to include the control information The control information can be unique to the creator, user, and/or content 202, and can be encrypted or unencrypted.

In one embodiment, the creator adds the content match information and the control information at application layer 206. The content match information is also supplied to DED 102 (FIG. 1a) as described hereinbelow. DED 102 can then search the transport streams 320 (FIG. 3b), also referred to as data packets, being transmitted through NAP 104 (FIG. 1a) to determine whether the data packets include the content match information.

The content provider also can supply or indicate transaction instructions to be used in the RTP 128 when the DED 102 matches the content match information in a data packet. For example, if the user is required to pay for the content before receiving it, the RTP 128 transmits a transaction prompt to the user's workstation 114 (FIG. 1a) informing the user of the price to be paid for the content, and allowing the user to accept or decline the purchase. As another example, the RTP 128 can transmit a prompt to inform the user that content infected with a virus is attempting to be transmitted from or received to the user's workstation 114, and that transmission or reception of the virus is being halted. As another example, the RTP 128 can transmit a prompt to inform the user that content subject to security control is attempting to be transmitted from or received to the user's workstation 114, and that transmission or reception of the confidential content is being halted. As a further example, the RTP 128 can tally statistics regarding transmission of designated content for purposes such as rating the popularity of the content.

Figure 4A:
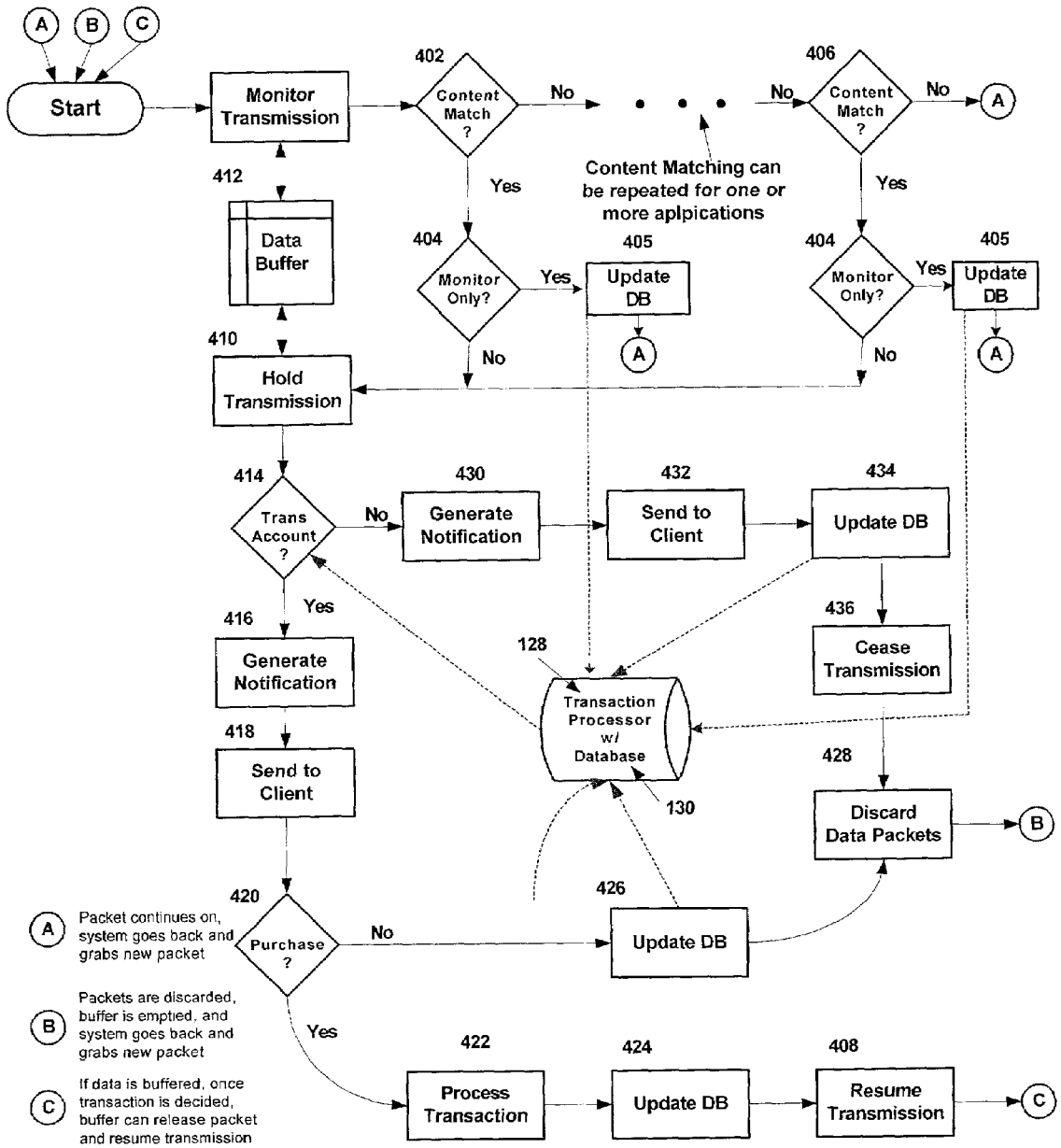

Referring now to FIG. 4a, a flow diagram of an embodiment of a method for processing data packets in the network 100 (FIG. 1a) in accordance with the present invention is shown. Process 402 searches each data packet for content match information. DED 102 can perform multiple content matches on each data packet, as indicated by the series of processes 402-406. Each content match searches for content unique to the application(s) being performed by various entities such as content providers, business organizations, and/or government organizations. The applications can handle various situations based on the content, such as collecting payment for the authorized use of copyrighted content, preventing outgoing transmission of confidential material, preventing incoming receipt of material previously designated as unwanted by the recipient, and preventing the transmission of files containing viruses to the workstations 114 (FIG. 1a).

Process 402 can include logic to search for particular watermarks or fingerprints to identify copyright content based on the content match information from the content providers. It also can include logic to understand one or more hashing functions.

If content is not matched in a data packet, process 402 forwards the data packet to its destination. If a content match is found in the data packet, process 404 determines whether the subject data packet is simply being monitored for statistical analysis or sampling. If so, process 405 updates the database 130 with the specified statistics or samples, and the data packet is transmitted to its destination.

When process 404 determines that the data packet is not just being monitored for statistical analysis or sampling, process 410 can temporarily store the incoming packets associated with the data packet for which a content match was found in buffer 412 while process 414 determines whether the RTP 128 should be invoked to process a transaction.

In one embodiment, process 414 queries database 130 to determine whether a transaction account for the user exists. A transaction account for a user can be established in many different ways. In one implementation, the transaction account for the user is established by the user's network service provider at the NAP 104. The user typically must pay a network service provider for access to the network 100 (FIG. 1*a*), and therefore the same billing account can be used with minimal overhead. Alternatively, the user can supply electronic payment information, such as a credit or debit card number, a prepaid card number, or use an electronic wallet as known in the art, to establish a transaction account.

If the user requesting the content that is being downloaded has established a transaction account, process 416 generates a notice that is presented to the user. Various types of prompts and messages can be generated by process 416 and presented to the user's workstation 114 (FIG. 1*a*) by process 418. The type of message or prompt depends on the control information in the data packet. The control information is transmitted to the RTP 128 by the DED 102.

Figure 4B:
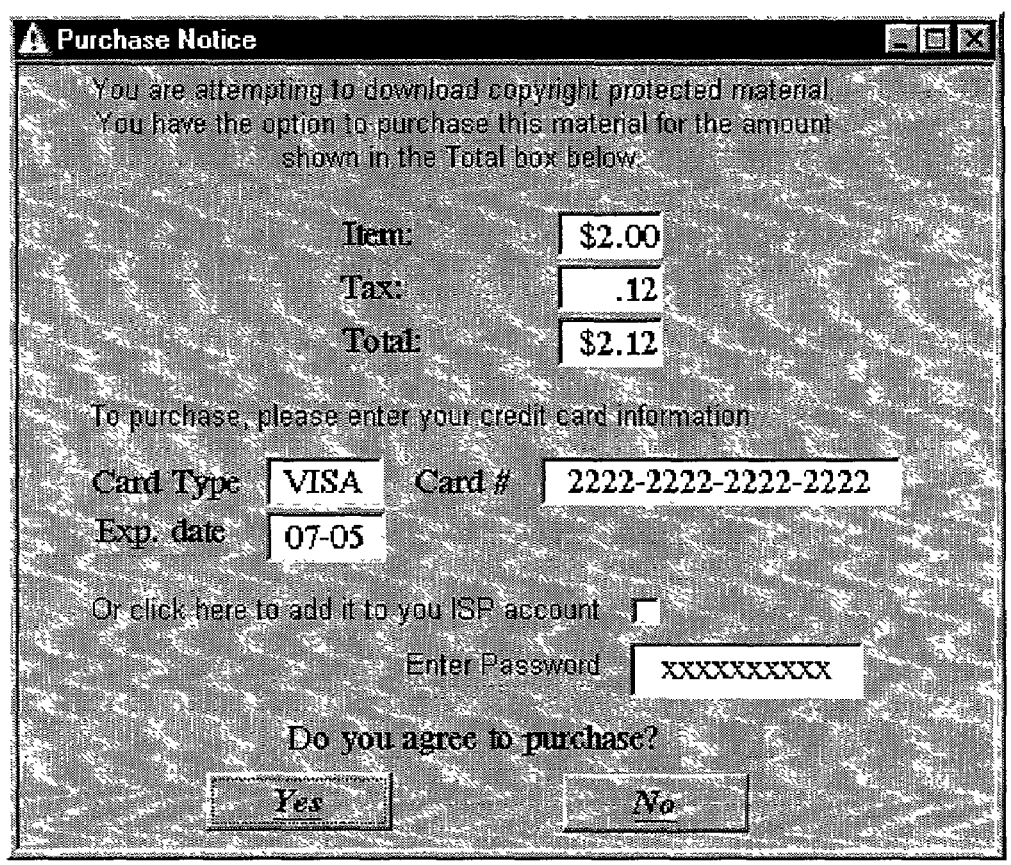

For example, process 416 can generate a prompt 450 such as shown in FIG. 4*b* to inform the user that they must agree to pay a fee to download the requested copyrighted content. The user can indicate their decision to either accept or decline the charge by selecting the "yes" or "no" options on the display. If the purchase was accepted, the user can provide electronic payment information, such as a credit card number, or check a box and provide a password or authorization code to authorize the charge to their established network service provider account.

Figure 4C:
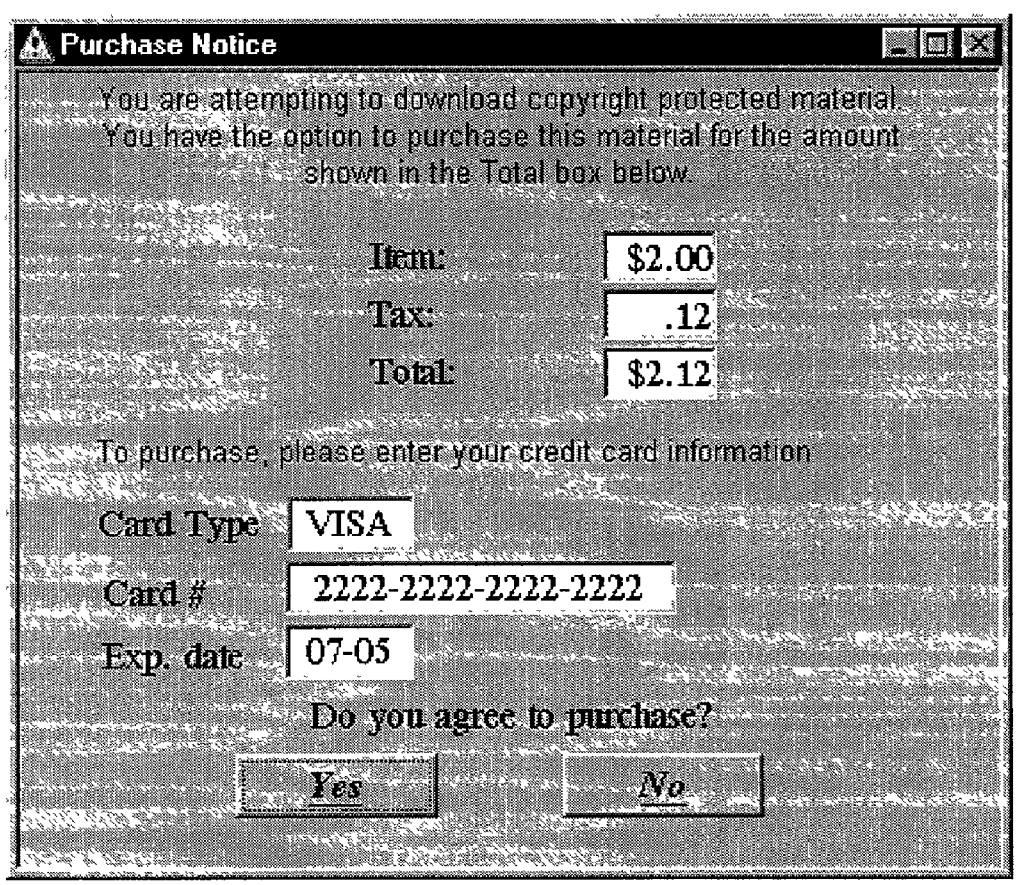

As another example, process 416 can generate a prompt such as shown in FIG. 4*c* at workstations 114 (FIG. 1*a*) that only allows the users to supply some form of electronic payment, such as a credit card number.

Figure 4D:
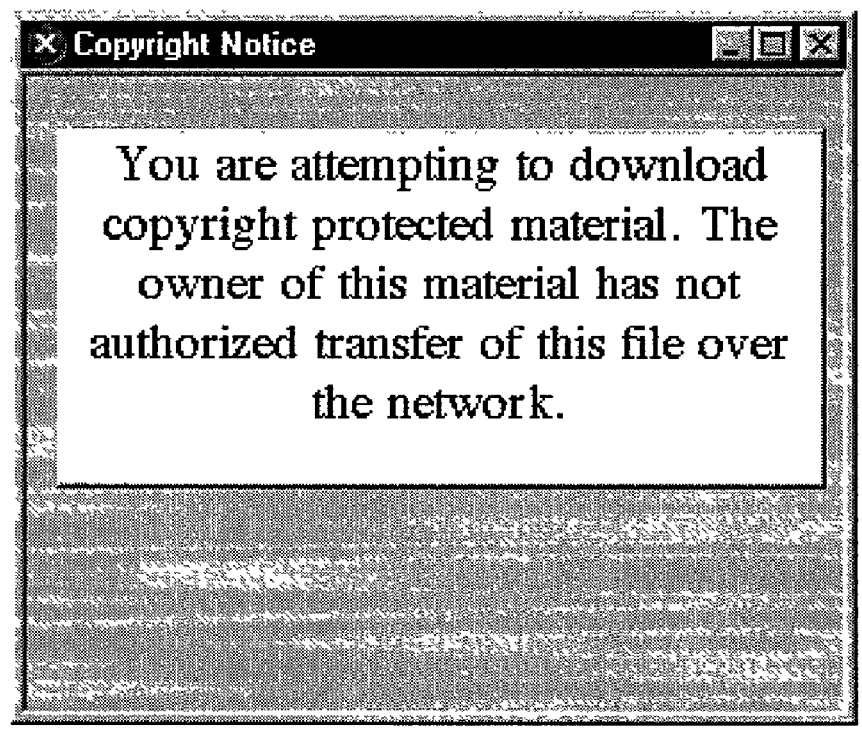
Figure 4E:
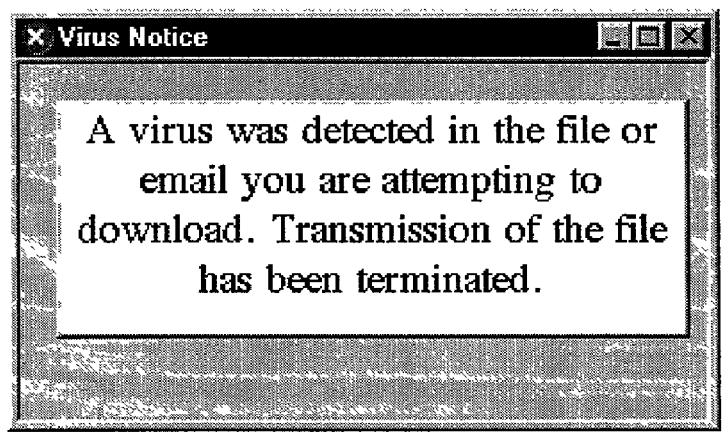
Figure 4F:
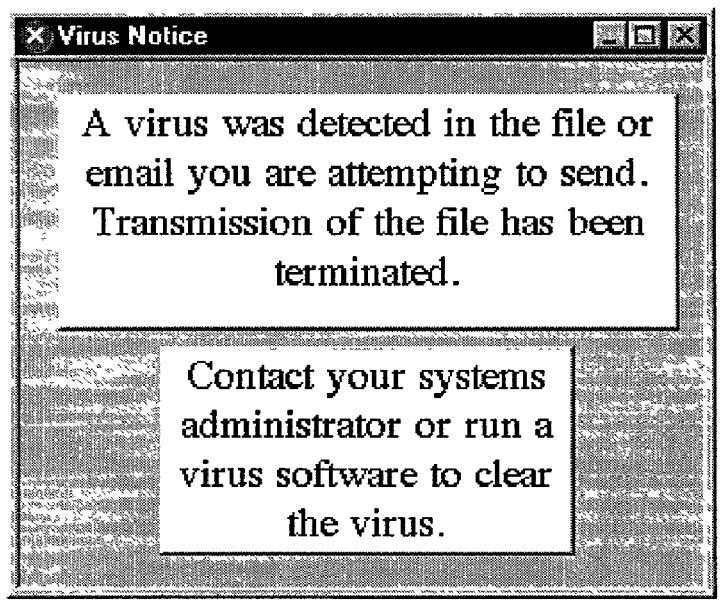
Figure 4G:
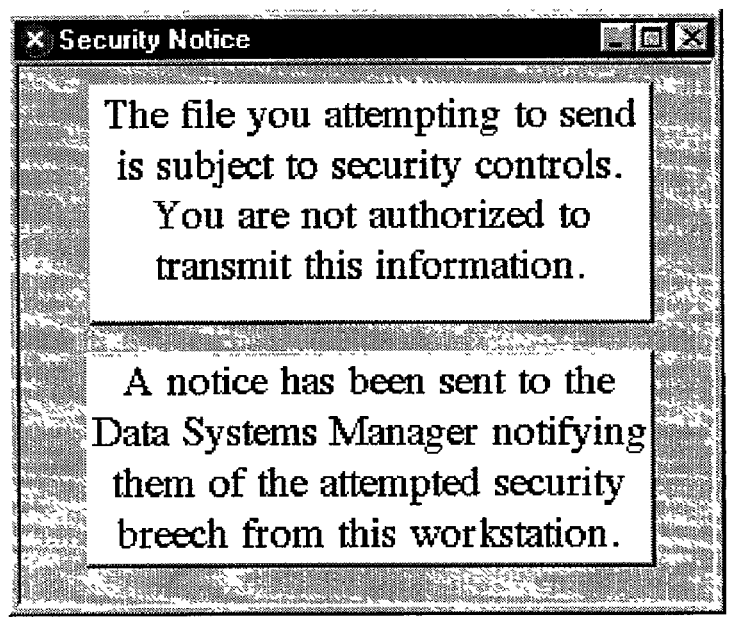
Figure 4H:
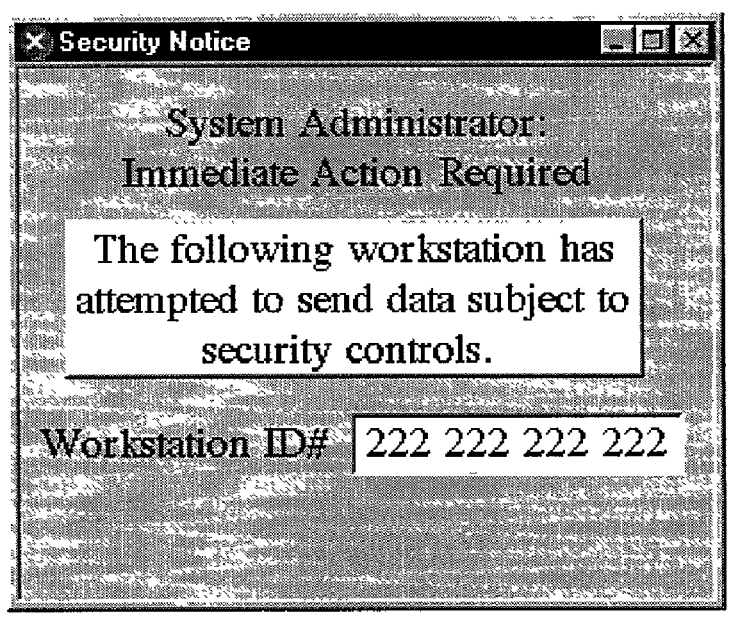
Figure 4I:
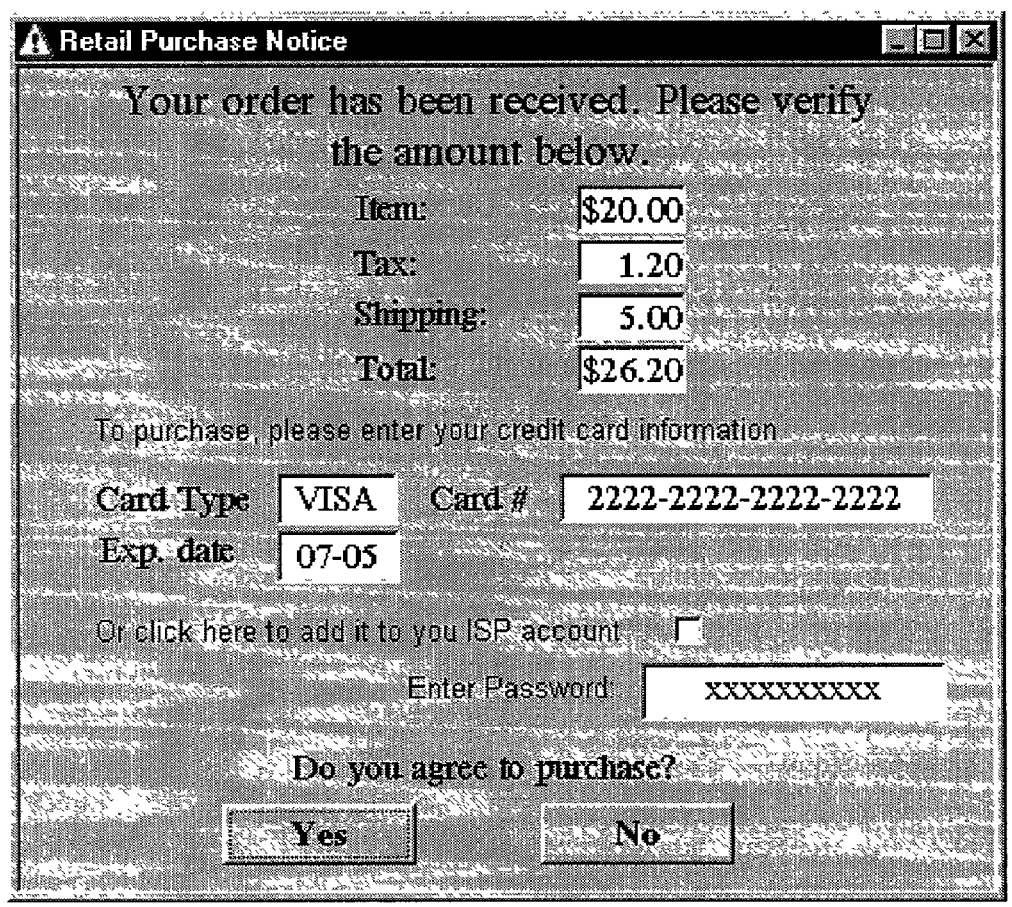

FIG. 4*i* shows an example of a prompt that includes notice of a retail transaction from a participating retailer over the network 100 (FIG. 1*a*). The prompt includes shipping and handling information, and the amount of sales tax on the purchase, which is derived from a tax table stored in the RTP 128 (FIG. 1*f*).

Process 420 determines whether the user agreed to pay for the content. This can be implemented by monitoring the user's response to the notice that was sent in process 418. Process 422 processes the transaction if the user agrees to pay for the copyrighted material, and process 424 updates the database 130 with relevant information regarding the transaction. Process 408 resumes transmission of the data packets from buffer 412 to their destination.

If process 420 determines that the client has not purchased the content, process 426 updates the database 130 with relevant information regarding the aborted download, and process 428 discards the data packets associated with the content.

Referring again to process 414, if a transaction account does not exist, process 430 generates a message, such as shown in FIG. 4*d* indicating that the content cannot be downloaded to the user's workstation because the content is protected and is not authorized for downloads or uploads.

FIGS. 4*e* and 4*f* show examples of messages that can be generated by process 430 and presented by process 432 to the user's workstation to inform the user that the content is infected with a virus and therefore will not be downloaded or uploaded. The user can choose an option to attempt to clean the virus from the file using an anti-virus utility.

FIG. 4*g* shows an example of another message that can be generated by process 430 and presented by process 432 to the user's workstation to inform the user that they are attempting to upload secured information to the Internet and the transmission has been halted.

FIG. 4*h* is an example of a message that can be generated by process 430 and forwarded to a system administrator to provide notice of an attempt to transmit content subject to security controls from one of the workstations 114 on the network 100 (FIG. 1).

Process 434 can be included to update database 130 to record information regarding the denial to transmit the content. Entries also can be made in database 130 that may be used to generate statistical information regarding the download attempts. This information in database 130 regarding the content also can be provided to and/or accessed by the owner of the content.

Process 436 ceases transmission of the content, and process 428 discards the data packets associated with the content. In one implementation, process 428 deallocates the memory occupied by the content's data packets in data buffer 412 to make the memory available to store other data packets.

In some implementations, processes 434 and 426 can give the user privacy options to withhold some or all of the user's information in database 130 from outside access and dissemination.

Figure 5A:
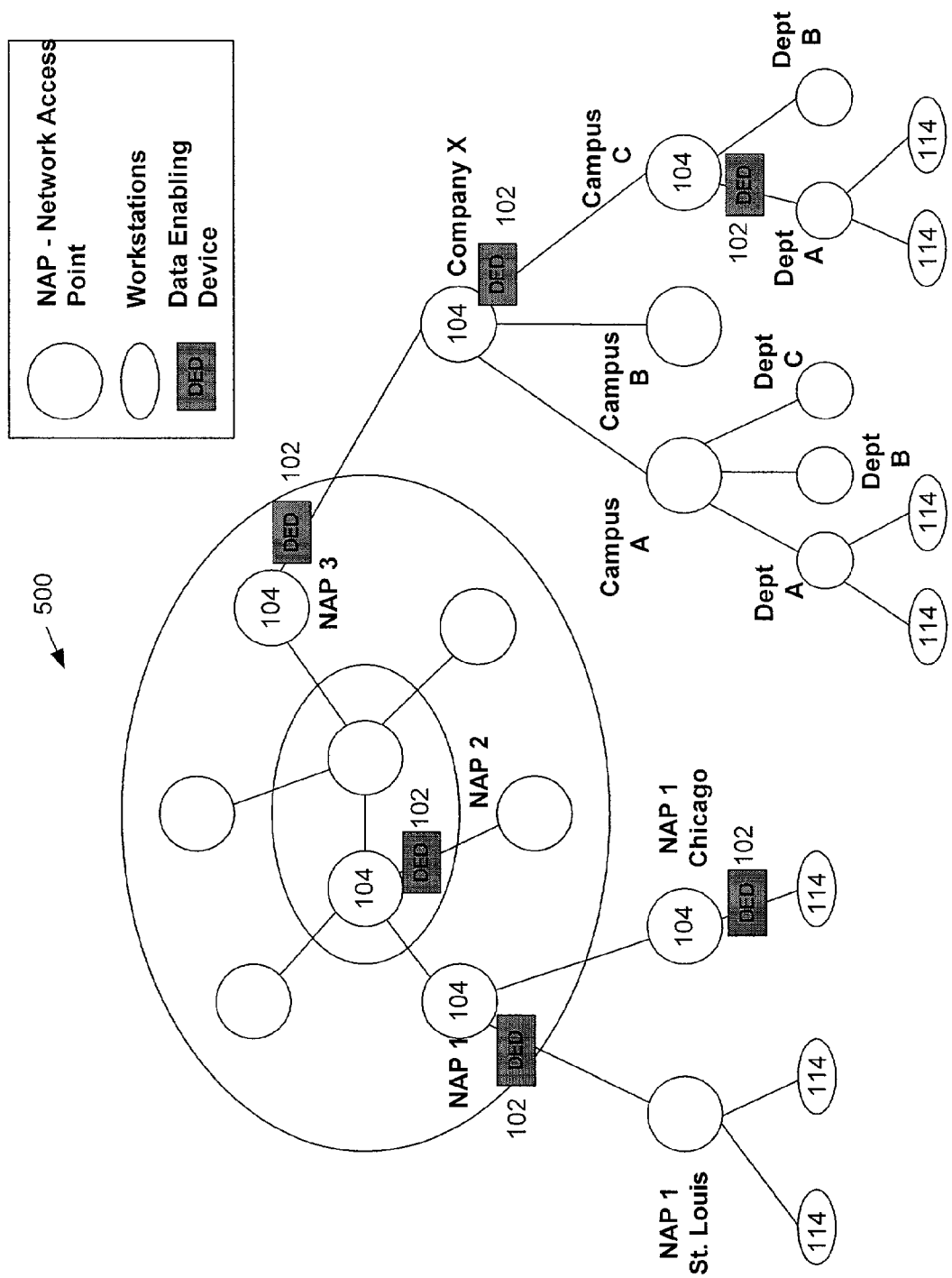
FIG. 5a is a block diagram of a network of NAPs that includes DEDs in accordance with the present invention.

Referring now to FIG. 5*a*, a diagram of network 500 is shown that includes multiple NAPs 104 and DEDs 102 along the various levels of the network 500. The DEDs 102 can reside at multiple locations along routes for transmitting packets through the network 500.

Figure 5B:
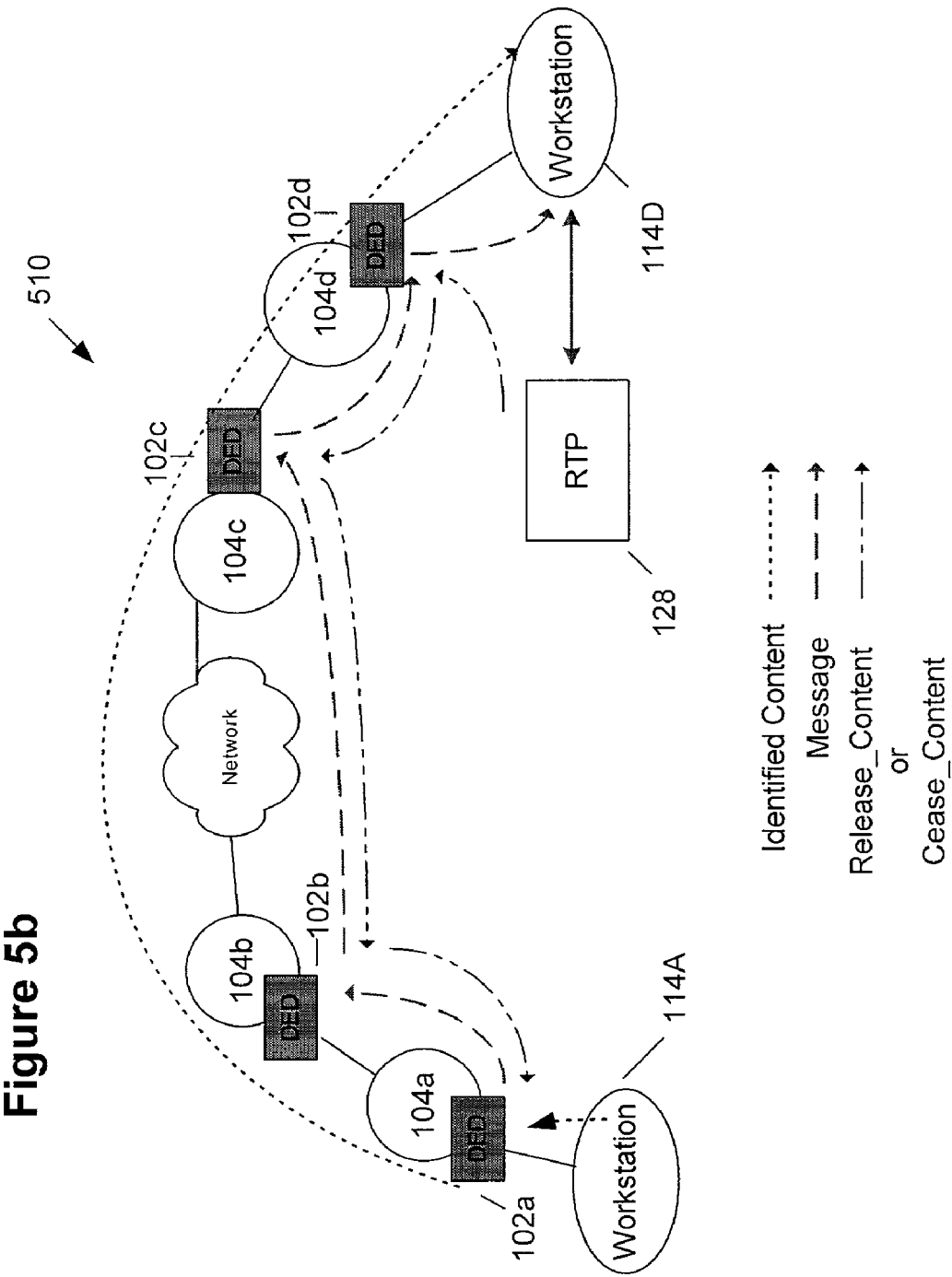

FIG. 5*b* shows a block diagram of multiple DEDs 102 in a network 510. Since multiple DEDs 102 can be installed throughout the network 510, data packets are likely to encounter more than one DED 102 during transmission through the network 510. The DEDs 102 can communicate with each other as described in the following paragraphs in order to prevent more than one prompt being presented to the user for the same packet, or set of packets associated with the same content.

When the sending DED 102A matches content in a data packet with content match information, the sending DED 102A generates and transmits a message that includes information to generate a prompt to the user at the destination workstation 114D. In some embodiments, the message includes information such as an identifier for the DED 102D closest along the route to workstation 114D, an identifier of the content, a flow identifier that indicates the network route between the sending DED 102A and the receiving DED 102D, the control information for the content, and an identifier for the RTP 128 associated with DED 102D. DED 102B, which is further along the route to workstation 114D, interprets the message from the sending DED 102A and transmits the message to the next downstream DED 102C. The message is transmitted to each downstream DED along the route until the message reaches the destination DED 102D. The destination DED 102D transmits a message to inform the workstation 114D of the potential transaction. In response, the workstation 114D transmits the message to the RTP 128 along with an identifier of the workstation 114D.

The identifier for the workstation 114D is unique to allow the RTP 128 to send the prompt, such as shown, for example, in FIGS. 4b-4I, to the workstation 114D. The information presented in the prompt is based on the transaction to be performed. For example, the prompt 450 shown in FIG. 4b informs the user at the workstation 114D that the content requested is subject to copyright protection and must be paid for before it can be downloaded to the user. The prompt 450 includes data entry windows and selectable options that allow the user to indicate whether they accept or decline to purchase the content at workstation 114D. If the user agrees to the price and the terms, the transaction is authorized at the RTP 128. The RTP 128 conducts the required transaction and sends a Release_Content or Cease_Content transmission message to the DED 104D, depending on whether the content was authorized to be downloaded to the destination workstation 114D.

To prevent each DED 102D, 102C, 102B from performing a content match on the same packet, DED 102D forwards the message to all upstream DEDs 102C, 102B, 102A. If a Release_Content message is received, the DED 102A places a Release_Content identifier in the packet to indicate that the content is approved for transmission and then transmits the packet. The downstream DEDs 102B, 102C, and 102D along the route in the network 510 recognize the Release_Content identifier and transmit the packet without performing another content match, or generating another prompt, for the same packet.

If the Cease_Content transmission message is received, the originating DED 102A will not transmit the packet and clears the packet from its buffer The Release_Content identifier indicating that the content is approved for transmission can be any combination of data that the DEDs are programmed to recognize as indicating that the packet can be transmitted with a content match. For example, the Release_Content identifier can be a setting of one or more bits in the header of trailer of the packet, or in the packet's payload. The identifier can be encrypted or decrypted, or implement other security mechanisms known in the art. Notably, the Release_Content identifiers and location in the packets can be updated or modified periodically to minimize the likelihood of users successfully transmitting unauthorized content by adding similar Release_Content identifiers to the packets. The Release_Content identifier can also include time/date stamp to indicate that the packet is authorized to be transmitted only within a certain time period of the time/date stamp.

Figure 5C:
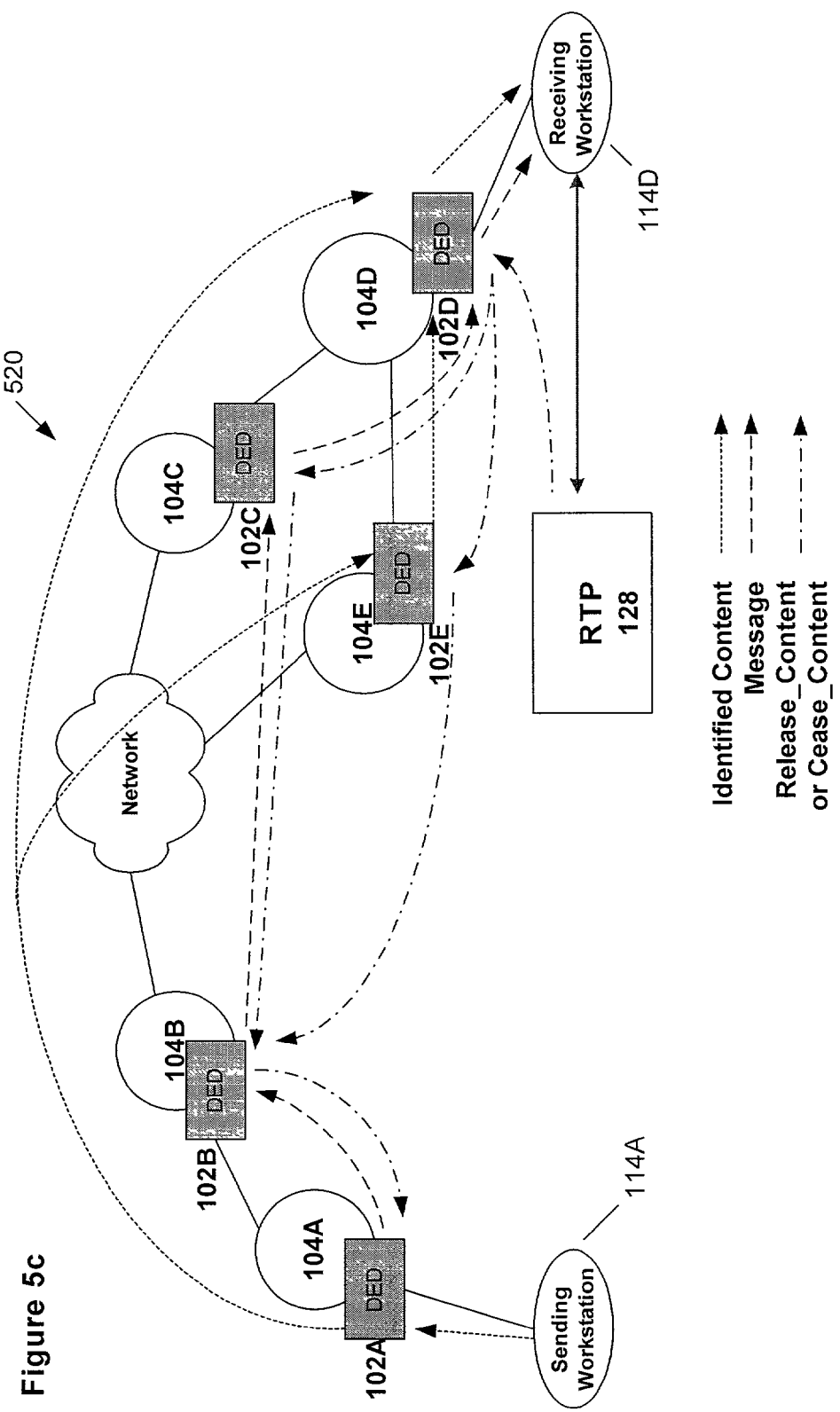
Figure 5D:
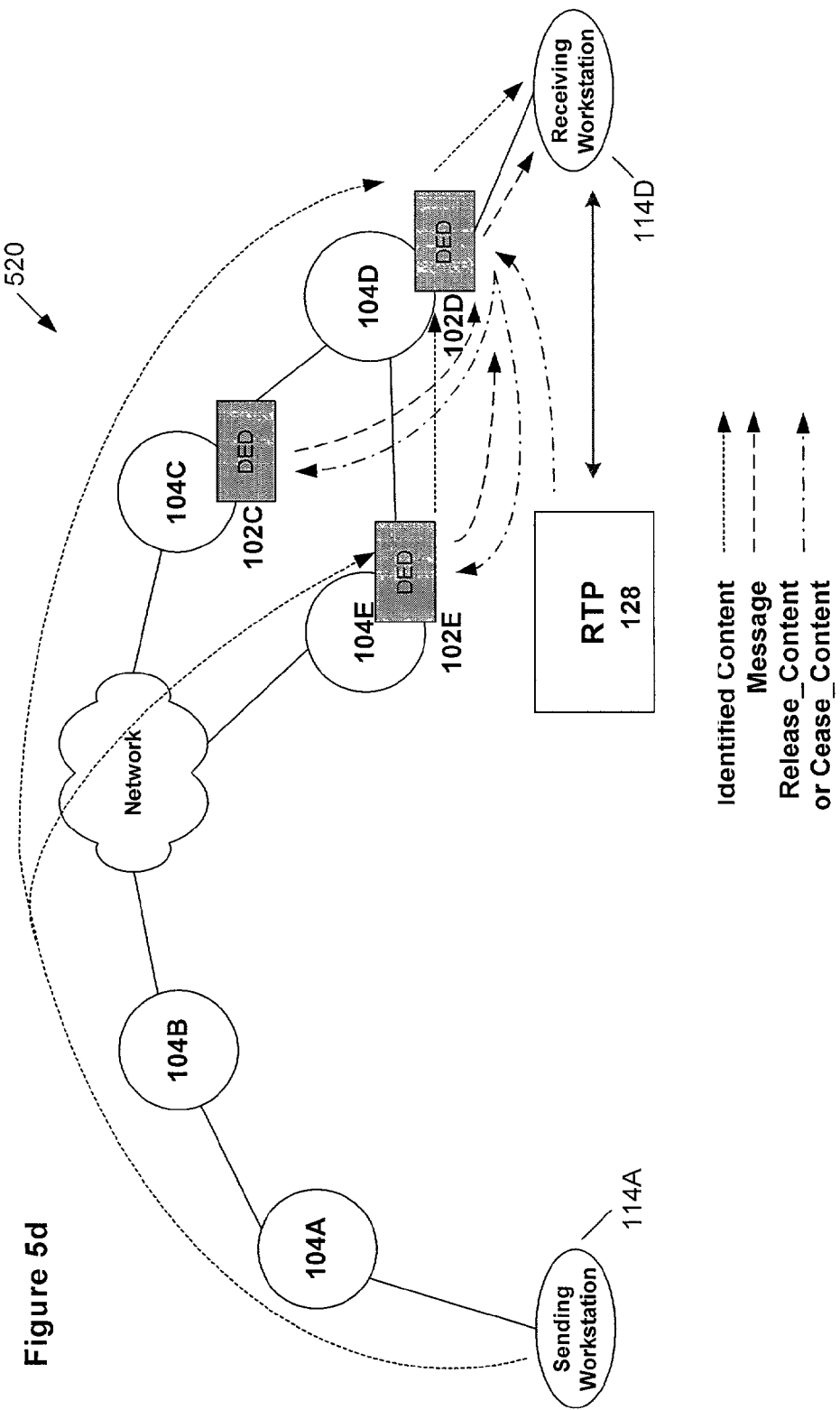

Referring now to FIGS. 5c and 5d, a series of packets within a TCP stream transmitted from sending workstation 114A to destination workstation 114D may not take the same path through network 520 due to redundant paths and the load sharing capabilities of the routers 108 (FIG. 1a). More than one packet associated with the same content can therefore be subject to content matching at different DEDs. To prevent multiple content matches for related packets, when the DED 102A matches the content match information, the DED 102A buffers all of the packets associated with the content, and transmits a message along the route to the DED 102D associated with the destination workstation 114D. The DED 102D notifies the workstation 114D, the workstation 114D transmits the message along the its identifier to the RTP 128, and the RTP 128 conducts the required transaction. Once the transactions, if any, associated with the message have been processed by the RTP 128, the RTP 128 sends the Release_Content or Cease_Content message to the DED 102D, depending on whether the content was authorized to be downloaded to the destination workstation 114. DED 102D forwards the message to all upstream DEDs 102C, 102B, 102A, 102E. The Release_Content message includes an identifier for the TCP stream so that the packets authorized for transmission can be identified by each DED along the various routes in the network 520 and allowed to continue without generating another prompt for the same packets.

FIG. 5d shows an example where there is no DED at NAP 104A for the sending workstation 114A. The content is therefore matched downstream after the packets have taken multiple paths. In this example, content can be matched at DED 102C and DED 102E. Each of these DEDs 102C and 102D will generate and send a Message through the receiving workstation to the RTP 128 for processing. The RTP 128 sends a Release_Content or Cease_Content message prompt to the closest DED 102D to the receiving workstation 114D. DED 102D forwards the message to all upstream DEDs that are buffering packets associated with that particular TCP stream.

Figure 5E:
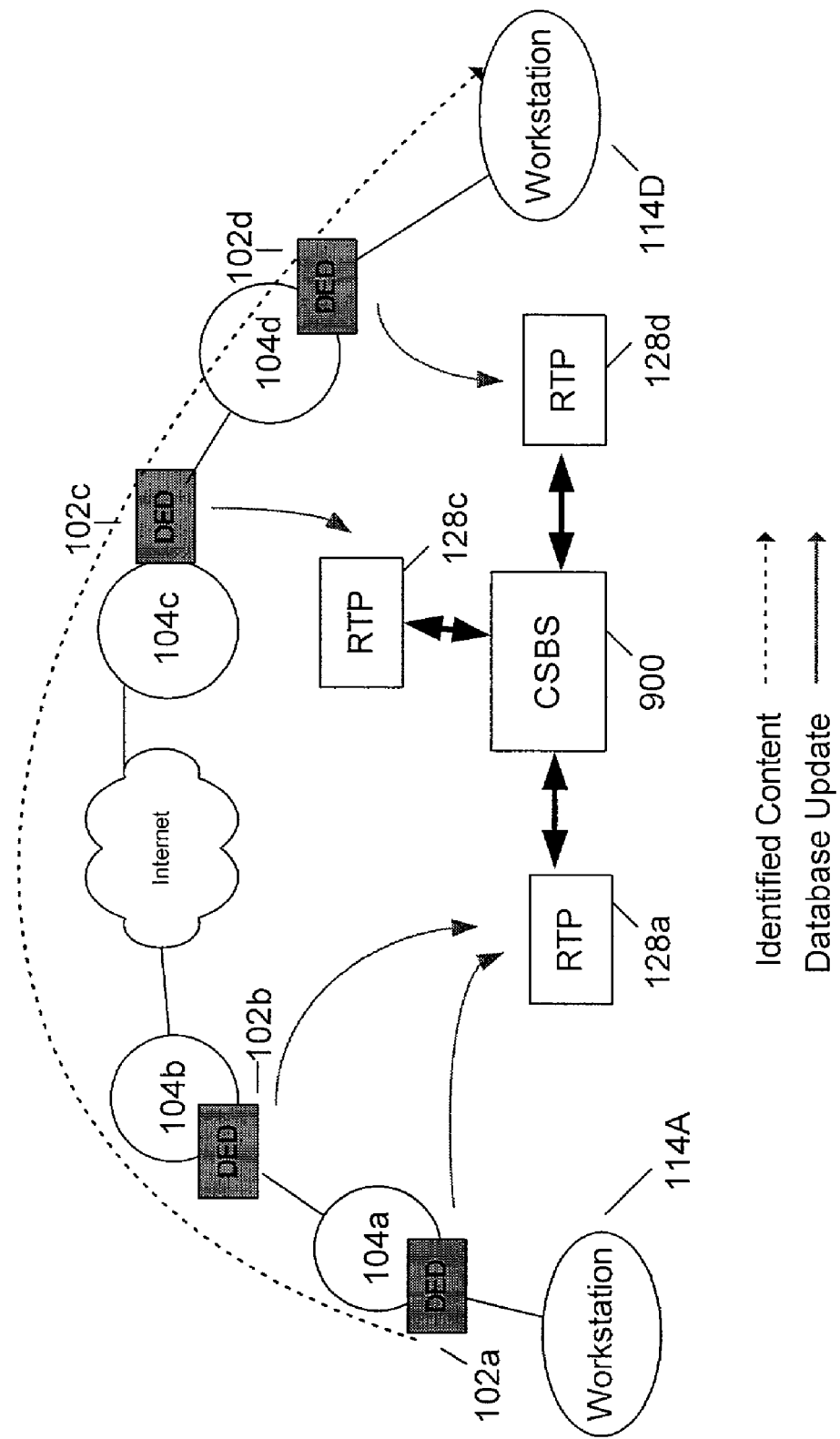
FIG. 5e is a diagram of a network with multiple DEDs for monitoring data packets in accordance with the present invention.

FIG. 5e shows an embodiment of a system in which one or more of the DEDs 102A, 102B, 102C, 102D monitor packets for content as the packets are transmitted from workstation 114A to workstation 114D. In this embodiment, the control information in the packets indicates that the packets can be transmitted without generating a prompt at workstation 114D. As the DEDs match content in the packets, they transmit a message to notify the corresponding RTP 128 which includes information to identify the packet. The RTPs 128 forwards the information to the CSBS 900. This information can be collected for a number of purposes including analyzing the number of times a piece of content is transmitted over the network, and the general vicinities of the sending and receiving workstations.

Figure 6A:
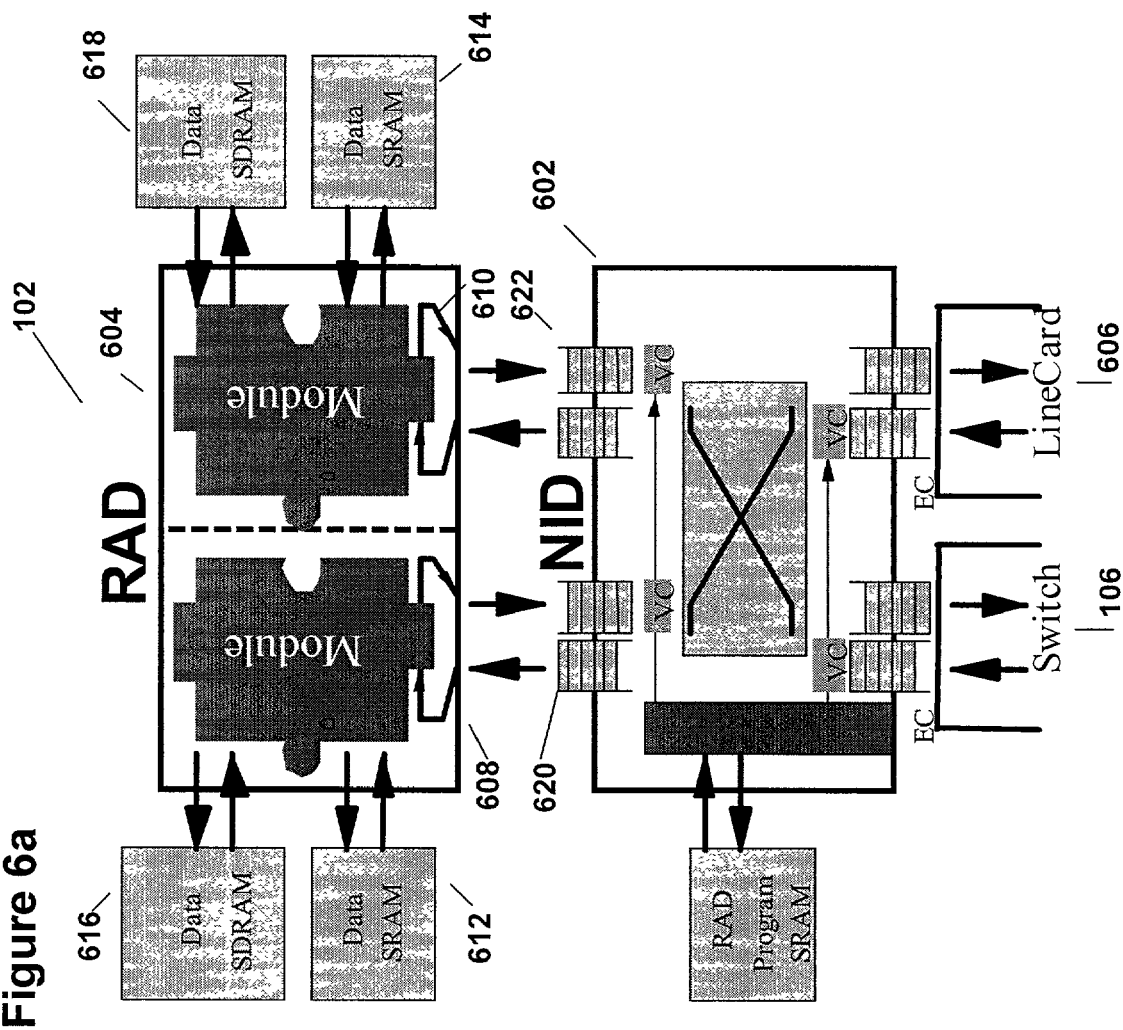

FIG. 6a shows an example of a device that can be used to implement DED 102 for use in the network 100 in accordance with the present invention. Such a device is available from the Field Programmable Port Extender (FPX) Project developed in the Applied Research Laboratory, Department of Computer Science, Washington University, St. Louis, Mo., and further described in the publication entitled "Field Programmable Port Extender (FPX) for Distributed Routing and Queuing" by John W. Lockwood, Jon S. Turner, David E. Taylor, ACM International Symposium on Field Programmable Gate Arrays (FPGA'2000), Monterey, Calif., February 2000, pp. 137-144.

DED 102 utilizes Field Programmable Gate Arrays (FPGAs) to provide the performance advantage of Application-Specific Integrated Circuits (ASICs) to implement customized pipelines and perform parallel logic functions. FPGAs also can be reprogrammed to perform a content matching function.

As shown in FIG. 6a, DED 102 includes two FPGA devices: one to implement a Network Interface Device (NID) 602 and another to implement a reprogrammable application device (RAD) 604. DED 102 is connected to network 100 (FIG. 1a) via switch 106 and line card 606. By performing all computations in FPGA hardware, cells and data packets can be processed at the full line speed of the line card 606.

The RAD 604 includes modules 608, 610 that implement the module-specific functionality. Each module 608, 610 on the RAD 604 connects to a Static Random Access Memory (SRAM) 612, 614, respectively, and to a wide synchronous dynamic RAM (SDRAM) 616, 618, respectively. The SRAM 612, 614 typically is used for applications that perform table lookup operations, while the SDRAM 616, 618 typically is used for applications such as packet queuing that transfers bursts of data and can tolerate higher memory latency.

The PAD 604 communicates with the NID 602 using a suitable interface 620, 622, such as the known Universal Test And Operation Physical Interface (UTOPIA) for Asynchronous Transfer Mode (ATM) transmission. Data packets transmitted over the interface 620, 622 are segmented into a sequence of fixed-size cells that are formatted as Internet Protocol (IP) over ATM, as known in the art. Each interface 620, 622 can include a small amount of buffering and implement flow control. A Start of Cell (SOC) signal is asserted at the input of the modules 608, 610 to indicate the arrival of data. The Transmit Cell Available (TCA) signal is asserted back toward an incoming data source to indicate downstream congestion.

The NID 602 controls the flow of data packets to and from the modules 608, 610. NID 602 also provides mechanisms to dynamically reprogram the modules 608, 610 over the network 100 (FIG. 1a). The combination of these features allows these modules 608, 610 to be dynamically loaded and unloaded without affecting the switching of other traffic flows or the processing of packets by the other modules in the network 100.

Figure 6B:
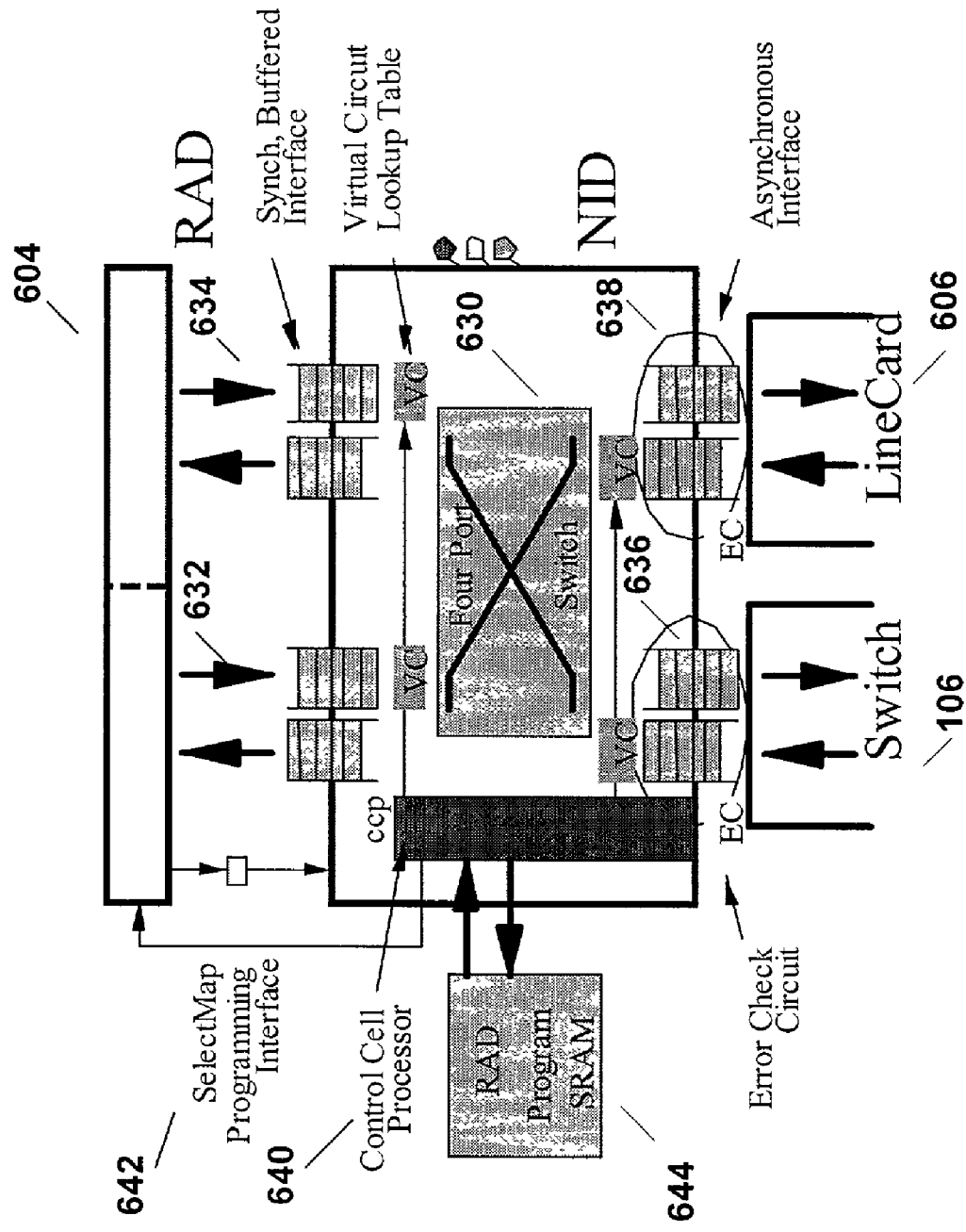

As shown in FIG. 6b, the NID 602 includes several components that can be implemented in FPGA hardware. The components in NID 602 include: a four-port switch 630 to transfer data between ports 632, 634, 636, and 638; Virtual Circuit lookup tables (VC) on each port 632, 634, 636, 638 to selectively route flows; a Control Cell Processor (CCP) 640 to process control cells that are transmitted and received over the network 100 (FIG. 1a); programming interface logic 642 to reprogram the FPGA hardware on the RAD 604; and synchronous and asynchronous interfaces (not shown) to the four network ports 632, 634, 636, 638.

The CCP 640 can be implemented in hardware to manage the operation of the DED 102 and to communicate over the network 100 (FIG. 1a). On the ingress interface from the switch 106, the CCP 640 listens and responds to commands that are sent on a specific virtual circuit. The NID 602 processes commands that include: (1) modification of per-flow routing entries; (2) reading and writing of hardware status registers, (3) reading and writing of configuration memory, and (4) commands that cause the logic on the RAD 604 to be reprogrammed. After executing each command, the NID 602 returns a response in a control cell.

In order to reprogram the RAD 604 over the network 100 (FIG. 1a), the NID 602 implements a reliable protocol to fill the contents of the on-board RAM with configuration data that is sent over the network 100. As each cell arrives, the NID 602 uses the data and the sequence number in the cell to write data into the RAD 604 Program SRAM 644. Once the last cell has been correctly received, and the NID 602 holds an image of the reconfiguration byte stream that is needed to reprogram the RAD 604. At that time, another control cell can be sent to the NID 602 to initiate the reprogramming of RAD 604 using the contents of the RAD Program SRAM 644.

The DED 102 supports partial reprogramming of the RAD 604 by allowing configuration streams to contain commands that program only a portion of the logic on the RAD 604. Rather than issue a command to reinitialize the device, the NID 602 writes the frames of reconfiguration data to the RAD's reprogramming port via programming interface 642. This feature enables the other module on the RAD 604 to continue processing packets during the partial reconfiguration.

In embodiments, the DED 102 can be implemented using a combination of hardware, software, and/or firmware. A software-based DED can include a routing chip and an embedded processor that executes a kernel operating system. Any suitable combination of processor and operating system may be used.

Figure 7:
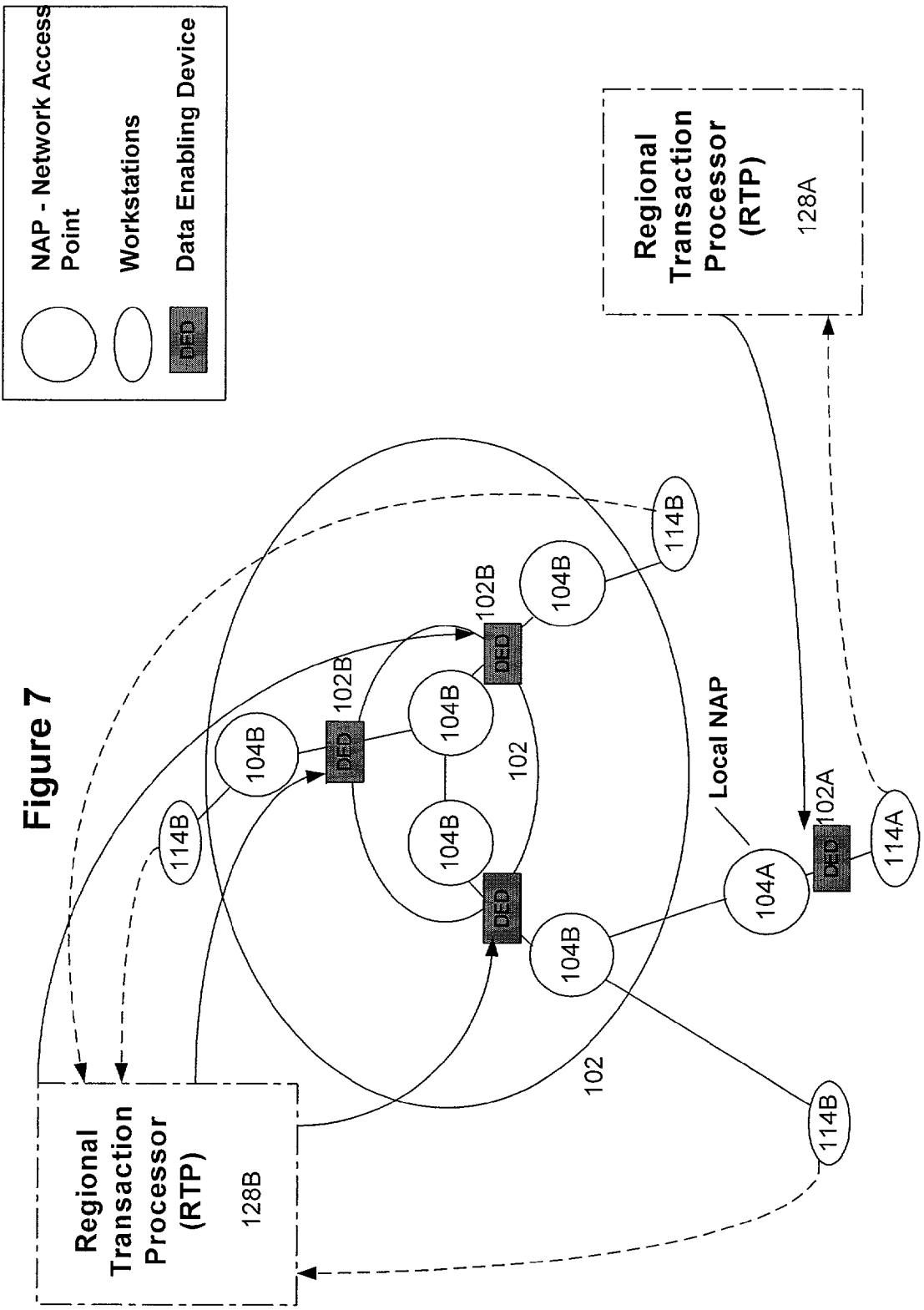
FIG. 7 is a block diagram of network access points and workstations that communicate with the Regional Transaction Processor (RTP) on a regional and local level in accordance with the present invention.

FIG. 7 shows examples of system architectures that can be implemented to process transactions in accordance with the present inventions. One implementation includes a local NAP 104A communicating with RTP 128A, workstation 114A, and DED 102A. The workstation 114A communicates with the RTP 128A after receiving a prompt. For payment transactions, for example, the RTP 128A calculates all fees and costs and transmits a message to the workstation 114A that specifies the amount of the transaction. When DED 102A communicates with RTP 128A in a local region, workstation 114A communicates with the local RTP 128A after receiving a prompt. Thus, a local RTP 128A can process transactions in the local community.

The second implementation can include one or more regional RTPs 128B that communicate with local and remote workstations 114B and multiple NAPs 104B in a region. For example, the second implementation can include one RTP 128B to communicate with every NAP 104B in a metropolitan area. RTP 128B would be considered a local RTP. In an area with less population, one RTP 128B may be able to handle the NAPs 104B in an entire portion of a state. In this situation, RTP 128B would be considered a regional RTP.

Figure 8A:
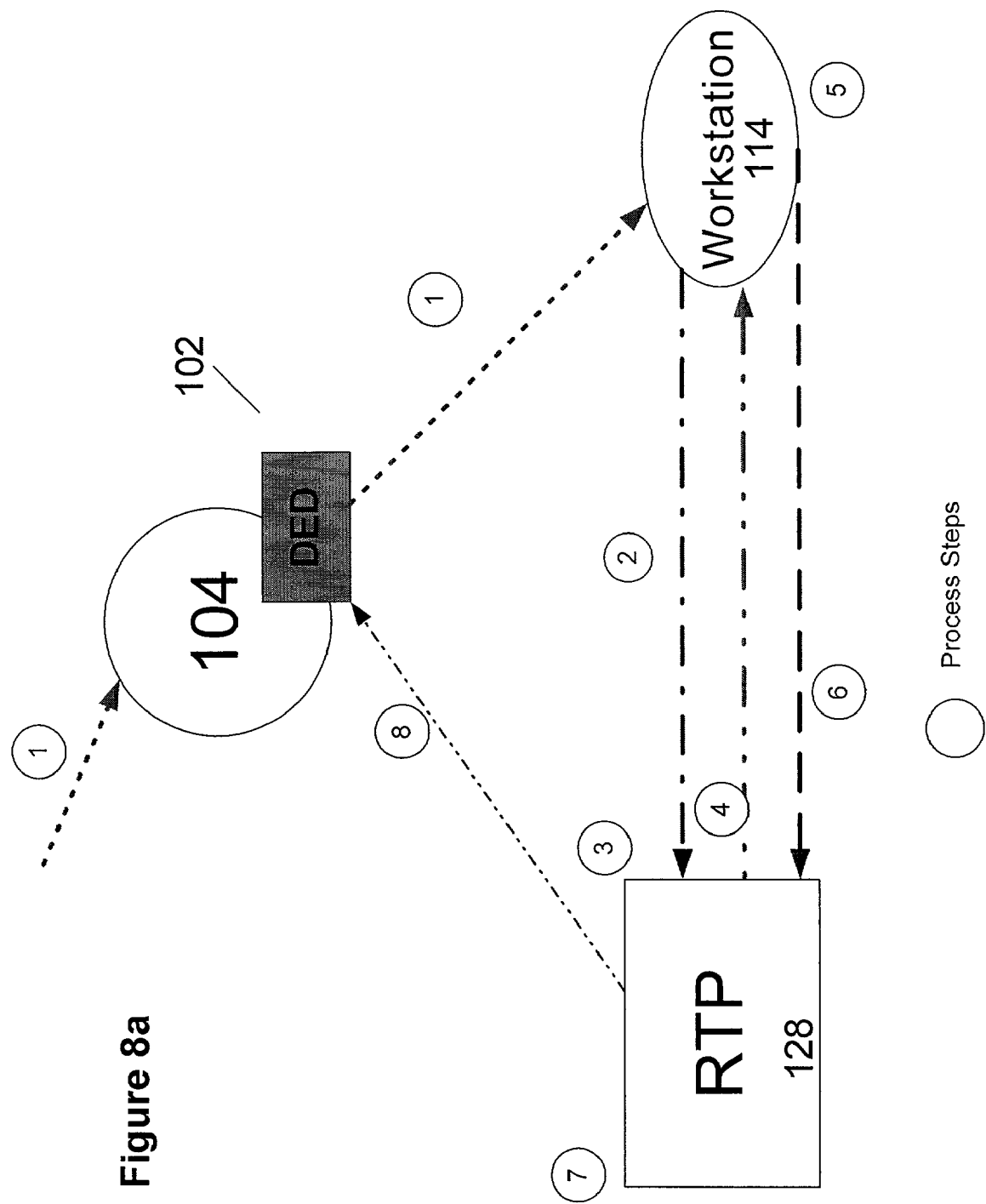

FIG. 8a shows one implementation of the communication process between the DED 102, the workstation 114, and the RTP 128. After the workstation 114 has sent a request for content that is copyright protected, for example, the DED 102 finds a content match and/or the control information which identifies the content in one or more of the arriving packets as being copyright protected. In this situation, the process includes the following steps:

Step 1. DED 102 transmits a message to the workstation 114. The message includes information including an identifier for the DED 102 closest along the route to workstation 114, an identifier of the content, a flow identifier, the control information for the content, and an identifier for the RTP 128 associated with DED 102.

Step 2. Workstation 114 initiates a transaction notice to the RTP 128 that includes the identifier of the content, the control information for the content, an identifier of the workstation 114, and the identifier of the DED 102.

Step 3. The RTP 128 determines transaction costs, tax rates, and billing account information using in the transaction notice and in the database 130.

Step 4. The RTP 128 transmits a purchase prompt to the user at the workstation 114, such as shown in FIG. 4a or FIG. 4b.

Step 5. The user at the workstation 114 inputs a purchase decision.

Step 6. The purchase decision is transmitted to the RTP 128.

Step 7. The RTP 128 processes payment if the user authorized the purchase.

Step 8. The RTP 128 sends a Release_Content notice to the DED 102 if payment was authorized. If the user declines the purchase, the RTP 128 sends a Cease_Content notice to DED 102 to discontinue transmission of the content and discard the packets associated with the content.

Figure 8B:
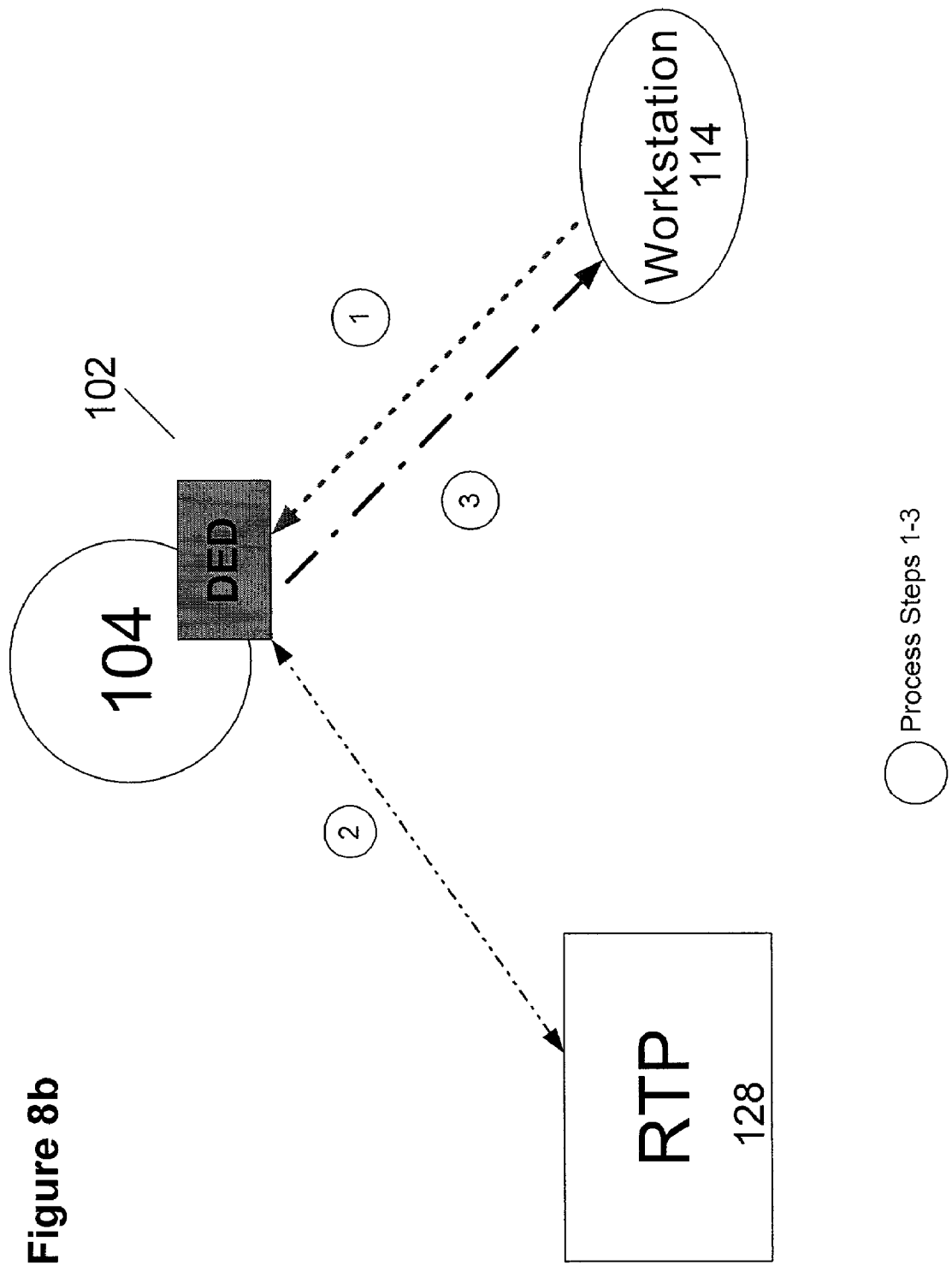

FIG. 8b shows an example of a process for initializing communication between the workstation 114, the DED 102, and the RTP 128 including the following steps:

Step 1. The user at the workstation 114 invokes a network browser. The browser transmits a startup message to the DED 102. The DED 102 forwards the startup message to the RTP 128.

Step 2. The RTP 128 transmits an acknowledgment of the message to the DED 102.

Step 3. The DED 102 transmits an acknowledgement to the workstation 114 when the DED 102 is ready to perform content matches on packets.

FIG. 8c shows an embodiment of a process for preventing content containing confidential information from being transmitted over a network 100 (FIG. 1) from the workstation 114 including the following steps:

Step 1. The user at workstation 114 attempts to transmit secured content over the network. The secured content includes content match information that identifies the content as being subject to security controls and therefore should not be transmitted.

Step 2. The DED 102 recognizes the content match information indicating that the content should not be transmitted over the network 100 (FIG. 1). The DED 102 transmits a prompt, such as shown in FIG. 4g, to the workstation 114 to inform the user of the attempt.

Step 3. The DED 102 transmits a prompt, such as shown in FIG. 4h, to a systems administrator workstation 114 to inform the administrator of the attempt and provide an identifier of the workstation 114 and/or the user logged on to the workstation 114.

Step 4. The DED 102 transmits a message to the RTP 128 that includes information, such as the file attempting to be transmitted, the date and time of the attempt, and the identifiers for the workstation 112 and/or the user. The RTP 128 stores the information on storage system 142 (FIG. 1b).

Figure 8D:
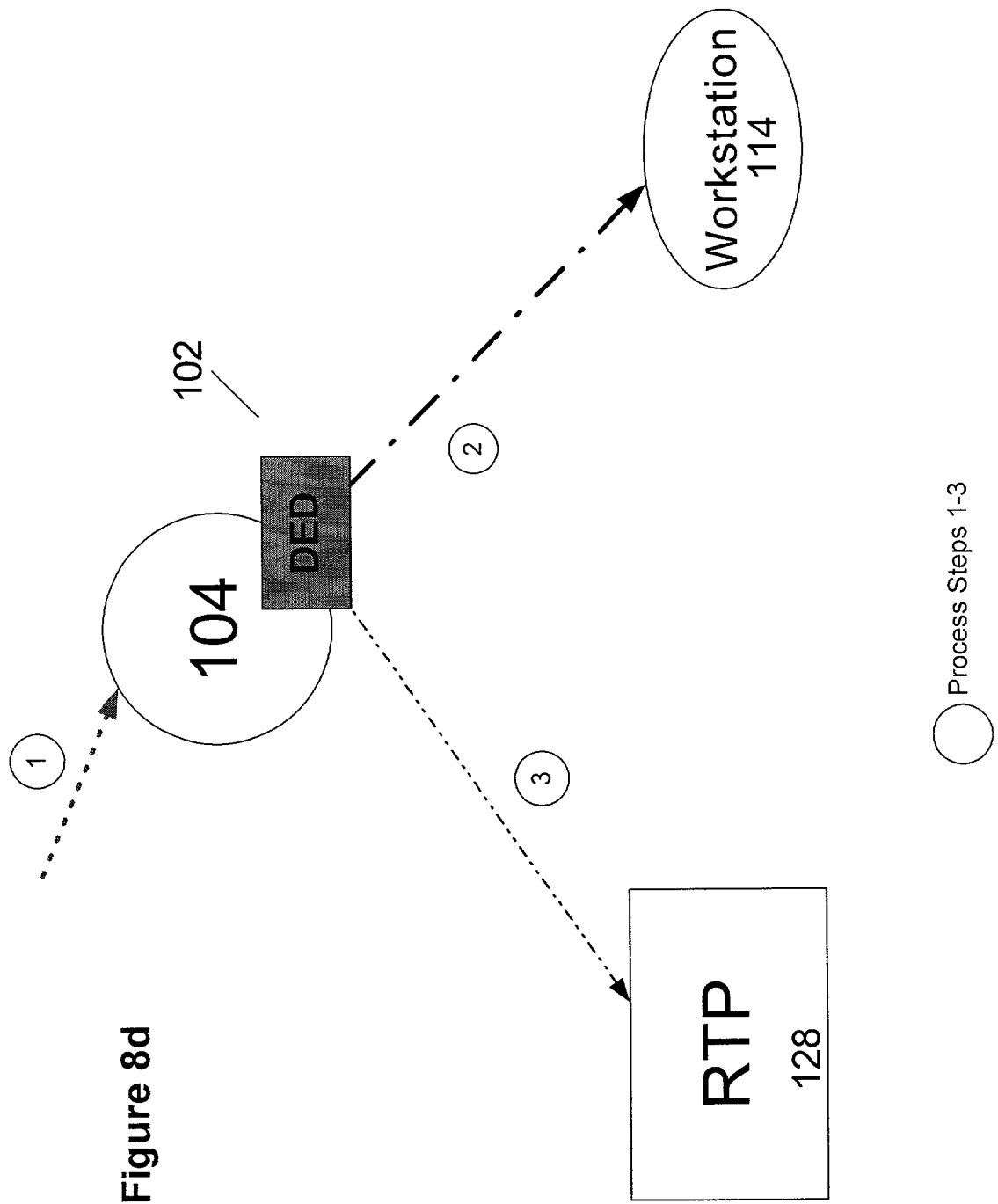

FIG. 8d shows an embodiment of a process for halting transmission of computer viruses from the network 100 (FIG. 1) to the workstation 114. Once a virus has been identified, the DEDs 102 can be programmed with content match information that identifies files infected the virus. The process includes:

Step 1. The DED 102 performs a content match and detects the content match information indicating the file is infected with a virus.

Step 2. The DED 102 transmits a prompt, such as shown in FIG. 4e, to workstation 114 to inform the user of the infected file.

Step 3. The DED 102 updates the RTP 128 with information regarding the attempt to transmit the virus. The RTP stores the information on its storage system 142 (FIG. 1b), and the information can be used by system administrators for purposes such as determining the source of the virus.

Figure 8E:
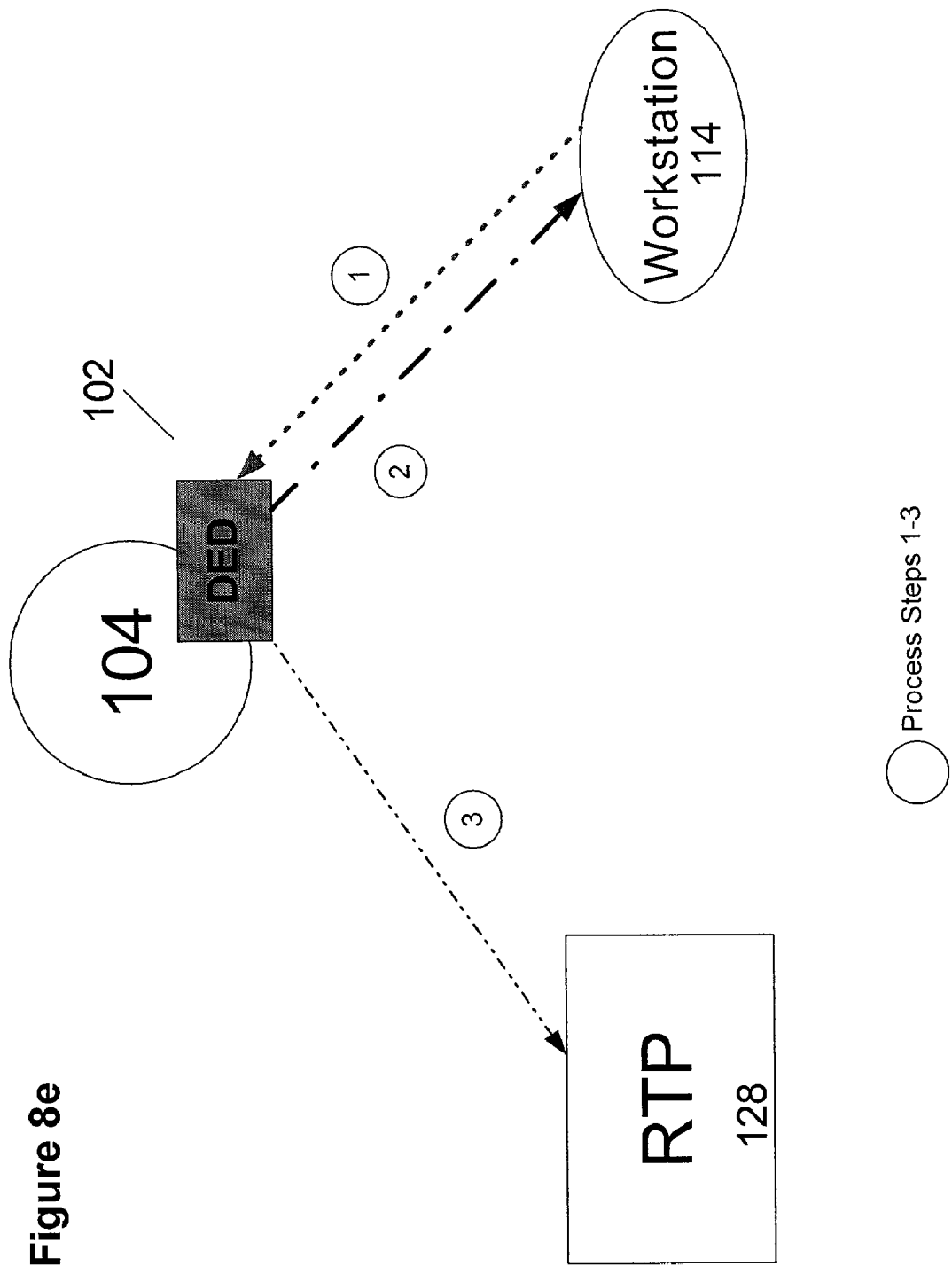

FIG. 8e shows an embodiment of a process for halting transmission of (computer) viruses from the workstation 114 to the network 100 (FIG. 1). Once again, when a virus has been identified, the DEDs 102 can be programmed with content match information that identifies files infected with the virus. The process includes:

Step 1. The DED 102 performs a content match and detects the content match information indicating the file is infected with a virus.

Step 2. The DED 102 transmits a prompt, such as shown in FIG. 4f, to workstation 114 to inform the user of the infected file.

Step 3. The DED 102 updates the RTP 128 with information regarding the attempt to transmit the virus. The RTP 128 stores the information on its storage system 142 (FIG. 1b), and the information can be used by system administrators for purposes such as disinfecting the files on all of the local workstations and storage systems.

Application programs to support the processes described for FIGS. 8a-8e on the workstations 114 can be provided to the workstations 114 via downloads from selected sites on the network 100 (FIG. 1), or distributed by the NAPs 104. The browser program on the workstation 114 can execute the application programs through an application program interface, as known in the art. The application programs also can be incorporated in later versions of the browser. The application programs include functions for receiving messages containing the prompts from the RTPs and DEDs, presenting the prompts to the user at the workstation 114, and initializing communication between the RTPs 128 and the DEDs 102.

FIG. 9 shows a Central Storage and Backup Systems (CSBS) 900 communicating with RTPs 128. All transactional information, monitoring information, and RTP operational information is forwarded to the CSBS 900 to backup all information and monitor the operability of every RTP 128. If an RTP 128 becomes inoperable, the CSBS 900 can transmit information to re-route all DEDs 102 associated with the inoperable RTP 128 to another RTP 128.

Figure 10:
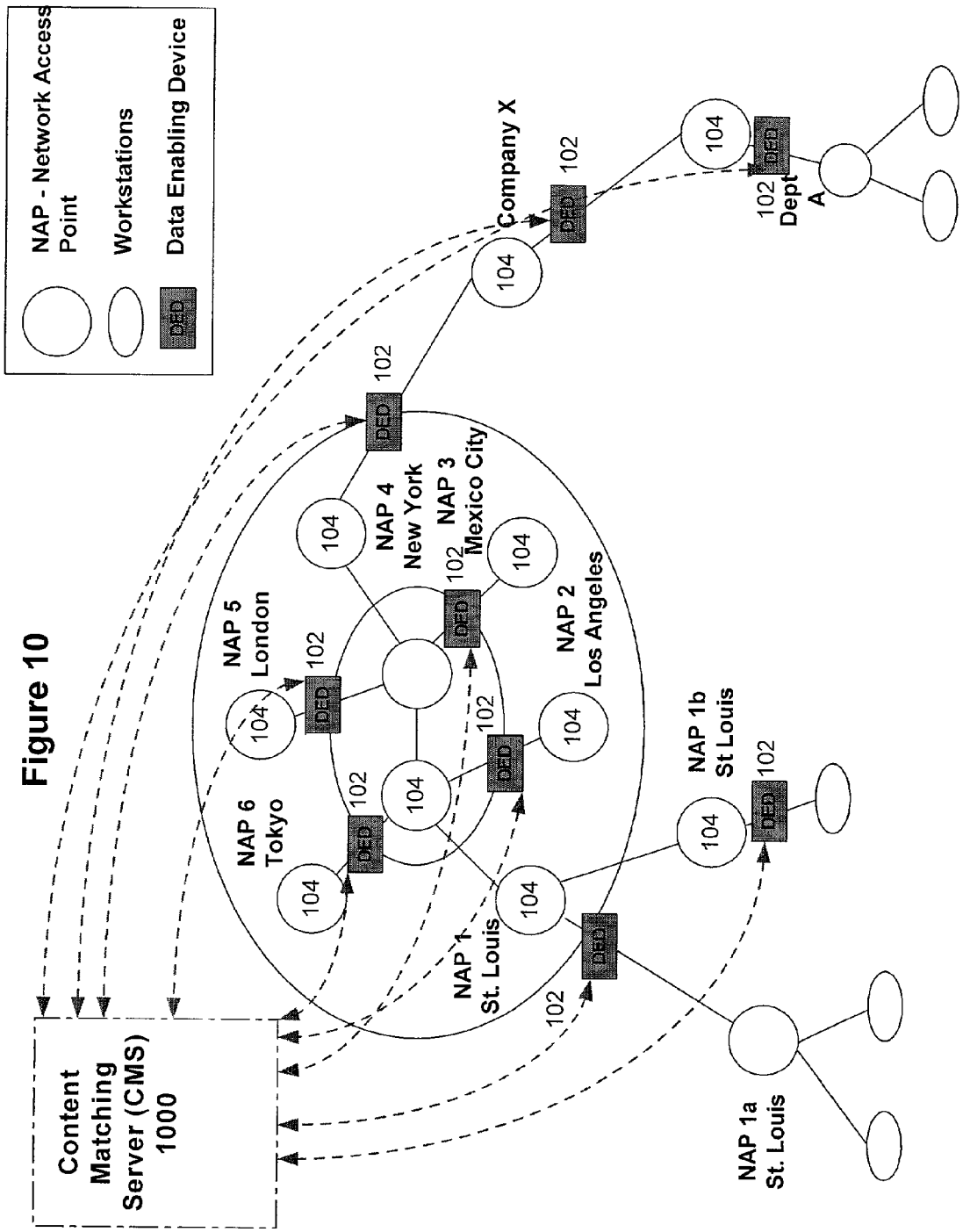
FIG. 10 is a block diagram of one embodiment of a Content Matching Server (CMS) for providing the DEDs shown in the network of FIG. 1a with content matching information.

FIG. 10 shows a Content Matching Server (CMS) 1000 that can transmit updated content match information to all DEDs 102, at regular intervals or as required. This includes new content match information as well as removing or modifying obsolete content match information. One or more CMSs 1000 may be co-located with the CSBS 900 (FIG. 1a) or located in regional offices and connected to network 100 (FIG. 1a).

Figure 11:
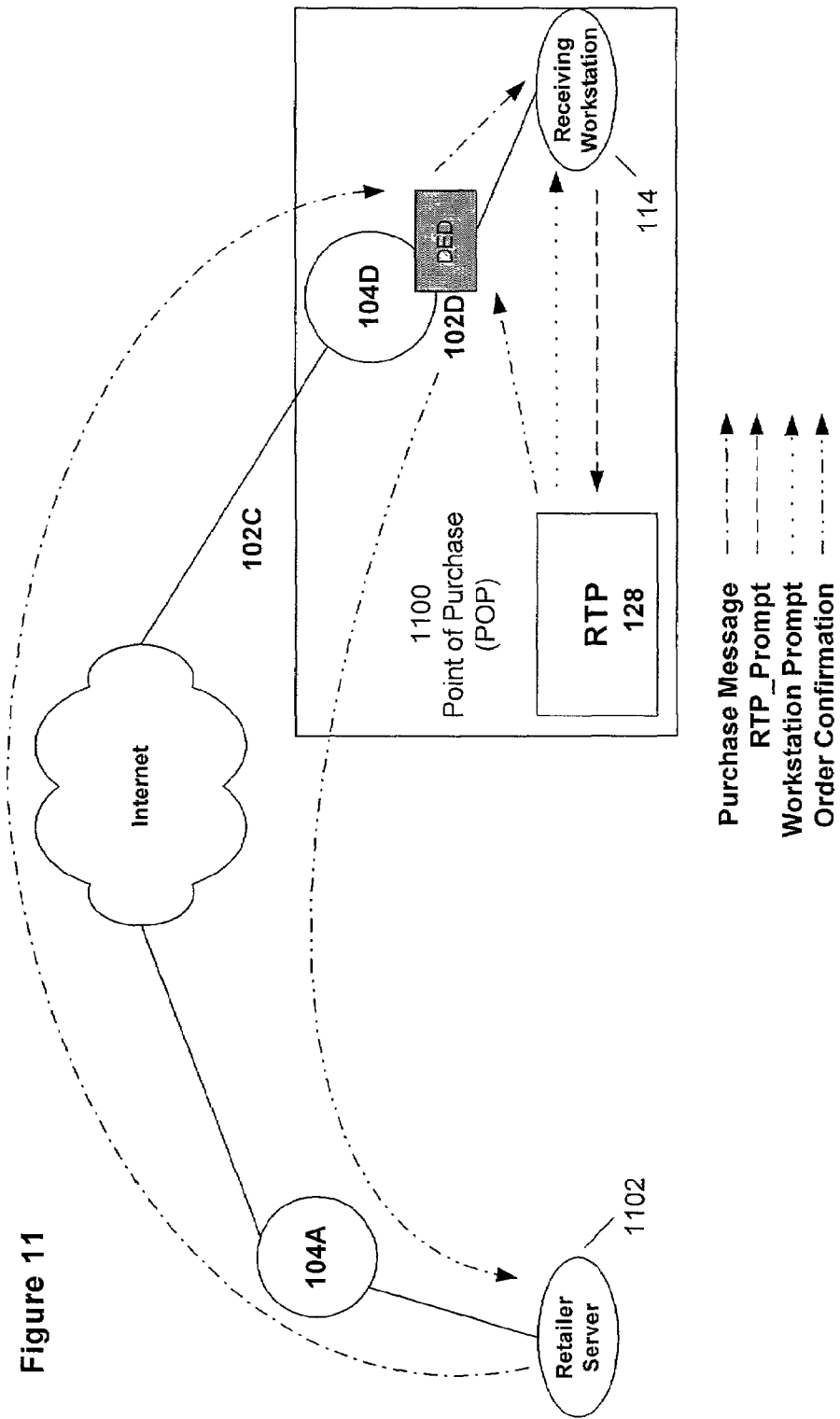

FIG. 11 shows a representation of a Point of Purchase (POP) 1100 that allows local and state governments to collect sales tax on sales transactions conducted via the network 100. The transactions are processed at the RTP 128 and a prompt summarizing the cost of the goods or services from the vendor, and the sales tax added, is presented to the user at workstation 114. The RTP 128 uses look-up tables 158, such as shown in FIG. 1f and/or a formula to calculate the appropriate tax rates for the transactions. The RTP 128 can transmit a payment prompt, such as shown in FIG. 4i, showing the total cost of the transaction to the workstation 114. The RTP 128 can bill the appropriate billing system once the user approves the purchase at the workstation 114. The amount of sales tax to charge depends on the state and/or local government in which the workstation 114 is located. Thus an identifier that provides the location of the workstation 114 can be used to determine the amount of sales tax to add to a sales transaction.

A system and method in accordance with the present invention establishes a new data enabling point at the NAPs 104 (FIG. 1a) that will non-intrusively facilitate the management of data packets transmitted on the network 100. The utility and advantages of such a system and method include:

1. Facilitating the protection of any digital content that is copyright-protected. The DED 102 can be implemented at local NAPs 104, or at the NAP 104 of the content provider, to prompt the user for payment of the content. Transmission of copyright-protected content ceases at the NAP 104 unless the user agrees to pay for the content.

2. Providing facilities for collecting and tabulating information regarding designated digital content downloaded or streamed in real time for ratings services and statistical analysis.

3. Establishing a new virus protection point for all users connected to the NAP 104. This protection point can be updated universally to prevent viruses from moving off the network backbone and through the NAPs 104.

4. Providing facilities to prevent confidential information from being transmitted past the NAP 104 and onto the network 100.

5. Moving the Point of Purchase (POP) to a NAP 104 on the local level.

6. Providing the capability to add taxes and tariffs on transactions subject to taxation as the transactions are processed by the RTP 128.

7. Facilitating the ability of users to purchase digital content from any workstation 114 on the network 100.

Including the DED 102 at the NAP 104 establishes processes and facilities for monitoring data to and from all users at a common access control point. This enables a series of transactions or actions to be triggered depending on the content match information in the data packets. This applies to protecting digital copyright content, sales transactions for content, and confidential or sensitive information such as medical, financial, and industrial information, computer virus protection, and numerous other security applications.

Further, if the use of a standard encryption scheme is agreed to, the DEDs 102 can monitor encrypted packets for compliance with the standard. A network 100 in accordance with the present invention can prevent transmission of encrypted files that do not conform to the standard encryption scheme over network 100.

The foregoing detailed description has set forth various embodiments of the present invention via the use of schematic diagrams and examples. It will be understood by those within the art that each schematic diagram component and operations and/or components illustrated by the use of examples can be implemented, individually and/or collectively, by a wide range of hardware, software, firmware, or any combination thereof.

The above description is intended to be illustrative of the invention and should not be taken to be limiting. Other embodiments within the scope of the present invention are possible. For example, a system and method in accordance with the present invention can utilize a network transport model other than the OSI model (FIG. 2b). Further, the Data-Enabling Device (DED) could take the form of software running over existing hardware switching systems located at the NAP. Variations and modifications of the embodiments disclosed herein can be made based on the description set forth herein, without departing from the spirit and scope of the invention as set forth in the following claims.

What is claimed is:

1. A system for controlling transmission of data packets through an information network, the information network having a plurality of user workstations communicatively coupled to a network access point (NAP), said system comprising:

a Regional Transaction Processor (RTP); and a data Enabling Device (DED), said DED being disposed at the NAP and communicatively coupled to the RTP, said DED containing content match information and operable to:

inspect at least content portions of data packets, each data packet comprising a content portion, a header, and a trailer, transiting the NAP;

forward an inspected data packet when information within the content portion of a data packet is not substantially similar to content match information; and when information within the content portion of an inspected data packet is substantially similar to content match information, temporarily store the inspected data packet, initiate issuance of a DED message to a recipient user workstation, and invoke the RTP to process a transaction; wherein:

the RTP transmits an RTP message to the DED authorizing forwarding of the data packet only when a result of the transaction indicates that forwarding is appropriate;

the system further comprises a plurality of DED's, at least one intermediate DED operable to forward the DED message to a DED closest, within the information network, to the recipient user workstation;

the plurality of DED's are operable to communicate with each other to prevent transmitting more than one DED message for the same data packet within the information network;

processing a transaction based on a user response to the DED message; and the RTP transmits one of a Release_Content message and a Cease_Content message to the DED, based on the result of the transaction.

2. The system as set forth in claim 1, wherein the transaction is based on control information associated with the content match information.

3. The system as set forth in claim 1 wherein the DED's detection of data packets including content match information is performed at a rate proportional to the rate at which the data packets are received by the DED.

4. The system as set forth in claim 1 wherein the RTP comprises a network server and a database, and is operable to process requests for content.

5. The system as set forth in claim 1, further comprising a plurality of NAPs along a network route, wherein each NAP has an associated DED operable to communicate with at least one of the other DEDs.

6. The system as set forth in claim 5 wherein:

a first NAP includes a first DED for generating a DED message.

7. The system as set forth in claim 1, wherein the DED includes Field Programmable Gate Arrays (FPGAs).

8. The system as set forth in claim 7 wherein the FPGAs are reprogrammed over the network to perform a content matching function.

9. The system as set forth in claim 7 wherein a portion of the DED is dynamically reprogrammed, and the DED is operable to continue processing data packets during the dynamic reprogramming.

10. The system as set forth in claim 1, further comprising a Central Storage and Backup System (CSBS) operable to communicate with the RTP, to monitor operation of the RTP, and to store transaction information.

11. The system as set forth in claim 10, wherein the CSBS is operable to transmit information to reprogram the DED to communicate with another RTP.

12. The system as set forth in claim 1, further comprising a content matching server operable to store content match information, to communicate with the DED, and to transmit the content match information to the DED.

13. The system as set forth in claim 1 wherein the DED is operable to suspend transmission of data packets through the information network until a user response to a prompt is received.

14. The system as set forth in claim 1 wherein the DED is further operable to search data packets for content match information to determine whether transmission of data packets containing particular content should be unconditionally prevented, and when the DED finds such content match information, the DED prevents, without additional processing, forwarding of data packets containing said particular content.

15. The system as set forth in claim 1, wherein a content provider supplies transaction instructions to the RTP for use by the RTP when processing a transaction when the DED finds content match information in a data packet.

16. The system as set forth in claim 15, wherein the instructions include transmitting a transaction DED message to the recipient user workstation informing of a price to pay for content in a data packet, and allowing the user to accept or decline purchase of the content.

17. The system as set forth in claim 15, wherein the instructions specify transmitting a prompt to inform a user that content infected with a virus is attempting to be transmitted from or received by the recipient user workstation, and that transmission or reception of the virus is being halted.

18. The system as set forth in claim 15 wherein the instructions include transmitting a prompt to the recipient user workstation to inform that content subject to security control is attempting to be transmitted from or received by the recipient user workstation, and that transmission or reception of the content is being halted.

19. The system as set forth in claim 1, wherein the RTP tallies statistics regarding transmission of designated content.

20. A method for controlling transmission of data packets through an information network, each data packet comprising a content portion, a header, and a trailer, the information network having a plurality of user workstations communicatively coupled to a network access point (NAP), said method comprising:
   inspecting at least content portions of data packets transiting the NAP with a data Enabling Device (DED), said DED being disposed at the NAP and communicatively coupled to a Regional Transaction Processor (RTP), said DED containing content match information;
   forwarding an inspected data packet when information within the content portion of the inspected data packet is not substantially similar to content match information; and
   when information within the content portion of an inspected data packet is substantially similar to content match information, temporarily storing the inspected data packet, issuing a DED message to a recipient user workstation, and invoking the RTP to process a transaction; wherein:
   the information network comprises a plurality of DED's, at least one intermediate DED operable to forward the DED message to a DED closest, within the information network, to the recipient user workstation; and the method further comprises:
   transmitting a message among the plurality of DED's to prevent transmitting more than one DED message for the same data packet;
   processing the transaction based on a user response to the DED message; and
   transmitting a Release_Content or Cease_Content message to the DED based on whether content was authorized to be downloaded to the workstation as part of the transaction.

21. The method as set forth in claim 20, wherein the DED message is based on control information associated with the content match information.

22. The method as set forth in claim 20, further comprising processing a transaction based on a response to the DED message received from the recipient user workstation.

23. The method as set forth in claim 20, further comprising reprogramming a portion of the DED to detect different content match information.

24. The method as set forth in claim 20, further comprising suspending transmission of a data packet through the information network until a user response to the DED message is received.

25. A computer-readable storage medium comprising program instructions to implement the method of claim 20.

* * * * *